United States Patent
Wang et al.

(10) Patent No.: US 6,697,767 B2
(45) Date of Patent: Feb. 24, 2004

(54) ROBUST PROCESS IDENTIFICATION AND AUTO-TUNING CONTROL

(75) Inventors: Qing-Guo Wang, Singapore (SG); Tong-Heng Lee, Singapore (SG); Yong Zhang, Shanghai (CN); Yu Zhang, Shanghai (CN); Xue-Ping Yang, Singapore (SG)

(73) Assignee: The National University of Singapore, Singapore (SG)

(*) Notice: Subject to any disclaimer, the term of this patent is extended or adjusted under 35 U.S.C. 154(b) by 182 days.

(21) Appl. No.: 09/978,547

(22) Filed: Oct. 18, 2001

(65) Prior Publication Data

US 2002/0111758 A1 Aug. 15, 2002

Related U.S. Application Data

(60) Provisional application No. 60/241,298, filed on Oct. 18, 2000.

(51) Int. Cl.[7] .................................................. G06F 13/00
(52) U.S. Cl. ...................... 702/189; 702/179; 702/181; 702/190
(58) Field of Search ............................. 702/75, 77, 69, 702/79, 105, 106, 108, 113, 115, 109, 112, 124, 126, 176, 178, 179, 181, 189, 190; 700/29, 250; 706/23; 604/503

(56) References Cited

U.S. PATENT DOCUMENTS

| | | | | |
|---|---|---|---|---|
| 5,777,871 A | * | 7/1998 | Wise | 364/149 |
| 6,169,981 B1 | * | 1/2001 | Werbos | 706/23 |
| 6,481,427 B1 | * | 11/2002 | Javaherian | 123/673 |
| 6,505,085 B1 | * | 1/2003 | Tuttle et al. | 700/28 |

* cited by examiner

*Primary Examiner*—Marc S. Hoff
*Assistant Examiner*—Felix Suarez
(74) *Attorney, Agent, or Firm*—Birch, Stewart, Kolasch & Birch, LLP

(57) ABSTRACT

This invention provides a novel process identification and control package for high performance. For process identification, a simple yet effective and robust identification method is presented using process step responses to give a continuous transfer function with time-delay without iteration. A new relay, called cascade relay, is devised to get more accurate and reliable points on the process frequency response. For controller tuning, the internal model principle is employed to design single-loop controller PID or high-order types with best achievable control performance. The process identification and control design parts can be easily integrated into control system auto-tuning package. Further, a general control scheme for disturbance rejection is given which can significantly improve disturbance rejection performance over conventional feedback systems with time delays. Practical issues such as noises, real-time implementation and tuning guidelines are also provided. The invention covers both open-loop and closed-loop testing, and single and multivariable cases.

25 Claims, 24 Drawing Sheets

Proposed cascade relay feedback system

Time responses

Frequency responses

Identification of $G(s) = 2.15 \frac{(-2.7s+1)(158.5s^2+6s+1)}{(17.5s+1)^4(20s+1)} e^{-14s}$ (—— actual process; ··· area method; —·—·— proposed FOPDT; — — — proposed SOPDT; * * * proposed TOPDT)

Feedback control system

Proposed cascade relay feedback system

Signals from the cascade relay test $$\frac{1}{5s+1}e^{-5s}$$

$$\frac{1}{(s+1)^5}$$

$$\frac{1}{(s+1)(5s+1)}e^{-2.5s}$$

$$\frac{1-s}{(2s+1)^2(5s+1)}e^{-0.5s}$$

Evaluation of $G(j\omega)$ under $NSR = 29\%$ ('+' cascade, 'x' parasite, 'o' standard)

$\frac{1}{5s+1}e^{-5s}$ $\frac{1}{(s+1)^8}$ $\frac{1}{(s+1)(5s+1)}e^{-2.5s}$ $\frac{1-s}{(2s+1)^2(5s+1)}e^{-0.5s}$ Evaluation of $G(j\omega)$ under $NSR = 41\%$ ('+' cascade, 'x' parasite, 'o' standard)

IMC control system

Single-loop control system

Relationship between parameter $\tau_{cl}$ and approximation error $E$ for $G = \frac{e^{-0.5s}}{s+1}$ Nyquist curve of $G_c$ up to $\omega_{cb}$ ($r = 3$)

($\cdots \tau_{cl} = 0.1$, $---\tau_{cl} = 0.3$, ——— $\tau_{cl} = 1$)

$\tau_{cl} = 0.3922$ $\tau_{cl} = 0.6422$

Comparison of set-point response for $\frac{e^{-0.5s}}{(s^2+s+1)(s+2)^2}$ (— · — · — proposed PID, · · · Chien, —— IMC)

Relationship between controller order $n$ and approximation error $E$

Comparison of set-point responses for $\frac{e^{-0.5s}}{(s^2+s+1)(s+2)^2}$ (– – – high order controller, – · – · – proposed PID controller, ―――― IMC)

$\tau_{cl} = 0.6422$ nominal performance $\tau_{cl} = 0.6422$ with gain uncertainty 50%

$\tau_{cl} = 0.3922$ nominal performance $\tau_{cl} = 0.3922$ with gain uncertainty 50%

Comparison of set-point responses for $\frac{e^{-0.5s}}{(s^2+s+1)(s+2)^2}$ (— · — · — proposed PID — — — high order controller, · · · Chien, ——— IMC)

Bode plots for $G_{11}$ of WB plant under NSR=30%

(- - - actual plant; —— estimated model; 'x' proposed FFT; 'o' Melo's method)

Bode plots for $G_{22}$ of WB plant under NSR=30%

(- - - actual plant; —— estimated model; xxx proposed FFT; ooo Melo's method)

Step response for the WB plant

Nyquist array with Gershgorin bands for the WB plant

Step response

Nyquist array with Gershgorin bands

Step response

Nyquist array with Gershgorin bands

Digital equivalents to time delay system (—— CTF, ··· * ··· proposed method, ··· o ··· Tustin, ··· ◇ ··· Triangle)

Feedback system with disturbance

The proposed control scheme

Block diagram of $G_v(s)$ approximating $e^{\hat{L}s}$

The proposed scheme with approximation

The proposed scheme for unstable/non-minimum-phase processes

The proposed scheme for the periodic disturbance rejection

Time responses for $G(s) = \frac{e^{-5s}}{10s+1}$ (―― proposed; ― ― ― normal)

Time responses for $G(s) = \frac{e^{-5s}}{10s+1}$ under periodic disturbance
(—— proposed; — — — normal)

ROBUST PROCESS IDENTIFICATION AND AUTO-TUNING CONTROL

PRIORITY

The present inventors claim the benefit of U.S. Provisional Application No. 60/241,298, filed on Oct. 18, 2000, the entire contents of which is hereby incorporated by reference.

BACKGROUND OF THE INVENTION

1. Field of the Invention

The present invention relates to system identification and control design for single-variable and multi-variable plants. More particularly, the invented schemes permit improved identification accuracy and control performance over conventional methods. The present invention provides general, systematic, effective, and applicable methods for process identification and control for a wide range of industries, such as process and chemical plants, food processing, waste water treatment and environmental systems, oil refinery, servo and mechatronic systems, e.g. anywhere a system model is needed for analysis, prediction, filtering, optimization and management, and/or where control or better control is required for their systems

2. Description of the Background Art

Identifying an unknown system has been an active area of research in control engineering for a few decades and it has strong links to other areas of engineering including signal processing, system optimization and statistics analysis. Identification can be done using a variety of techniques and the step test and relay feedback test are dominant. Though there are many methods available for system identification from a step test (Strejc 1980), most of them do not consider the process delay (or dead-time) or just assume knowledge of the delay. It is well known that the delay is present in most industrial processes, and has a significant bearing on the achievable performance for control systems. Thus there has been continuing interest in identification of delay processes. In the context of process control, control engineers usually use a first-order plus dead-time (FOPDT) model as an approximation of the process for control practice:

$$G(s) = \frac{K_p}{Ts+1} e^{-Ls}. \qquad (1)$$

For such a FOPDT model, area-based methods are more robust than other methods such as the graphical method or two-point method (Astrom and Hagglund 1995). This FOPDT model is able to represent the dynamics of many processes over the frequency range of interest for feedback controller design. Yet, there are certainly many other processes for which the model (1) is not adequate to describe the dynamics, or for which higher-order modeling could improve accuracy significantly. Graphical methods (Mamat and Fleming 1995, Rangaiah and Krishnaswamy 1996a, Rangaiah and Krishnaswamy 1996b) have been proposed to identify a second-order plus dead-time (SOPDT) model depending on different types of response, i.e., underdamped, mildly underdamped, or overdamped. However, such a SOPDT model does not adequately describe non-minimum-phase systems. Further, though model parameters can be easily calculated using several points from the system response, such graphical methods may not be robust to noise. Further, though most tests can be done in open-loop, the plant model identification in closed-loop operation is also an important practical issue. In some cases the plant can be operated in open-loop with difficulties or a control may already exist and it is not possible to open the loop. However, most existing closed-loop identification methods suffer from one or more of the following inherent drawbacks: not robust to measurement noise; an FOPDT model can only be reconstructed; and/or the controller is restricted to the proportional type.

Since a relay feedback test is successful in many process control applications, it has been integrated into commercial controllers. Through years of experience, it is realized that the main problems with the standard relay test are as follows. (i) Due to the adoption of describing function approximation, the estimation of the critical point is not accurate in nature. (ii) Only crude controller settings can be obtained on the single point identified. Several modified relay feedback identification methods have been reported (Li and Eskinat 1991, Leva 1993, Palmor and Blau 1994, Wang et al. 1999a). Additional linear components (or varying hysteresis width) have to be introduced and additional relay tests have to be performed to identify two or more points on the process frequency response. These methods are time consuming and the resulting estimation is still approximate in nature since they actually make repeated use of the standard method. Consequently, it is important to develop techniques for identifying multiple and accurate points on the process frequency response from a single relay test, which is necessary for enhancement of control performance and for auto-tuning of advanced controllers.

Over and above the subject of single variable process identification, multivariable counterpart is another topic of strong interest and need to be studied more thoroughly. Processes inherently having more than one variable to be controlled at the output are frequently encountered in the industries and are known as multivariable or multi-input multi-output (MIMO) processes. Interactions usually exist between control loops, and this causes the renowned difficulty in their identification and control compared with single-input single-output (SISO) processes. Though there are many methods available for single-variable process identification from the relay or step test operated in open-loop or in closed-loop, most of them show no extension to multivariable cases. Further, most of the existing multivariable identification methods assume the absence of inverse response (non-minimum-phase behaviour), oscillating behaviour and/or time delays (Ham and Kim 1998). In Melo and Friedly (1992), a frequency response technique for a single-variable system is extended to a multivariable system, where frequency response characteristics are obtained utilizing a closed-loop approach. However, no process model is generated from the procedures. In Ham and Kim (1998), a closed-loop procedure of the process identification in multivariable systems using a rectangular pulse set-point change is proposed. The test signal is not so widely used and understandable to control engineers and only a FOPDT model can be obtained for each element. Therefore, there is high demand for a general identification scheme for multivariable systems, which can cover many different experimental tests in a unified framework.

The identification of the process dynamics may not be the final target in many applications. Further, control engineers are typically interested in the controller design based on the process information obtained. The majority of the single-loop controllers used in industry are of PID type (Astrom and Hagglund 1984a). However, despite the fact that the use of PID control is well established in process industries, many control loops are still found to perform poorly. In spite of the enormous amount of research work reported in the literature, tuning a good PID controller is still recognized as a rather difficult task. It would hence be desirable to develop a design method that works universally with high performance for general processes. Simple controllers like PLD are adequate for benign process dynamics. They will rapidly lose their effectiveness when the process deadtime is much larger than the process time constant. Advanced control strategies such as the internal model control (IMC) would have to be considered to achieve higher performance. The advantages of IMC are exploited in many industrial applications (Morari and Zafiriou 1989). In spite of the effectiveness of the control scheme, the internal model control has disadvantages that hindered its wider use in industry. In cases with large modeling errors, its performance will not be satisfactory. Besides, for a high-order model, the resulting controller derived will be of high order, and the implementation of the IMC control scheme is sometimes costly. Therefore, a new internal model control scheme which has a simpler design and implementation will be welcomed by the related art.

The goal of controller design to achieve satisfactory loop performance has also posed a great challenge in the area of multivariable control design. For multivariable PID control, Koivo and Tantuu (1991) give a recent survey of MIMO PI/PID techniques. These controllers are mainly aimed at decoupling the plant at certain frequencies. However, theses methods are both manual and time consuming in nature. In addition, the control performance of the closed loop system is usually not so satisfactory, especially in the case of large interaction and long dead time. It is thus appealing to extend the developed single-variable PID controller design methods to multivariable systems. It is easy to understand that PID controllers could be inadequate when applying to very complex SISO processes. The more frequently encountered case is that the dynamics of individual channels are still simple but as there are more output variables to be controlled, the interactions existing between these variables can give rise to very complicated equivalent loops for which PID control is difficult to handle. More importantly, the interaction for such a process is too difficult to be compensated for by PID, leading to very bad decoupling performance and causing poor loop performance. Thus, PID control even in multivariable form may fail. Higher-order controllers with an integrator are necessary to achieve high performance.

Signals are often manipulated in digital form to achieve higher performance to implement the process identification and controller design methods with micro-processors. Conversion of a model between continuous S-domain and discrete Z-domain is often encountered in these applications. Quite a number of approaches of converting a model between S-domain and Z-domain have been reported. Commonly used methods are Tustin approximation with or without frequency pre-warping, zero-pole mapping equivalent, Triangle hold equivalent, etc. (Rattan 1984, Franklin et al. 1990). Tustin (or Bilinear) approximation is one of the most popular methods, and is given by Tabak (1971). This method uses the approximation $$z = e^{sT} \approx \frac{1+sT/2}{1-sT/2} \quad (2)$$

to relate s-domain and z-domain transfer functions, where T is the sampling interval of the discrete system. Those common conventional methods are straightforward and easy to use. However, serious performance degradation may be observed when the sampling frequency is low. In real life, the sampling frequency of a digital system is often limited by a microprocessor bandwidth, costs, etc. The resultant performance of a low sampling frequency digital system may not be guaranteed if the conventional conversion methods are used (Rafee et al. 1997). Besides, when a system contains delay, then the conversion will be quite complex using classical methods. Though some special approaches to the solution have been developed recently, the algorithms proposed by the related art are either too complicated or are state-space based, which are only applicable for delay-free cases. Thus, the conventional methods are still widely used in industry.

Nowadays, most control designs focus on set-point response, and overlook disturbance rejection performance. However, in practice it is well known (Astrom and Hagglund 1995) that the load disturbance rejection is of primary concern for any control system design, and is even the ultimate objective of process control, where the set-point may be kept unchanged for years (Luyben 1990). In fact, countermeasure of disturbance is one of the top factors for successful and failed applications (Takatsu and Itoh 1999). If the disturbance is measurable, feedforward control is a useful tool for cancelling its effect on the system output (Ogata 1997). One possible way to reject the unmeasurable disturbance is to rely on the single controller in the feedback system, where trade-off has to be made between the set-point response and disturbance rejection performance (Astrom and Hagglund 1995, McCormack and Godfrey 1998). A better approach is to introduce additional compensators to the feedback system to handle this problem. Recently, in the filed of the mechatronics servo control, a compensator called a disturbance observer is introduced by Ohnishi (1987). The disturbance observer estimates the equivalent disturbance as the difference between the actual process output and the output of the nominal model. The estimate is then fed to a process inverse model to cancel the disturbance effect on the output. One crucial obstacle to the application of a disturbance observer to process control is the process time-delay (or dead-time) which exists in most industrial processes. The inverse model then contains a pure predictor that is physically unrealizable. Therefore, it would be desirable to create a general scheme for disturbance rejection control for time-delay processes.

The aforementioned technical papers and descriptions of the related art that have been referenced in the above description of the background art are described in greater detail hereinafter. A full bibliographic listing of each of the applicable references is recited hereinafter in order of first appearance, the entirety of each of which is herein incorporated by reference.

Strejc, V. (1980). Least squares parameter estimation. *Automatica* 16(5), 535–550; Astrom, K. J. and T. Hagglund (1995). PID Controllers: Theory, Design, and Tuning, 2nd Edition. Instrument Society of America. NC, USA; Mamat, R. and P. J. Fleming (1995). Method for on-line identification of a first order plus dead-time process model. Electronics Letters 31(15), 1297–1298; Rangaiah, G. P. and P. R. Krishnaswamy (1996a). Estimating second order dead time parameters from underdamped process transients. Chem. Eng. Sci. 51(7), 1149–1155; Rangaiah, G. P. and P. R. Krishnaswamy (1996b). Estimating second order plus dead time model parameters. Ind. Eng. Chem. Res. 33(7), 1867–1871; Li, W. and E. Eskinat (1991). An improved auto-tune identification method. Ind. Eng. Chem. Res. 30, 1530–1541; Leva, A. (1993). PID auto-tuning algorithm based on relay feedback. IEE Proceedings-D: Control Theory and Applications 140(5), 328–338; Palmor, Z. J. and M. Blau (1994). An auto-tuner for smith dead time compensator. Int J. Control 60(1), 117–135; Wang, L., M. L. Desarmo and W. R. Cluett (1999a). Real-time estimation of process frequency response and step response from relay feedback experiments. Automatica 35(8), 1427–1436; Ham, T. W. and Y. H. Kim (1998). Process identification and PID controller tuning in multivariable systems. J. Chem. Eng. Japan 31(6), 941–949; Melo, D. L. and J. C. Friedly (1992). On-line, closed-loop identification of multivariable systems. Ind. Eng. Chem. Res. 31(1), 274–281; Astrom, K. J. and T. Hagglund (1984a). Automatic tuning of simple regulators. In: Proceedings of the 9th IFAC World Congress. Budapest. pp. 1867–1872; Morari, M. and E. Zafiriou (1989). Robust Process Control. Prentice Hall: Englewood Cliffs. NJ; Rattan, K. S. (1984). Digitalization of existing continuous control system. IEEE Trans. Aut. Control 29(3), 282–285; Franklin, G. F., J. D. Powell and M. L. Workman (1990). Digital Control of Dynamic Systems. Addison Wesley. Reading, Mass.; Tabak, D. (1971). Digitalization of control systems. Computer Aided Design 3(2), 13–18; Rafee, N., T. Chen and O. Malik (1997). A technique for optimal digital redesign of analog controllers. IEEE Trans. Contr. Syst. Technol. 51(1), 89–99; Luyben, W. L. (1990). Process Modeling, Simulation and Control for Chemical Engineers. McGraw-Hill International Editions. New York; Takatsu, H. and T. Itoh (1999). Future needs for control theory in industry report of the control technology survey in Japanese industry. IEEE Trans. Contr. Syst. Technol. 7(3), 298–305; Ogata, K. (1997). Modern Control Engineering, 3rd Edition. Prentice Hall. NY, USA; McCormack, A. S. and K. R. Godfrey (1998). Rule-based autotuning based on frequency domain identification. IEEE Trans. Contr. Syst. Technol. 6(1), 43–61; and Ohnishi, K. (1987). A new servo method in mechatronics. Trans. Jpn. Soc. Elec. Eng. 107-D, 83–86.

SUMMARY OF THE INVENTION

The present invention overcomes the shortcomings associated with conventional methods, and achieves other advantages not realized by the background art.

An object of this invention is to provide simple yet robust identification methods based on a step test, which can give a continuous transfer function with time-delay for the process. For a relay feedback test, information of more points needs to be obtained accurately and robustly. The obtained process information is further used for controller tuning to produce enhanced performance. For implementation, a model conversion scheme is developed to give high performance conversions between continuous and discrete systems. Further, a general control scheme for disturbance rejection is presented.

For the direct identification of continuous time-delay systems from step responses, new linear regression equations are directly derived from the process differential equation. The regression parameters are then estimated without iterations, and an explicit relationship between the regression parameters and those in the process are given. Due to use of the process output integrals in the regression equations, the resulting parameter estimation is very robust in the face of large measurement noise in the output. The proposed method is detailed for a FOPDT model and a SOPDT model with one zero (SOPDTZ), which can approximate most practical industrial processes, covering monotonic or oscillatory dynamics of minimum-phase or non-minimum-phase processes. Such a model can be obtained without any iteration.

The method is also extended to closed-loop tests, while retaining the simplicity and robustness. The method can accommodate a wide range of tests such as step and relay provided that the test produces steady state responses. Using the FFT, the process frequency response is first calculated from the recorded process input and output time responses to the closed-loop test. Then the process step response is constructed using the inverse FFT. A SOPDTZ model is thus obtained with the developed open-loop identification method.

For the relay identification, a new structure called a cascade relay is presented that can effectively excite a process not only at the process critical frequency $\omega_c$, but also at $0.5\omega_c$, and $1.5\omega_c$. Guidelines for relay parameters selection are suggested. The process frequency response at multiple frequencies can be accurately estimated from one relay test using the FFT algorithm. The proposed method is robust to noise and step-like load disturbance. The technique can also be easily extended to identify other frequency response points of interest.

For single variable control system, a new IMC-based single loop controller design is proposed. Model reduction technique is employed to find the best single-loop controller approximation to the IMC controller. Compared with the existing IMC-based methods, the proposed design is applicable to a wider range of processes, and yields a control system closer to the IMC counterpart. It can also be automated for on-line tuning. Users have the option to choose between PID and high-order controllers to better suit applications. It turns out that high-order controllers may be necessary to achieve high performance for essentially high-order processes.

The single-variable identification method is further extended to multivariable systems. The method of the present invention is applicable to various test scenarios, covering step/relay and open-loop/closed-loop ones. For multivariable control, an IMC-based controller design method for MIMO system is proposed. The design of feedback controller are based on the fundamental relations under decoupling of a multivariable process in IMC scheme. The objective loop transfer functions are characterized in terms of their unavoidable non-minimum phase elements. According to those characteristics, a controller design for best achievable performance is presented.

A new algorithm is proposed to convert a S-domain model to a Z-domain model. The resultant Z-domain model is much closer to the S-domain one than those obtained by conventional conversion schemes. The algorithm adopts the standard recursive least squares (RLS) approach. The computation is trivial and can be easily implemented online. It can handle both parametric and non-parametric models, while conventional conversion methods only handle parametric models. It is very flexible and applicable to Z-domain to S-domain model conversion, sampling rate selection, re-sampling, time delay system conversion, and model order selection.

A general control scheme for disturbance rejection is developed as an extension of the disturbance observer used in mechatronics. It is applicable to time-delay processes. It is shown that the proposed control can reduce disturbance response significantly in general and reject periodic disturbance asymptotically in particular.

These and other objects of the present invention are accomplished by a method for identification of a continuous time-delay system from a process step response, said method comprising the steps of applying an open-loop step test and recording at least one output time response; obtaining at least one linear regression equation from the at least one output time response; estimating the regression parameters by an LS method; and recovering the process model coefficients for the continuous time-delay system using an explicit relationship between the regression parameters and the regression parameters in the actual process.

These and other objects of the present invention are accomplished by a method for closed-loop identification of a continuous time-delay system, comprising the steps of applying a closed-loop test that attains a steady state response or stationary oscillations at the end of test; recording a process input response and an output time response for the closed-loop test; using a FFT to calculate the process frequency response; using an inverse FFT to construct the process step response; applying an open-loop identification method to obtain the process model.

These and other objects of the present invention are accomplished by a cascade relay feedback system for exciting a process at a process critical frequency $\omega c$, said cascade relay system including a first loop; a second loop; a master relay in the second loop, wherein said cascade relay system permits persistent excitation at $0.5\omega c$ and $1.5\omega c$; and a slave relay in the first loop, wherein said cascade relay system can excite said process at said process critical frequency, $\omega c$.

These and other objects of the present invention are accomplished by a controller design method for a single variable process using IMC principles, said method comprising the steps of specifying an initial value for a tuning parameter according to a performance limitation of single loop control system due to non-minimum phase elements; specifying a type of controller; using an LS method for generating the controller parameters and evaluating a corresponding approximation error; and completing said design method if the corresponding approximation error satisfies a specified approximation threshold.

These and other objects of the present invention are accomplished by a method for identifying a multivariable process, said method comprising the steps of bringing the process to a constant steady state; specifying a test type and a test mode; performing a sequential experiment and recording all the process input and output responses; calculating a process frequency response; constructing a process step response; and estimating a process model These and other objects of the present invention are accomplished by the controller design method for a multivariable process using multivariable decoupling and IMC-principles, said method comprising the steps of specifying an objective closed-loop transfer function matrix with each diagonal element taking into account time delay and non-minimum phase zeros; using an LS method to find a PID controller and evaluating a corresponding approximation error; and completing said design method if the corresponding approximation error satisfies a specified approximation threshold These and other objects of the present invention are accomplished by a method for high performance conversion between a continuous-time system and a discrete-time system, said method comprising the steps of specifying an initial weighting function and an initial model; conducting a RLS approximation to give a rational transfer function; updating the weighting function according to the last RLS approximation; and repeating said conducting step and said updating step until a corresponding approximation satisfies a specified approximation threshold.

These and other objects of the present invention are accomplished by a method for disturbance compensation for a time-delay process using a disturbance observer, said method comprising the steps of estimating a process model; determining if a delay free part of the model is of minimum-phase, and factorizing the delay free part of the model into a minimum-phase part and non-minimum-phase part if said delay free part of the model is not in minimum phase; specifying a filter to make an inversed minimum-phase part of the model proper; and approximating a pure predictor by choosing parameters according to a suggested guideline for rejecting general disturbance or specifying the time-delay in the disturbance observer according to a suggested guideline for rejecting periodic disturbance.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus do not limit the present invention.

DETAILED DESCRIPTION OF THE PREFERRED EMBODIMENTS

Figure 1A:
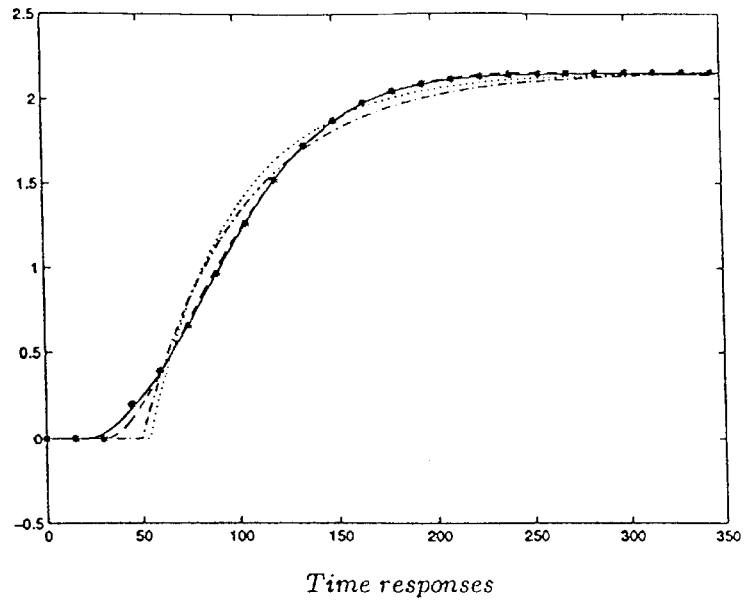
FIGS. 1(a)–1(b) are graphical views of step and frequency responses for actual and estimated process models according the present invention.

1. SISO Processes Identification from Open-Loop Step Test

Suppose that a time-invariant stable process is represented by $$Y(s) = G(s)U(s) = \frac{b_1 s^{n-1} + b_2 s^{n-2} + \ldots + b_{n-1} s + b_n}{s^n + a_1 s^{n-1} + \ldots + a_{n-1} s + a_n} e^{-Ls} U(s), \quad (3)$$

or equivalently by $$y^{(n)}(t) + a_1 y^{(n-1)}(t) + \ldots + a_{n-1} y^{(1)}(t) + a_n y(t) = b_1 u^{(n-1)}(t-L) + b_2 u^{(n-2)}(t-L) + \ldots + b_{n-1} u^{(1)}(t-L) + b_n u(t-L), \quad (4)$$

where $L>0$. For an integer $m \geq 1$, define $$\int_{[0,t]}^{(m)} f = \int_0^t \int_0^{\tau_m} \ldots \int_0^{\tau_2} f(\tau_1) d\tau_1 \ldots d\tau_m.$$

Under zero initial conditions, $$\int_{[0,t]}^{(m)} u(t-L) = \frac{1}{m!}(t-L)^m h.$$

Integrating (4) n times gives $$y(t) = -a_1 \int_{[0,t]}^{(1)} y - a_2 \int_{[0,t]}^{(2)} y \ldots - a_{n-1} \int_{[0,t]}^{(n-1)} y - a_n \int_{[0,t]}^{(n)} y + \quad (5)$$

$$hb_1(t-L) + \frac{1}{2}hb_2(t-L)^2 + \ldots + \frac{1}{(n-1)!}hb_{n-1}(t-L)^{n-1} + \frac{1}{n!}hb_n(t-L)^n,$$

$$= -a_1 \int_{[0,t]}^{(1)} y - \ldots - a_n \int_{[0,t]}^{(n)} y + ht^0 \sum_{j=1}^n \frac{b_j(-L)^j}{j!} +$$

$$ht^1 \sum_{j=1}^n \frac{b_j(-L)^{j-1}}{(j-1)!} + \frac{ht^2}{2!} \sum_{j=2}^n \frac{b_j(-L)^{j-2}}{(j-2)!} + \ldots +$$

$$\frac{ht^{n-1}}{(n-1)!} \sum_{j=n-1}^n \frac{b_j(-L)^{j-(n-1)}}{1!} + \frac{ht^n}{n!} b_n.$$

Define $$\begin{cases} \gamma(t) = y(t), \\ \phi^T(t) = \left[ -\int_{[0,t]}^{(1)} y, \ldots, -\int_{[0,t]}^{(n)} y, h, ht, \frac{ht^2}{2!}, \ldots, \frac{t^n h}{n!} \right], \\ \theta^T = \left[ a_1, \ldots, a_n, \sum_{j=1}^n \frac{b_j(-L)^j}{j!}, \sum_{j=1}^n \frac{b_j(-L)^{j-1}}{(j-1)!}, \ldots, \sum_{j=n-1}^n b_j(-L)^{j-(n-1)}, b_n \right]. \end{cases} \quad (6)$$

Then (5) can be expressed as $$\gamma(t) = \phi^T(t)\theta, \text{ if } t \geq L.$$

Choose $t=t_i$ and $L \leq t_1 < t_2 < \ldots < t_N$. Then $$\Gamma = \Phi\theta, \quad (7)$$

where $\Gamma = [\gamma(t_1), \gamma(t_2), \ldots, \gamma(t_N)]^T$, and $\Phi = [\phi(t_1), \phi(t_2), \ldots, \phi(t_N)]^T$.

In (7), the θ which minimizes the following equation error, $$\min_\theta (\Gamma - \Phi\theta)^T(\Gamma - \Phi\theta),\qquad(7a)$$

is given by the least square solution:

$$\hat{\theta} = (\Phi^T\Phi)^{-1}\Phi^T\Gamma.\qquad(8)$$

In practice, the true process output $\hat{y}$ may be corrupted by measurement noise $\upsilon(t)$, and $$y = \hat{y} + \upsilon,\qquad(9)$$

where $\upsilon$ is supposed to be a strictly stationary stochastic process with zero mean. In this case, (7) is again modified to $$\Gamma = \Phi\theta + \Delta,\qquad(10)$$

where $\Delta = [\delta_1, \delta_2, \ldots, \delta_N]^T$, and $$\delta_E = [-\upsilon(t_\tau) - a_1\int_{[0,t_\tau]}^{(1)}\upsilon - a_2\int_{[0,t_\tau]}^{(2)}\upsilon \ldots - a_n\int_{[0,t_1]}^{(n)}\upsilon].$$

For our case, the instrumental variable matrix Z is chosen as $$Z = \begin{bmatrix} \frac{1}{t_1^{n+1}} & \frac{1}{t_1^{n+2}} & \cdots & \frac{1}{t_1^{2n}} & 1 & t_1 & \cdots & t_1^n \\ \frac{1}{t_2^{n+1}} & \frac{1}{t_2^{n+2}} & \cdots & \frac{1}{t_2^{2n}} & 1 & t_2 & \cdots & t_2^n \\ \vdots & \vdots & \ddots & \vdots & \vdots & \vdots & \ddots & \vdots \\ \frac{1}{t_N^{n+1}} & \frac{1}{t_N^{n+2}} & \cdots & \frac{1}{t_N^{2n}} & 1 & t_N & \cdots & t_N^n \end{bmatrix},\qquad(11)$$

and the estimate is given by $$\hat{\theta} = (Z^T\Phi)^{-1}Z^T\Gamma.\qquad(12)$$

Once θ is estimated from (12), one has to recover the process model coefficients: L, $a_1$ and $b_i$, i=1, 2, ..., n. It follows from (6) that $$a_k = \theta_k\ k=1,2,\ldots,n;$$

and $$\begin{bmatrix} -L & \frac{(-L)^2}{2!} & \frac{(-L)^3}{3!} & \cdots & \frac{(-L)^{n-1}}{(n-1)!} & \frac{(-L)^n}{n!} \\ 1 & -L & \frac{(-L)^2}{2!} & \cdots & \frac{(-L)^{n-2}}{(n-2)!} & \frac{(-L)^{n-1}}{(n-1)!} \\ 0 & 1 & -L & \cdots & \frac{(-L)^{n-3}}{(n-3)!} & \frac{(-L)^{n-2}}{(n-2)!} \\ 0 & 0 & 1 & \cdots & \frac{(-L)^{n-4}}{(n-4)!} & \frac{(-L)^{n-3}}{(n-3)!} \\ \vdots & \vdots & \vdots & \ddots & \vdots & \vdots \\ 0 & 0 & 0 & \cdots & 1 & -L \\ 0 & 0 & 0 & \cdots & 0 & 1 \end{bmatrix}\begin{bmatrix} b_1 \\ b_2 \\ b_3 \\ \vdots \\ b_{n-1} \\ b_n \end{bmatrix} = \begin{bmatrix} \theta_{n+1} \\ \theta_{n+2} \\ \theta_{n+3} \\ \theta_{n+4} \\ \vdots \\ \theta_{2n} \\ \theta_{2n+1} \end{bmatrix}.\qquad(13)$$

The last n rows of (13) give $b_i$ in terms of L:

$$\begin{bmatrix} b_1 \\ b_2 \\ \vdots \\ b_{n-1} \\ b_n \end{bmatrix} = \begin{bmatrix} 1 & L & \frac{L^2}{2!} & \cdots & \frac{(L)^{n-2}}{(n-2)!} & \frac{(L)^{n-1}}{(n-1)!} \\ 0 & 1 & L & \cdots & \frac{(L)^{n-3}}{(n-3)!} & \frac{(L)^{n-2}}{(n-2)!} \\ \vdots & \vdots & \vdots & \ddots & \vdots & \vdots \\ 0 & 0 & 0 & \cdots & 1 & L \\ 0 & 0 & 0 & \cdots & 0 & 1 \end{bmatrix} \cdot \begin{bmatrix} \theta_{n+2} \\ \theta_{n+3} \\ \theta_{n+4} \\ \vdots \\ \theta_{2n} \\ \theta_{2n+1} \end{bmatrix}.\qquad(14)$$

Substituting (14) into the first row of (13) yields the following n-degree polynomial equation in L:

$$\sum_{i=0}^{n} \frac{\theta_{n+i+1}}{i!} L^i = 0.\qquad(15)$$

Equation (15) has n roots for L. In selecting a suitable solution, a rule of thumb is to choose one that leads to the minimal output error between the step response of the estimated model and the recorded one from the actual process. Once L is determined, $b_i$ can be easily computed from (14).

For the FOPDT modeling $$G(s) = \frac{b}{s+a}e^{-Ls},$$

(6) becomes $$\begin{cases} \gamma(t) = y(t), \\ \phi^T(t) = \left[-\int_0^t y(\tau)d\tau, h, ht\right], \\ \theta^T = [a, -bL, b], \end{cases}$$

and the model parameters are recovered from $$[a, b, L]^T = \left[\theta_1, \theta_3, -\frac{\theta_1}{\theta_3}\right]^T.$$

For the SOPDT modeling $$G(s) = \frac{b_1 s + b_2}{s^2 + a_1 s + a_2}e^{-Ls},$$

(6) becomes $$\begin{cases} \gamma(t) = y(t), \\ \phi^T(t) = \left[-\int_0^t y(\tau)d\tau, -\int_0^t\int_0^\tau y(\tau_1)d\tau_1 d\tau, h, th, \frac{1}{2}t^2 h,\right] \\ \theta^T = \left[a_1, a_2, -b_1 L + \frac{1}{2}b_2 L^2, b_1 - b_2 L, b_2,\right] \end{cases}$$

and the model parameters are recovered from $$[a_1, a_2, b_1, b_2, L]^T = \left[\theta_1, \theta_2, \beta, \theta_5, \frac{-\theta_4 + \beta}{\theta_5}\right]^T$$

with $$\beta = \begin{cases} -\sqrt{\theta_4^2 - 2\theta_5\theta_3}, & \text{if a inverse response is detected;} \\ \sqrt{\theta_4^2 - 2\theta_5\theta_3}, & \text{otherwise.} \end{cases}$$

Choice of $t_1$ It is noted from the above development that the first sample $y(t_1)$ should not be taken into the algorithm until $t_1 \geq L$, when the output deviates from the previous steady state. In practice, the selection of the logged y(t) after $t_\tau \geq L$ can be made as follows. Before the step test starts, the process output will be monitored for a period called the 'listening period', during which the noise band $B_n$ can be found. After a step change in the process input is applied, the time t at which y(t) satisfies $$abs(mean(y(t-\tau,t))) > 2B_n$$

is considered to meet t>L, where $\tau$ is user-specified time interval and is used for averaging.

Choice of $t_N$ The initial part of the step response contains more extensive high frequency information, while the part of the response after the steady state contains only zero frequency information, i.e., at $\omega=0$. Extensive simulation suggests that $t_N$ be set at $1.2\sim1.5T_{set}$, where $T_{set}$ is the settling time, defined as the time required for the process to settle within ±2% of its steady state.

Choice of N The computational effort becomes heavy if too many samples are taken into consideration, which leads to the large size of $\Phi$. Moreover, $\Phi^T\Phi$ or $Z^T\Phi$ may tend to become ill-conditioned for very large N and this may cause the computational difficulty in estimating $\hat{\theta}$. Therefore, N has to be limited. For the case with a large number of recorded data, the default value of N is recommended to be 200, and $t_\tau$ may be set as $$t_i + t_1 + \frac{i-1}{N}(t_N - t_1), \quad i = 1, 2, \ldots, N.$$

For a better assessment of its accuracy, identification errors in both the time domain and the frequency domain are considered. The comparison is made with the area method, to show the performance enhancement. The time domain identification error is measured over the transient period by standard deviation:

$$\varepsilon = \frac{1}{N}\sum_{k=1}^{N}[y(kT_s) - \hat{y}(kT_s)]^2, \quad (16)$$

where $y(kT_s)$ is the actual process output under a step change, while $\hat{y}(kT_s)$ is the response of the estimated process under the same step change. Once the identification is carried out, the model $\hat{G}(s)$ is available and the frequency domain identification error is measured by the worst-case error:

$$E = \max_{\omega \in [0,\omega_c]}\left\{\left|\frac{\hat{G}(j\omega) - G(j\omega)}{G(j\omega)}\right| \times 100\%\right\}, \quad (17)$$

where $G(j\omega_i)$ is the actual process frequency response. Here, the frequency range $[0, \omega_c]$ is considered, where $\angle G(j\omega_c) = -\pi$, since this range is the most significant for control design. To show the robustness of the proposed method, noise is introduced into the process output. In the context of system identification, noise-to-signal ratio defined (Haykin 1989) by $$NSR = \frac{\text{mean(abs(noise))}}{\text{mean(abs(signal))}}.$$

is used to represent noise level.

EXAMPLE

Consider a high-order process (Maffezzoni and Rocco 1997):

$$G(s) = 2.15\frac{(-2.7s+1)(158.5s^2+6s+1)}{(17.5s+1)^4(20s+1)}e^{-14s}.$$

Figure 1B:
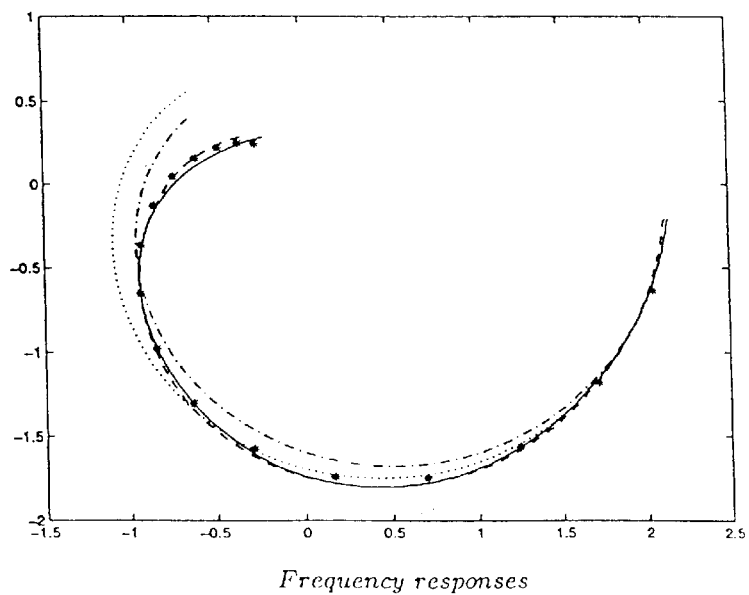

A unit step is performed, and the process input and output responses are recorded. In the noise-free case, the area method gives the model:

$$\hat{G}(s) = \frac{2.15}{46.69s+1}e^{-53.90s},$$

with $\epsilon=1.15\times10^{-2}$ and E=60.87%. The model estimated by the proposed method for FOPDT is $$\hat{G}(s) = \frac{0.0396}{s+0.0184}e^{-49.9839s},$$

with $\epsilon=8.6\times10^{-3}$ and E=48.12%. Our SOPDT model is $$\hat{G}(s) = \frac{0.0011}{s^2+0.0343s+0.0005}e^{-28.8861s},$$

with $\epsilon=4.0631\times10^{-4}$ and E=5.81%. For third-order plus dead time model (TOPDT), we have $$\hat{G}(s) = \frac{205.94s^2+5.25s+1.12}{10^4s^3+996.85s^2+38.24s+0.52}e^{-31.9265s},$$

with $\epsilon=2.0009\times10^{-4}$ and E=1.27%. It can be seen that the results of the proposed method are consistently better than that of area method. The estimation errors decrease with model order n. Especially from FOPDT to SOPDT, errors decrease dramatically, but the error decrease is not so great from SOPDT to TOPDT. In this case, an SOPDT model is good enough. Step and frequency responses of the actual and estimated models are shown in FIG. 1.

Identification was also carried out for other processes of various dynamics, and the results are listed in Table 1. Another case study is shown in Table 2. The process has an inverse response and noise levels were set at NSR=0%, 3%, 5%, 10%, 15%, 20%, 30%, 40% and 50%. The robustness of the proposed method is clearly seen.

2 Closed-Loop Identification from Open-Loop Step Test

Figure 2:
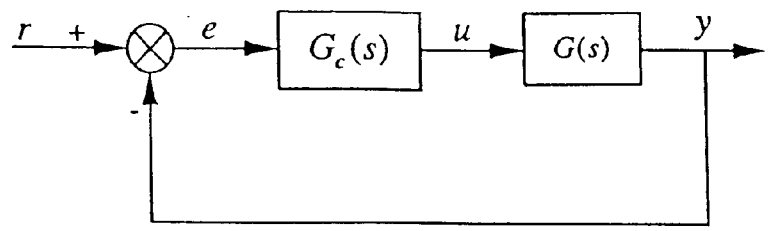
FIG. 2 is a schematic view of a conventional feedback control system.

Consider the conventional feedback control system shown in FIG. 2. The process G is under control of the pre-set controller $G_c$, whose parameters have been roughly tuned before but need to be re-tuned now due to poor performance caused by the previous crude tuning and/or process dynamics change. The proposed method will make use of an algorithm for robust identification of process transfer function model from the process step response presented previously. The idea here is to construct the process step response from any closed-loop test.

2.1 Test

Suppose that the system has been brought to a constant steady state with such a pre-tuned controller $G_c$. Now some closed-loop test is applied. A change in the reference, say step type, is activated. It should be pointed out that such a signal can be of other types. Alternatively, relay feedback can replace the controller $G_c$ temporarily for such a feedback test or act on the closed-loop. The control signal $u_c(t)$ and the process output $y_c(t)$ are recorded until a new steady state or stationary oscillation occurs.

2.2 Process Frequency Response

In our method, the frequency response of the process will be first calculated. At a first glance, it seems that the frequency responses $Y_c(j\omega)$ and $U_c(j\omega)$ of $y_c(t)$ and $u_c(t)$ can be easily obtained by directly taking the Fourier transform of these recorded $y_c(t)$ and $u_c(t)$, which would lead to the process frequency response:

$$G(j\omega) = \frac{Y_c(j\omega)}{U_c(j\omega)}.$$

Unfortunately, this operation is inapplicable and meaningless (Wang et al. 1997), as $y_c(t)$ and $u_c(t)$ are neither absolutely integrable nor periodic. Here, $y_c(t)$ is decomposed into the transient part $\Delta y_c(t)$ and the steady state part or the periodic stationary cycle part $Y_{cs}(t)$ as $$y_c(t) = \Delta y_c(t) + y_{cs}(t).$$

Similarly, $u_c(t)$ can be decomposed into $$u_c(t) = \Delta u_c(t) + u_{cs}(t).$$

If $y_c(t)$ and $u_c(t)$ have almost entered the steady states or the stationary oscillation status at $t=T_e$, both $\Delta y_c(t)$ and $\Delta u_c(t)$ are approximately zero afterwards The Fourier transform of $\Delta y_c(t)$ is then $$\Delta Y_c(j\omega) = \int_0^\infty \Delta y_c(t) e^{-j\omega t} dt \qquad (18)$$

$$\approx \int_0^{T_e} \Delta y_c(t) e^{-j\omega t} dt.$$

(18) can be computed at discrete frequencies, using the standard FFT technique, which is a fast algorithm for calculating the discrete Fourier transform (DFT).

The definition of the transfer function gives $$G(s) = \frac{Y(s)}{U(s)} = \frac{Y_{cs}(s) + \Delta Y_c(s)}{U_{cs}(s) + \Delta U_c(s)},$$

and the process frequency response is formally $$G(j\omega) \approx \frac{Y_{cs}(j\omega) + \Delta Y_c(j\omega)}{U_{cs}(j\omega) + \Delta U_c(j\omega)}.$$

Note $\Delta Y_c(j\omega)$ and $\Delta U_c(j\omega)$ can be obtained using the Fourier transform since the transient responses $\Delta u_c(t)$ and $\Delta y_c(t)$ decay to zero exponentially. In practice, they are calculated with the FFT. Thus, it follows that $$G(j\omega) \approx \frac{Y_{cs}(j\omega) + FFT(\Delta y_c(t))}{U_{cs}(j\omega) + FFT(\Delta u_c(t))}. \qquad (19)$$

If the test (say, a step test) gives a constant steady state of the output, $y_c(\infty)$, we have $$Y_{cs}(j\omega) = \frac{y_c(\infty)}{j\omega}. \qquad (20)$$

On the other hand, if the test (e.g. relay) causes stationary oscillations, it then follows from a lemma (Kuhfitting 1978) that $$Y_{cs}(j\omega) = \frac{1}{1 - e^{-j\omega T_c}} \int_0^{T_c} y_{cs}(t) e^{-j\omega t} dt, \qquad (21)$$

where $T_c$ is the period of the stationary oscillations in the process output $y_{cs}$. Similarly, the following expression can be obtained:

$$U_{cs}(j\omega) = \begin{cases} \dfrac{u_c(\infty)}{j\omega}, & \text{step test;} \\ \dfrac{1}{1 - e^{-j\omega T_c}} \displaystyle\int_0^{T_c} u_{cs}(t) e^{-j\omega t} dt, & \text{relay test.} \end{cases} \qquad (22)$$

With (20) or (21) and (22), process frequency response can be calculated from (19).

It is noted that the static gain of the process, $K_p$, can be also calculated (Nishikawa et al. 1984) from $$K_p = G(0) = \frac{y_c(\infty)}{u_c(\infty)}.$$

Alternatively, it can be calculated from a biased relay feedback test (Shen et al 1996). It should be pointed that the formula (19) assumes zero initial conditions. If the system has a non-zero operating point of $y_c(0)$ and $u_c(0)$, then $y_c(t)$, $y_c(\infty)$, $u_c(t)$ and $u_c(\infty)$ should be replaced by $y_c(t)-y_c(0)$, $y_c(\infty)-y_c(0)$, $u_c(t)-u_c(0)$ and $u_c(\infty)-u_c(0)$, respectively.

2.3 Construction of Process Step Response

Imagine that if the process input $u(t)$ is of the unit type, then $$Y(s) = G(s)\frac{1}{s}. \qquad (23)$$

It seems very easy to obtain the corresponding $y(t)$ by simply applying the inverse Fourier transform. However, since the steady state part of $y(t)$ is not absolutely integrable, such a calculation is meaningless as discussed before. To solve this obstacle, denote the output response by $y(t)$. It can be decomposed into $$y(t) = y(\infty) + \Delta y(t) = G(0) + \Delta y(t).$$

Applying the Laplace transform to both sides gives $$Y(s) = \frac{G(0)}{s} + \mathcal{L}\{\Delta y(t)\}. \qquad (24)$$

Bring (23) in, we have $$\mathcal{L}\{\Delta y(t)\} = \frac{G(s) - G(0)}{s}.$$

Applying, the inverse Laplace transform yields $$\Delta y(t) = \mathcal{L}^{-1}\left\{\frac{G(s) - G(0)}{s}\right\}.$$

Thus, using the IFFT, the process step response is constructed as $$y(t) \approx G(0) + IFFT\left(\frac{G(j\omega) - G(0)}{j\omega}\right). \quad (25)$$

2.4 Process Transfer Function

The open-loop identification method proposed before can be applied directly to estimate a FOPDT or SOPDTZ or even higher-order model

EXAMPLE

Consider a Plant $$G(s) = \frac{e^{-s}}{12s^2 + 8s + 1}.$$

An unit step is performed for the system under closed-loop PI control, where $k_c=0.4$ and $T_i=2$. Using the proposed method, the estimated SOPDT model is $$\hat{G}(s) = \frac{1.0001 e^{-0.9963s}}{12.0643s^2 + 8.0108s + 1},$$

which is almost identical to the actual process. The identification errors are $\epsilon=4.91\times 10^{-4}$ and $E=0.35\%$. Under the same test condition, Suganda's method gives the model (Suganda et al. 1998):

$$\hat{G}(s) = \frac{1.0000 e^{-0.9945s}}{12.0409s^2 + 7.9810s + 1},$$

where the identification errors are $\epsilon=2.85\times 10^{-3}$ and $E=0.45\%$. The improved accuracy is obvious, and this accuracy holds for other scenarios (Table 3).

Since the proposed method makes use of many points rather than one or two points on the process response and adopts a LS or an IV method, it is expected to be robust to noise. To demonstrate this, the process of $$G(s) = \frac{1.08 e^{-10s}}{(s+1)^2 (2s+1)^3}$$

is tested in the noisy case. The identification results of the process under different noise levels are listed in Table 4. These simulation examples show that the proposed method works well even when there is large measurement noise present.

3 Identification from Cascade Relay Feedback

Figure 3:
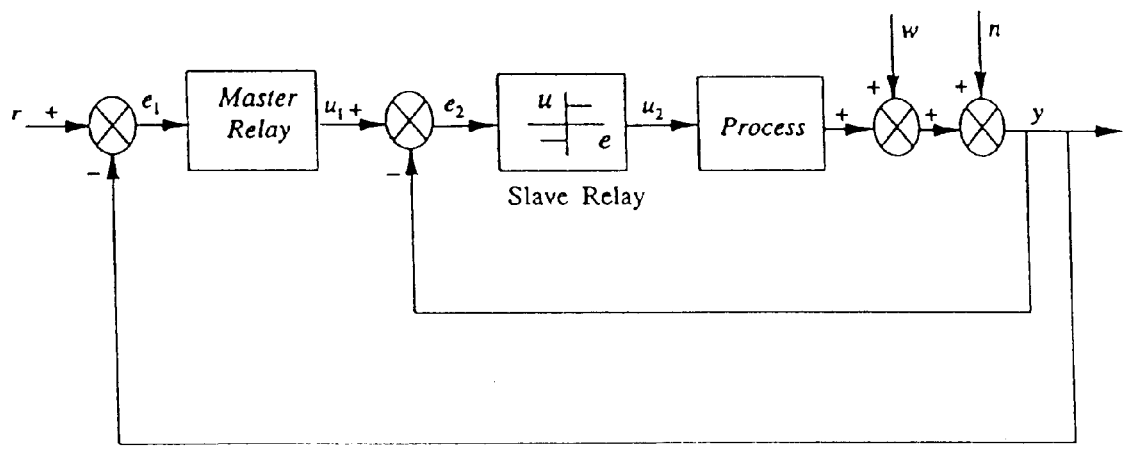
FIG. 3 is a schematic view of a cascade relay feedback system according to the present invention.

The proposed cascade relay feedback consists of a master relay in the outer loop and a slave relay in the inner loop, as shown in FIG. 3. The slave relay is just a standard relay with amplitudes of the sampled output $u_2(k)$ being $d_2$. With the inner loop closed, this relay can excite the process at the process critical frequency $\omega_c$ sufficiently. In order to additionally provide effective excitations to the process at other frequencies while maintaining the process output oscillation, the master relay in the outer loop is introduced with its output amplitude of $d_1$, and bias of $\mu_1$, and operated at the frequency of $0.5\omega_c$. It is realized by $$u_1(k) = \begin{cases} -u_1(k-1) + 2\mu_1, & \text{if } e_1(k-1) < 0 \text{ and } e_1(k) > 0; \\ u_1(k-1) - 2d_1, & \text{if } e_1(k-1) > 0 \text{ and } e_1(k) < 0; \\ u_1(k-1), & \text{otherwise.} \end{cases} \quad (26)$$

Figure 4:
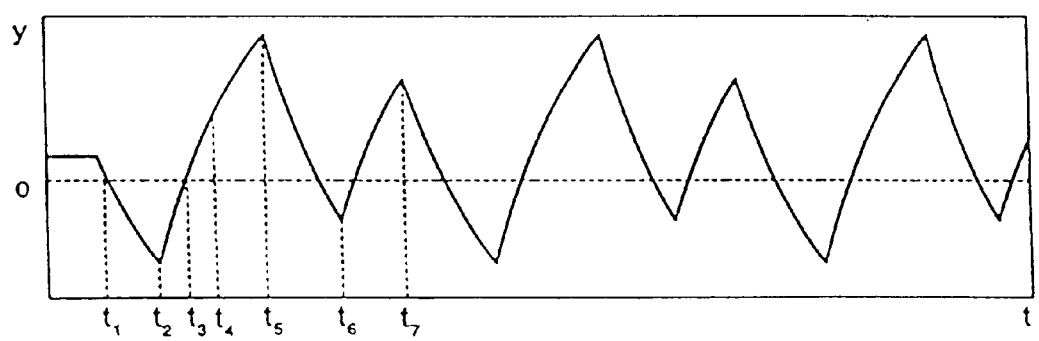
FIG. 4 is a graphical view of the waveforms for the outputs and the resultant output response from the cascade relay test according to the present invention.
Figure 4:
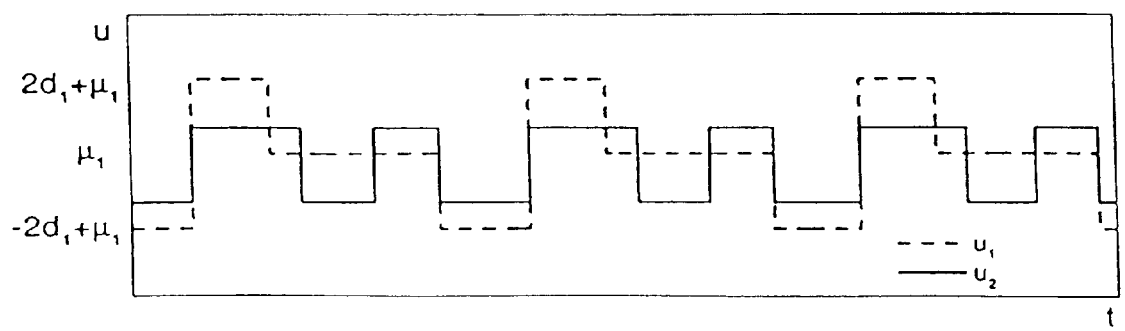
Figure 5A:
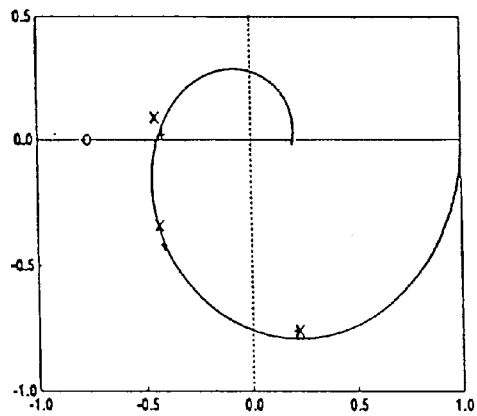
FIGS. 5(a)–5(d) are graphical views of the estimated frequency responses under noise N1=29% according to the present invention.
Figure 5B:
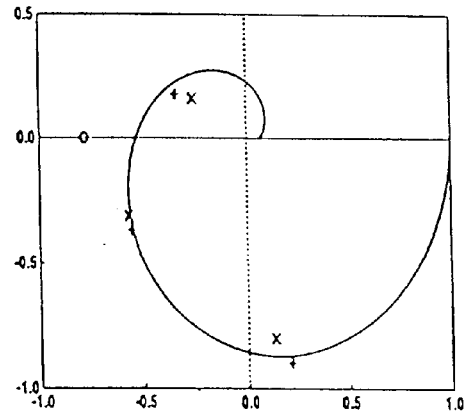
Figure 5C:
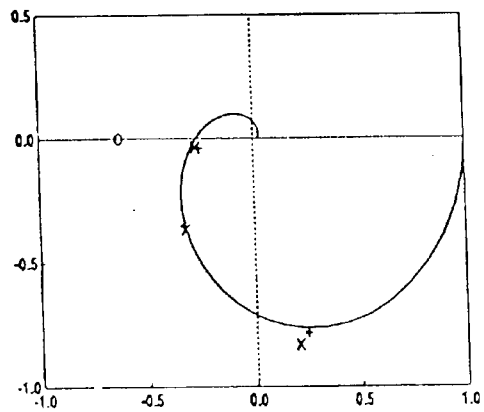
Figure 5D:
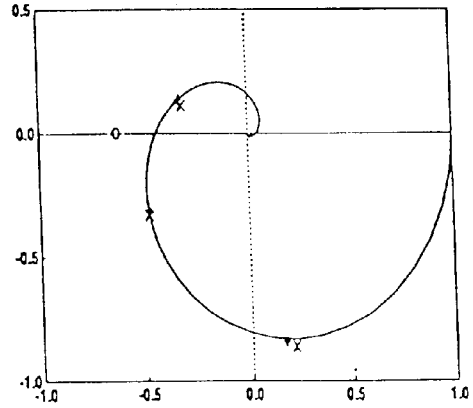
Figure 6A:
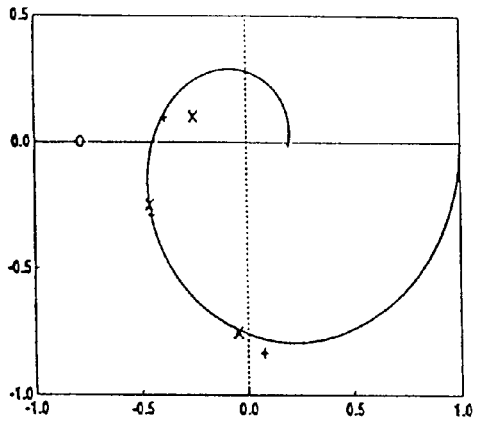
FIGS. 6(a)–6(d) are graphical views of the estimated frequency responses under noise N1=41% according to the present invention.
Figure 6B:
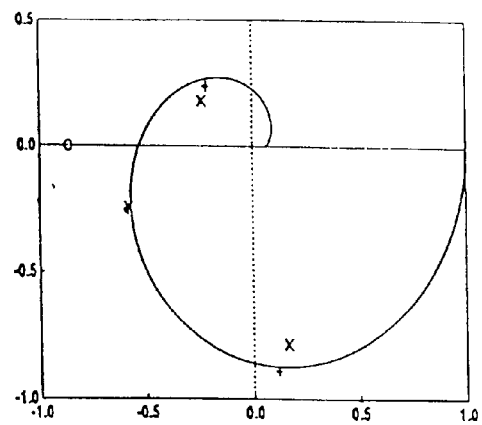
Figure 6C:
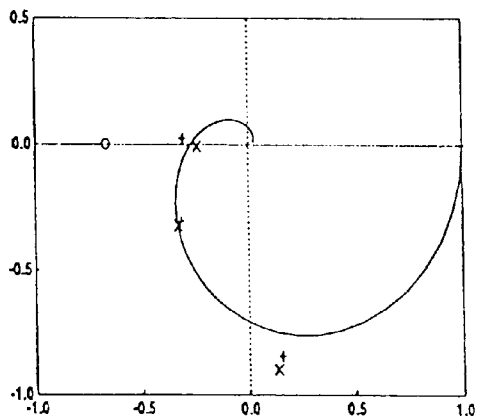
Figure 6D:
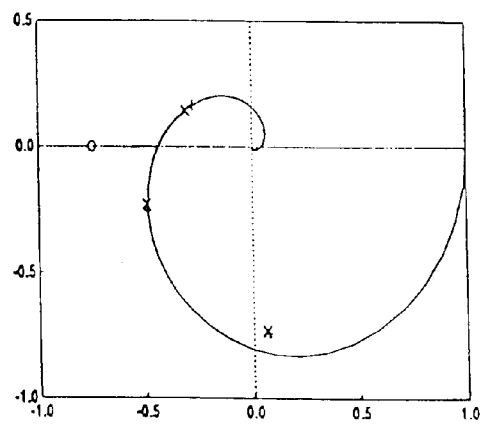

The sampled output $u_1(k)$ from the master relay is a periodic stair wave with three amplitudes of $2d_1+\mu_1, \mu_1$ and $-2d_1+\mu_1$. The introduction of this relay is to obtain persistent excitation at frequencies of $0.5\omega_c$ and $1.5\omega_c$ in addition to $\omega_c$. In this way, the process is stimulated by two different excitations whose periods are $T_c$ and $2T_c$ respectively. The waveforms for $u_1, u_2$, u and the resultant output response are shown in FIG. 4. The output will reach a stationary oscillation with the period close to $2T_c$. The bias $\mu_1$ is introduced to reduce possible unnecessary switchings due to noise and disturbances. One can see that the difference between the master relay output and process output will determine switchings in the slave relay. Since output of the master relay has three values as $2d_1+\mu_1, \mu_1$ and $-2d_1+\mu_1$, a load disturbance noise will not cause any relay switching unless its amplitude is larger than $\mu_1$. Hence, a suitable $\mu_1$ helps establish robust oscillations in the process output with two fundamental frequencies.

Due to two excitations in the input, y consists of frequency components at $$\frac{2\pi}{T_c}$$

and $$\frac{\pi}{T_c}$$

and their odd harmonics $$\frac{6\pi}{T_c}, \frac{10\pi}{T_c},$$

..., and $$\frac{3\pi}{T_c}, \frac{5\pi}{T_c},$$

..., respectively. For a linear process, the process frequency response can be obtained with the Fourier analysis as $$G(j\omega_i) = \frac{\int_0^{2T_c} y_s(t) e^{-j\omega_i t} dt}{\int_0^{2T_c} u_s(t) e^{-j\omega_i t} dt}, \quad i = 1, 2, \ldots, \quad (27)$$

where $$\omega_i = \frac{(2i-1)2\pi}{2^l T_c}, \quad l = 0, 1,$$

are the fundamental and their odd harmonic frequencies in $u_s$ and $y_s$, $u_s$ and $y_s$ are a period ($2T_c$) of the stationary oscillations of $u(k)$ and $y(k)$ respectively $G(j\omega_i)$ in (27) can be computed using the FFT algorithm (Morrison 1994) as $$G(j\omega_i) = \frac{FFT(y_s)}{FFT(u_s)}.$$

Thus, multiple points on frequency response can be identified from a single relay test accurately. The proposed method employs the FFT only once and the required computation burden is modest. Moreover, in principle, the proposed method can be extended to find other points on the frequency response. One can realize the master relay and generate $u_1$ as a periodic stair wave with more amplitudes than 3, which will generate y consisting of frequency components other than $\omega_c, \omega_c/2$, and their odd harmonics. Another possible way is to use more than one cascade outer loop in a relay test and find more points on the frequency response in one relay test. Practically, the information of three points on the process frequency response available from the proposed cascade relay method is usually adequate to represent the process dynamics and tune a good controller. Though more points than those can be identified from the extension as mentioned above, the structure will inevitably become more complicated for implementation.

In a realistic environment, the major concerns for any identification method are disturbance and noise. It should be noted that the proposed estimation (27) is unaffected by a step-like load disturbance w in FIG. 3, which is a common case in practice. This can easily be shown from (27) as $$\frac{\int_0^{2T_c}[y_s(t)+w(t)]e^{-j\omega_i t}dt}{\int_0^{2T_c}[u_s(t)+\bar{u}]e^{-j\omega_i t}dt} = \frac{\int_0^{2T_c}y_s(t)e^{-j\omega_i t}dt + w\int_0^{2T_c}e^{-j\omega_i t}dt}{\int_0^{2T_c}u_s(t)e^{-j\omega_i t}dt + \bar{u}\int_0^{2T_c}e^{-j\omega_i t}dt}$$

$$= \frac{\int_0^{2T_c}y_s(t)e^{-j\omega_i t}dt}{\int_0^{2T_c}u_s(t)e^{-j\omega_i t}dt}$$

$$= G(j\omega_i), \quad i = 1, 2, \ldots,$$

where $\omega_i$ has the same definition as in (27). As to the measurement noise n in the relay test, one can use a hysteresis (Astrom and Hagglund 1988) and/or a few periods of oscillations (Bi et al. 1997), depending on the noise level, to achieve the required degree of estimation robustness. It should also be noted that a non-zero initial condition of the process at the start of a relay test has no effect on the estimation because only stationary oscillations $u_s$ and $y_s$ after transient are used in the estimation, and they are independent of the initial condition.

The proposed identification method can be combined with some control tuning rules to form an auto-tuner for control systems. Due to the improved accuracy of the critical point estimation and the availablility of additional points, controllers can be fine-tuned. Most processes in the industry are open-loop stable, and it is conjectured (Astrom and Hagglund 1984b) that most of them will exhibit a stable limit cycle under the standard relay feedback. This is also true when the proposed cascade relay feedback is used. Extensive simulation also shows that stationary oscillation is obtained for most processes if the parameters are choose properly. In this section, relay parameter selection is discussed for the occurrence of stationary oscillation in the cascade relay test.

In general, processes are of high order and with certain nonlinearity. It is of common practice to use a first-order plus dead-time (FOPDT) model as an approximation to real processes (Luyben 1990):

$$G(s) = \frac{K_p}{\tau s + 1} e^{-Ls}. \quad (28)$$

It can be shown (Wang and Zhang 2000) that Consider the cascade relay feedback system of FIG. 3 with the process given by (28). If stationary oscillation with two different fundamental frequencies exists, then there hold $d_2K>0$ and $$\mu_1 < \min\left\{d_2K, d_2K\left(e^{\frac{L}{\tau}} - 1\right)\right\}. \quad (29)$$

This necessary condition obtained is helpful in choosing the bias $\mu_1$ for FOPDT and higher order processes as well. Other parameters can be chosen as suggested for the standard relay feedback test (Hang et al. 1993). In practice, the relay amplitude is adjusted so that the oscillation at the process output is about three times the amplitude of the noise. The hysteresis width may be selected on the basis of the noise level, for instance, two times larger than the noise amplitude.

In what follows, the proposed cascade relay is simulated for various processes for illustration. The process frequency response at $\omega = \pi/T_c$, $2\pi/T_c$ and $3\pi/T_c$ is considered since the frequency response in this region is especially important to controller design. The comparison is made with standard relay (Astrom and Hagglund 1984b) and parasite relay test (Bi et al. 1997). The relay parameters in these three cases are chosen such that the resultant output oscillations have almost the same amplitudes. For the standard relay test, (??) is also applied where only one point is considered, i.e., $\omega_i = \omega_c$.

EXAMPLE

Consider a FOPDT process:

$$G(s) = \frac{1}{5s+1} e^{-5s}.$$

In our relay test, the slave relay amplitude $d_1$ is chosen as 1, the master relay height $d_2$ is set to 1, and its bias $\mu_1$ is 0.5. For multiple-point estimation evaluation, the parasite relay test sets its standard relay amplitude as 0.5 and the parasitic relay height as 0.2×0.5 (Bi et al. 1997). For the standard relay test, its height is set as 1 and only one point $\omega_c$ on process frequency response is available and then used for calculating its E. In the noise-free case, the identification error E is 0.30% for the cascade relay test, 0.31% for the parasite relay test and 11.19% for the standard relay test, respectively. Afterwards, noise is introduced with band-limited white noise module in Matlab. The first part of the response is the "listening period", in which the noise bands of y(t) and u(t) are measured. Under this noise, the hystersis is here set as 0.3 for all these three relays. To reduce noise effect, especially in the case of large noise-to-signal ratio, we use the average of the last 2–4 periods of oscillations as the stationary oscillation period, depending on the noise level. Further, the accuracy of the standard relay test depends largely on the reliability of judging the period of the limit cycles. To derive a more accurate value of the period, 'averaging' technique (Wang et al. 1999b) is here applied over a reasonable number of zero crossings. With the use of hysteresis, the formula for calculating the ultimate gain is changed from (??) to (Hang et al. 1993)

$$k_u = \frac{4d}{\pi\sqrt{a^2 - \epsilon^2}},$$

where $\epsilon$ is the hysteresis width, and the ultimate period can still be calculated from the period of oscillation on the 'average' bases. With these noise rejection technique, under NSR=29%, E is 1.87% for the cascade relay test, 6.83% for the parasite relay and 10.01% for the relay test, respectively. With averaging 4 periods of stationary oscillations, the estimated frequency-responses under noise of $N_1$=29%, 41%, are shown in (a) of FIG. 5 and FIG. 6, respectively. Table 5 shows the identification accuracy under different relay tests with/without noise.

4 Single-Loop Controller Design Via IMC Principles

Figure 7:
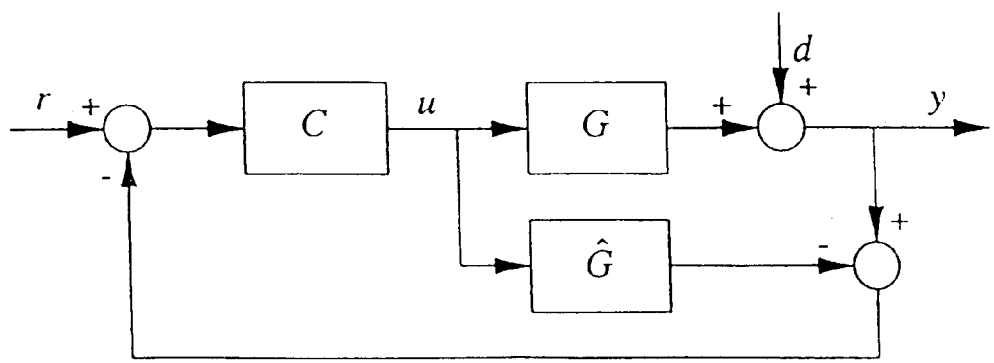
FIG. 7 is a schematic view of an Internal Mode Control (IMC) control system according to the present invention.

The schematic of the IMC system is depicted in FIG. 7, where G(s) is the given stable process to be controlled, $\hat{G}(s)$ a model of the process and C(s) the IMC primary controller. The design procedure for IMC systems is well documented (Morari and Zafiriou 1989). The model is factorized as $$\hat{G}(s) = \hat{G}_+(s)\hat{G}_-(s), \tag{30}$$

such that $\hat{G}_+(s)$ contains all the dead time and right half plane zeros of $\hat{G}(s)$:

$$\hat{G}_+(s) = e^{-Ls}\left(\prod_i \frac{1 - \beta_i s}{1 + \beta_i s}\right), \quad Re(\beta_i) > 0, \tag{31}$$

while $\hat{G}_-(s)$ is stable and of minimum phase with no predictors. The primary controller takes the form:

$$C = \hat{G}_-^{-1} f, \tag{32}$$

where $f$ is a user specified low-pass filter and usually chosen as $$f(s, \tau_{cl}) = \frac{1}{(\tau_{cl}s + 1)^r}, \tag{33}$$

where $\tau$ is sufficiently large to guarantee that the IMC controller C is proper. And $\tau_d$ is the only tuning parameter to be selected by the user to achieve the appropriate compromise between performance and robustness and to keep the action of the manipulated variable within bounds. A smaller $\tau_d$ provides faster closed-loop response but the manipulated variable is moved more vigorously, while a larger $\tau_d$ provides a slower but smoother response. A larger $\tau_d$ is also less sensitive to model mismatch. In process control practice, the closed-loop bandwidth $\omega_{cb}$ can rarely exceed ten times of the open loop process bandwidth $\omega_{pb}$ (Morarn and Zafiriou 1989), i.e., $\omega_{cb} \leq 10 \omega_{pb}$. Usually, the desired closed-loop bandwidth is chosen as $\omega_{cb} = \gamma\omega_{pb}$, $\gamma \in [0.5, 10]$. Noting (34) with all-pass $\hat{G}_+$, it can be readily seen that $$\tau_{cl} = \frac{\sqrt{\sqrt[r]{2} - 1}}{\gamma\omega_{pb}}, \quad \gamma \in [0.5, 10]. \tag{34}$$

For the case of no plant-model mismatch, the nominal closed-loop transfer function of the IMC system between the set point $\tau$ and output $\gamma$ is $$H = \hat{G}_+ f = \left(\prod_i \frac{1 - \beta_i s}{1 + \beta_i s}\right)\frac{1}{(\tau_{cl}s + 1)^r}e^{-Ls}. \tag{35}$$

Figure 8:
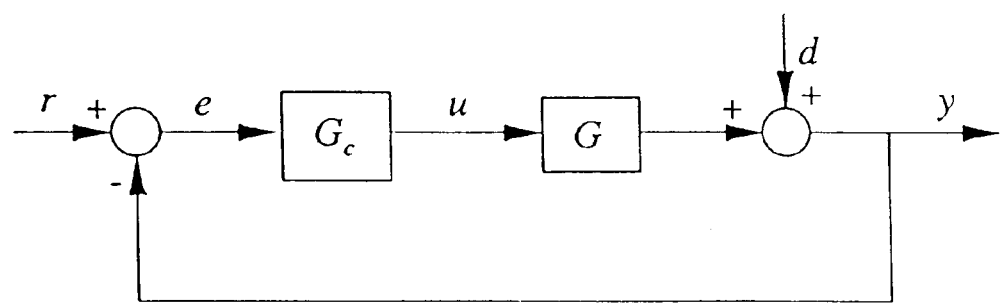
FIG. 8 is a schematic view of a single-loop control system according to the present invention.

The IMC system in FIG. 7 can be formally redrawn into the equivalent single-loop (SL) feedback system in FIG. 8, if the SL controller $G_c$ is related to the IMC-controller C via $$G_c(s, \tau_{cl}) = \frac{C(s, \tau_{cl})}{1 - C(s, \tau_{cl})\hat{G}(s)}. \tag{36}$$

In Chien (1988), $G_c$ is chosen as the PID type. The value of $\tau_d$ is set according to (34) as if the single-loop PID could achieve the same performance as the much complex IMC one can. The dead time is approximated by either a first-order Padé or a first-order Taylor series, and the PID parameters are obtained by matching the first few Markov coefficients of (36) for the selected specific process models. The results are listed in Table 6 (Chien 1988). However, it is noted that the use of Padé approximation or a first-order Taylor expansion introduces extra modeling errors. Furthermore, Chien's rules are only applicable to FOPDT and SOPDT processes tabulated in Table 6. Other processes have to be reduced to such models, and such a reduction may have bad accuracy or even have no solution. This inevitably restricts the general applicability of the method and the performance of the resulting controller.

The present work is to propose a new IMC based design methodology. It can yield the best single-loop controller approximation to the IMC controller regardless of process order and characteristics. The resulting single-loop performance can be better guaranteed and well predicted from the IMC counterpart. Our design idea is very simple: given the equivalent single-loop controller $G_c$ in (36), which may be unnecessarily or too complicated to implement, apply a suitable model reduction to obtain the best approximation $\hat{G}_c$ to $G_c$. If the user specifies the type of $\hat{G}_c$ (say, PID), then the model reduction algorithm will generate its parameters. If the approximation accuracy is satisfactory, the design is completed; otherwise, we will adjust the IMC controller performance down until its single-loop approximation is satisfactory. On the other hand, if the user has no preference on controller structure, our algorithm starts with a PID type, and gradually increases the controller complexity such that the simplest approximation $\hat{G}_c$ is attained with the guaranteed accuracy to $G_c$. This allows a unified treatment of all cases and facilitates auto-tuning application.

A crucial issue in IMC-SL controller design is to get a suitable value for $\tau_d$ which can lead to a good single-loop controller approximation to the corresponding IMC one. Note the inherent difference of IMC and SL systems in their configurations (FIG. 7 and FIG. 8) where the former has the output prediction while the latter does not. In fact, not all IMC systems can be approximated reasonably by single-loop systems. The $\tau_d$ given by (34) is suitable for IMC systems, but it does not consider the performance limitations of single-loop feedback systems due to non-minimum phase zero and dead time. Such limitations are usually expressed by some integral relationships. Recently, Astrom (1999) proposed the following simple non-integral inequality for the gain cross-over frequency $\omega_{og}$ of the open-loop transfer function $\hat{G}G_c$, where $$|G(j\omega_{og})G_c(j\omega_{og}, \tau_d)|=1 \qquad (37)$$

to meet $$\arg \hat{G}_+(j\omega_{og}) \geq -180°+\phi_m - \arg \hat{G}_-(j\omega_{og})G_c(j\omega_{og}, \tau_d), \qquad (38)$$

where $\phi_m$ the desired phase margin, the selection of $\phi_m$ reflects the control system robustness to the process uncertainty (Astrom 1999). A large $\phi_m$ is required for a large uncertainty. In lack of information on uncertainty size, a typical range for $\phi_m$ could be 30°–80°. Our design objective is to achieve a non-oscillatory response as specified by (74) and yet have the response as fast as possible. It approximately translates to a damping ratio of $\xi=0.7$, and the empirical formula $\phi_m=100\xi$(Franklin et al. 1990) yields an estimate of $\phi_m$ as $\phi_m=70°$ for $\xi=0.7$. Our studies suggest that $\phi_m=65°$ be a good choice. With $\phi_m$ specified, we then find the smallest $\tau_d$ which satisfies (37) and (38).

In short, for single-loop controller design the tuning parameter $\tau_d$ in the filter (33) should be, in general, chosen to meet both (34), (37) and (38) simultaneously. If the process is of minimum phase, (37), (38) vanishes and (34) is in action. On the other hand, if the process has any non-minimum element, our study shows that the $\tau_d$ derived from (37) and (38) always appears in the range given in (34) so that (37) and (38) would be enough to determine $\tau_d$ in this case. In the subsequent two sections, PID and general controllers will be considered respectively.

4.1 PID Controller

Owing to its simple structure, the PID controller is the most widely used controller (Astrom et al. 1993) in process industry, even though many advanced control algorithms have been introduced. Consider a PID controller in the form:

$$G_{PID} = k_c + \frac{k_i}{s} + k_d s, \qquad (39)$$

where $k_c$ is the proportional gain, $k_i$ integral gain (units of time), and $k_d$ derivative gain (units of time). Our task is to find the three PID parameters, so as to match $\hat{G}_c = G_{PID}$ to $$G = \frac{C}{1-C\hat{G}}$$

as well as possible. This objective can be realized by minimizing the loss function, $$\min_{G_{PID}} J \triangleq \min_{G_{PID}} \sum_{i=1}^{m} |G_{PID}(j\omega_i) - G(j\omega_i)|^2. \qquad (40)$$

Rewrite (39) as $$G_{PID}(j\omega) = \begin{bmatrix} 1 & \frac{1}{j\omega} & j\omega \end{bmatrix} \begin{bmatrix} k_c \\ k_i \\ k_d \end{bmatrix} \triangleq \phi^T(j\omega)\theta,$$

and substitute it into (40) for different frequencies $\omega_i$, $i=1,2,\ldots,M$, to get $$\min_{G_{PID}} J = \min_{\theta} \sum_{i=1}^{M} |\phi^T(j\omega_i)\theta - G_c(j\omega_i)|^2.$$

The design problem becomes $$\min_{\theta} \|\Psi^T \theta - \Omega\|^2, \qquad (41)$$

where $$\Psi^T = \begin{bmatrix} 1 & \frac{1}{j\omega_1} & j\omega_1 \\ 1 & \frac{1}{j\omega_2} & j\omega_2 \\ \vdots & \vdots & \vdots \\ 1 & \frac{1}{j\omega_M} & j\omega_M \end{bmatrix}, \text{ and } \Omega = \begin{bmatrix} G_c(j\omega_1) \\ G_c(j\omega_2) \\ \vdots \\ G_c(j\omega_M) \end{bmatrix}.$$

Define $$\Phi^T = \begin{bmatrix} \text{Re}(\Psi^T) \\ \text{Im}(\Psi^T) \end{bmatrix}, \text{ and } \Gamma = \begin{bmatrix} \text{Re}(\Omega) \\ \text{Im}(\Omega) \end{bmatrix},$$

(41) can then be written as $$\min_{\theta} \|\Phi^T \theta - \Gamma\|^2,$$

whose solution is obtained by the standard least squares method as $$\theta^* = (\Phi\Phi^T)^{-1}\Phi\Gamma, \qquad (42)$$

to give the optimal PID parameters as $[k^*_c \ k^*_i \ k^*_d]^T = \theta^*$. Our studies suggest that the frequency range $[\omega_l, \omega_M]$ in the optimal fitting (40) be chosen as $(0.1\omega_{cb}, \omega_{cb})$ with the step of $$\left(\frac{1}{100} \sim \frac{1}{10}\right)\omega_{cb},$$

where $\omega_{cb}$ is the desired closed-loop bandwidth.

Once a PID controller is found from (83), the following criterion should be used to validate the solution:

$$E = \max_{\omega} \left| \frac{\hat{G}_c(j\omega) - G_c(j\omega)}{G_c(j\omega)} \right| \leq \epsilon, \qquad (43)$$

where $\epsilon$ is the user-specified fitting error threshold. $\epsilon$ is specified according to the desired degree of performance, or accuracy of the SL approximation to the IMC one. Usually $\epsilon$ may be set as 3%. If (43) holds true, the design is completed.

Figure 9:
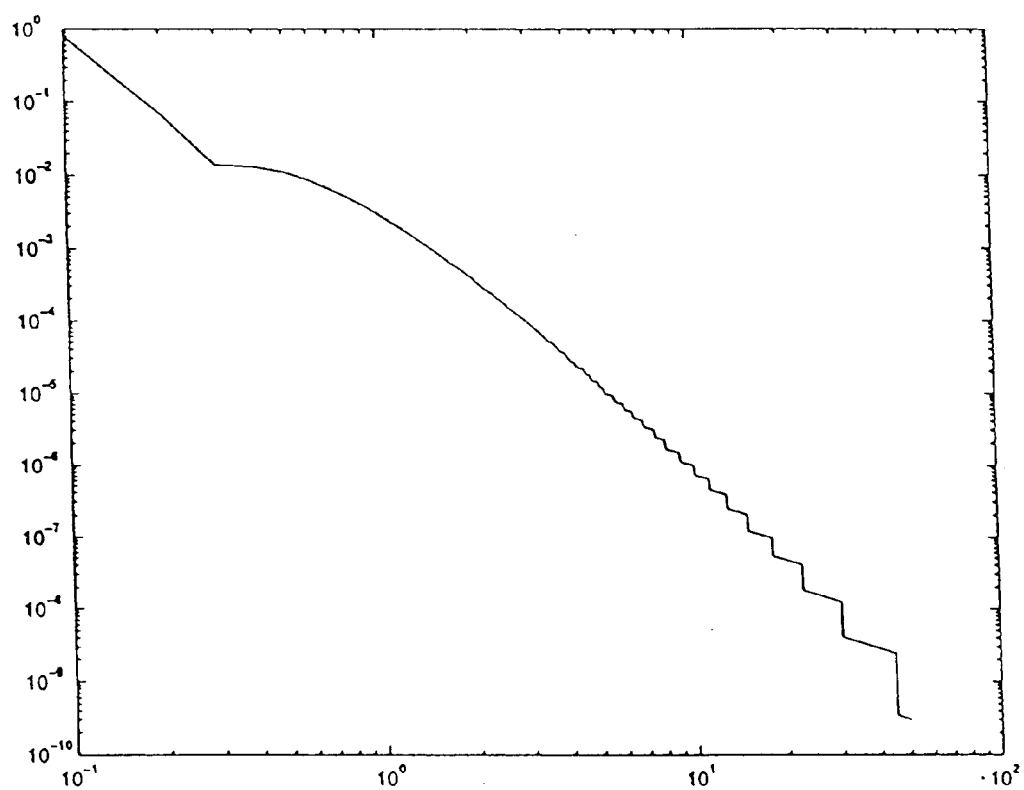
FIG. 9 is a graphical view of the relationship between a tuning parameter and approximation error.

On the other hand, if the given threshold cannot be met, one can always detune PID by relaxing the IMC specification, i.e., increasing $\tau_d$. A typical relationship between the tuning parameter $\tau_d$ and the approximation error is shown in FIG. 9. In general, E decreases as $\tau_d$ increases. It provides a simple way to select a minimum $\tau_d$ with respect to the specific accuracy threshold. In practice, however, it is inconvenient to draw such a curve. It is found that the decreasing rate, $dE/d\tau_d$, is highly influenced by plant dead time L and the right half plane (RHP) zeros $\beta_i$, which limit the achievable bandwidth. $\omega_{cb}$ is virtually unaffected by the presence of the filter (Rivera et al. 1986) until $\tau_d$ reaches an order of magnitude comparable to the dead time and RHP zeros $\beta_i$, respectively. Hence, it is effective and efficient to choose the increment of $\tau_d$ in the PID detuning procedure as the maximum of L and Re $\beta_i$, i.e., $$\tau_{cl}^{k+1} = \tau_{cl}^k + \eta^k \max(L, Re\beta_i) \tag{44}$$

where k represents the k-th iteration, and $\eta$ is an adjustable factor reflecting the approximation accuracy of the present iteration and is set at ¼, ½ and 1, when 3% <E≦20%, 20% <E≦100% and 100% <E respectively. The iteration continues until the accuracy bound is fulfilled.

Our detuning rule (87) for $\tau_d$ implicitly assumes that E would be sufficiently small when $\tau_d$ is large enough. In this connection, it would be interesting to see if $$\lim_{\tau_{cl} \to \infty} E = 0.$$

Equation (34) can be rewritten as $$\omega_{cb} = \frac{\sqrt{\sqrt{2}-1}}{\tau_{cl}}. \tag{45}$$

When $\tau_d$ increases to infinity, it is easy to see from (45) that $$\lim_{\tau_{cl} \to \infty} \omega_{cb} = 0, G(j\omega)$$

can be replaced by G(0), for $\omega \leq \omega_{cb}$, and $G_c$ becomes $$\frac{1}{G\_(0)((\tau_{cl}s+1)^r - 1)}.$$

Figure 10:
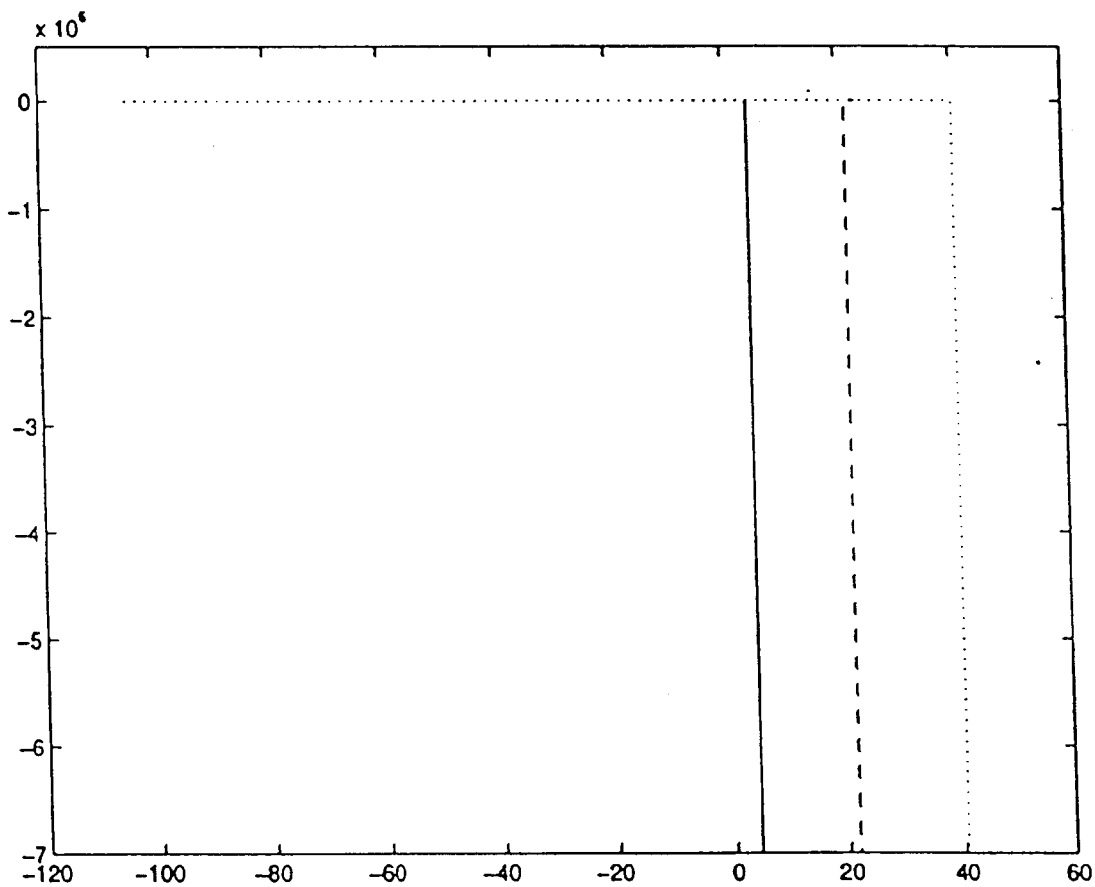
FIG. 10 is a graphical view of a Nyquist curve for the process model over a range of tuning parameters.

For $$r = 1, G_c = \frac{1}{sG\_(0)}$$

is a pure integrator and can be realized precisely by a PID controller with no error. In general, the Nyquist curve of $G_c(j\omega)$ for $\omega \in (0, \omega_{cb})$ will approach a straight line, as shown in FIG. 10, when $\tau_d$ tends to infinity. Note that the Nyquist curve for the PID controller is always a vertical straight line, and can match that of $G_c(j\omega)$ as well as desired for $\tau_d \to \infty$. One thus expects E to converge to 0 as $\tau_d$ approaches infinity.

We now present simulation examples to demonstrate our PID tuning algorithm and compare it with the original IMC, Chien (1988) and the normal PID tunings when possible. Chien (1988) used the following PID form $$\tilde{G}_{PID} = k_c \left( 1 + \frac{1}{T_I s} + \frac{T_D s}{\frac{T_D}{N}s + 1} \right),$$

where the PID settings are given in Table 6. The ideal PID controller in (39) used for our algorithm development is not physically realizable and thus replaced by $$G_{PID} = k_c + \frac{k_i}{s} + \frac{k_d s}{\frac{k_d}{N}s + 1}. \tag{46}$$

In both cases, N is chosen as 20 as usual. The simulations are done under the perfect model matching condition, i.e., $\hat{G}=G$. To have fair and comprehensive assessment of controller performance, most performance indices popularly used in process control are measured and they include both time domain ones such as overshoot in percentage ($M_p$), rising time (from 10% to 90%) in seconds($t_r$), setting time (to 1%) in seconds($t_s$), integral absolute-error (IAE=$\int_0^\infty |\tau - y| dt$ where the upper limit $\infty$ may be replaced by T, which is chosen sufficiently large so that e(t) for t>T is negligible), and integral absolute-error of load disturbance response (IAE$_{load}$); and frequency domain one E defined in (43). They are tabulated in Table 7.

EXAMPLE

Consider a high order and oscillatory process with multiple lags:

$$G = \frac{e^{-0.5s}}{(s^2+s+1)(s+2)^2}.$$

When $\phi_m=65°$, one can readily find $\omega^*_{og}=0.4898$ rad/sec, and $\tau^*_d=0.3922$. For Chien's method, since this type of process is not covered in Table 6, it is reduced (Ho et al. 1995) to a SOPDT model:

$$\hat{G} = \frac{0.25 e^{-2.0061s}}{(0.5531s+1)^2}.$$

With $\tau_d=0.3922$, Chien's rule gives $$\tilde{G}_{PID} = 1.8450 \left( 1 + \frac{0.9040}{s} + \frac{0.2766 s}{\frac{0.2766}{N}s + 1} \right),$$

while ours produces $$G_{PID} = 2.6901 + \frac{1.9433}{s} + \frac{3.1620 s}{\frac{3.1620}{N}s + 1}. \tag{47}$$

Figure 11A:
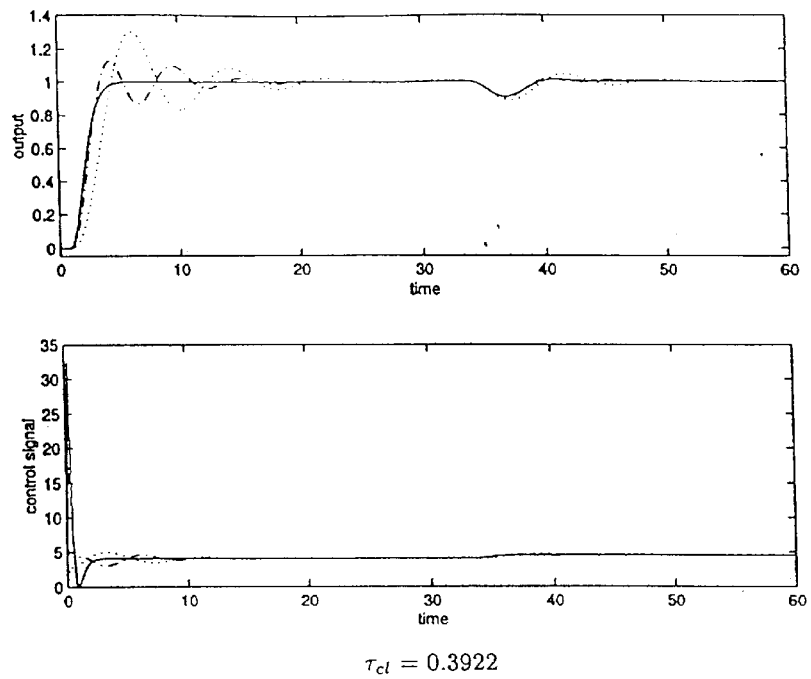
FIGS. 11(a)–11(b) are graphical views of the closed loop responses generated after adjusting a tuning parameter.
Figure 11B:
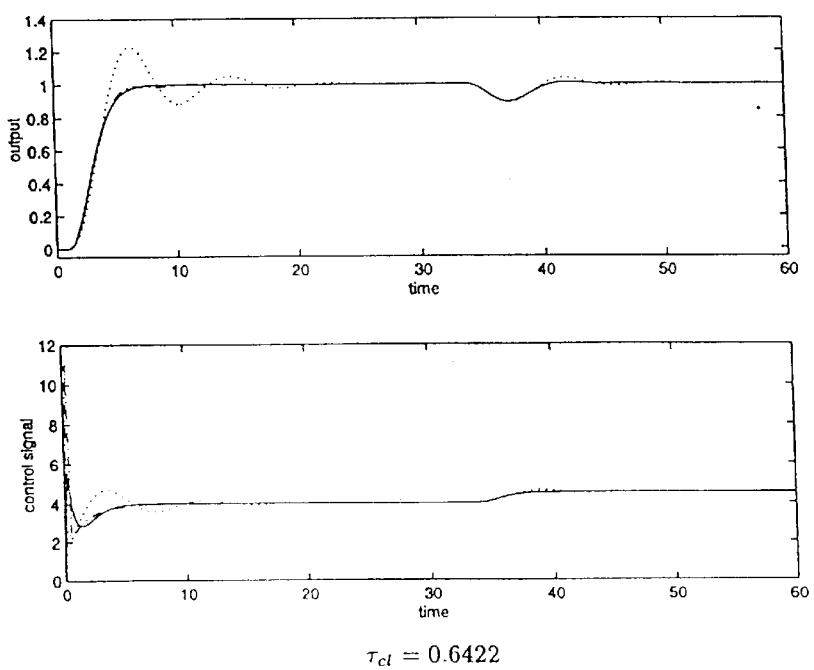

Though the IMC design yields perfect control, the proposed method has the approximation error E=48.14%, which can not fulfill the accuracy threshold, and the closed-loop response is very poor, as shown in FIG. 11(a), but it is still better than Chien's results. Then $\tau_d$ is adjusted to $\tau_d^1=\tau_d^0+0.5L=0.3922+0.25=0.6422$ according to the proposed tuning rule (87). The new $\tau_d$ results in $$\tilde{G}_{PID} = 1.6708 \left( 1 + \frac{0.9040}{s} + \frac{0.2766 s}{\frac{0.2766}{N}s + 1} \right).$$

by Chien (1988) and $$G_{PID} = 1.6072 + \frac{1.3045}{s} + \frac{1.3177s}{\frac{1.3177}{N}s+1} \quad (48)$$

by our method. The approximation error E of the proposed method has achieved the specified approximation accuracy $E \leq 3\%$. The closed-loop responses are shown in FIG. 11(b). One observes that our design yields great improvement over Chien's method and the difference between our SL system and the original IMC system now becomes invisible.

It can be seen from the simulation study in Table 7 that the proposed method always yields a PID controller with much better approximation to the IMC counterpart than Chien's method, regardless of what $\tau_d$ is chosen. Our experience indicates that for FOPDT and SOPDT processes tabulated in Table 6 and slow closed-loop response requirement of $$\tau_{cl} > \frac{\sqrt{\sqrt[r]{2}-1}}{\omega_{pb}},$$

both the proposed IMC-PID method and Chien's rules generate responses close to the IMC counterpart. Especially, the proposed method can always achieve E<3%, and thus the closed-loop performance can be well predicted from the corresponding IMC system. But, when fast closed-loop response, generally $\omega_{cb} > \omega_{pb}$, i.e., $$\tau_{cl} < \frac{\sqrt{\sqrt[r]{2}-1}}{\omega_{pb}},$$

is required, the proposed method shows significant improvement over Chien's rules. The improvement is also evident for complex processes with slow responses. Moreover, under fast response requirement, $\omega_{cb} > \omega_{pb}$, PID controller derived from Chien's rules may cause large peaks in the manipulated variable, which is harmful to the system. It is however noticed for high-order processes with fast responses, none of the above two IMC-PID methods is able to generate PID systems similar to IMC ones. It implies that controller in the PID form is insufficient to obtain the desired performance. In this case, a higher-order of controller has to be considered for a better fitting and performance.

4.2 High-Order Controller

Here, model reduction is employed to find the lowest high-order of controller, which may achieve a specified approximation accuracy. A number of methods for rational approximation are surveyed by Pintelon et al. (1994). The recursive least squares (RLS) algorithm is suitable for our application and is briefly described as follows. The problem at hand is to find a nth-order rational function approximation:

$$\hat{G}_c = \frac{b_n s^n + b_{n-1} s^{n-1} + \ldots + b_1 s + b_0}{s^n + a_{n-1} s^{n-1} + \ldots + a_1 s} \quad (49)$$

with an integrator such that $$J \triangleq \sum_{i=1}^{M} |W(j\omega_i)(\hat{G}_c(j\omega_i) - G_c(j\omega_i))|^2 . \quad (50)$$

is minimized, where the original function $G_c$ and weighting W are given. The cost function J is rewritten as $$J^{(k)} \triangleq \sum_{i=1}^{M} \left| \frac{W(j\omega_i)}{(j\omega_i)^n + a_{n-1}^{(k-1)}(j\omega_i)^{n-1} + \ldots + a_1^{(k-1)}(j\omega_i)} \{[b_n^{(k)}(j\omega_i)^n + b_{n-1}^{(k)}(j\omega_i)^{n-1} + \ldots + b_1^{(k)}(j\omega_i) + b_0^{(k)}] - G_c(j\omega_i)[(j\omega_i)^n + a_{n-1}^{(k)}(j\omega_i)^{n-1} + \ldots + a_1^{(k)}(j\omega_i)]\} \right|^2, \quad (51)$$

where k denotes the index for the kth recursion in the iterative weighted linear least squares method, and let $$\overline{W}(j\omega) = \frac{W(j\omega_i)}{(j\omega_i)^n + a_{n-1}^{(k-1)}(j\omega_i)^{n-1} + \ldots + a_1^{(k-1)}(j\omega_i)}$$

operates as a weighting function in the standard least squares problem and it depends on the parameters generated in the last recursion. We might choose $W=1/G_c$, and thus the loss function is the relative approximation error. However, simulation study shows little improvement over the case without weighting. As a result, to simplify algorithm, here, the $\overline{W}$ is chosen as 1 and standard LS is applied in each iteration. On convergence, the resultant parameters will form one solution to (50). To derive the relevant recursive equations, we re-arrange (51) to yield the matrix equation:

$$\eta_k = \phi_k^T \theta_k,$$

where
$\eta_k = -G_c(j\omega_i)(j\omega_i)^n,$
$\theta_k = [b^{(k)}_n \ldots b_1^{(k)} \: a^{(k)}_{n-1} \ldots a_1^{(k)} \: a_0^{(k)}]^T,$
$\phi_k = [G_c(j\omega_i)(j\omega_i)^{n-1} \ldots G_c(j\omega_i)(j\omega_i) -(j\omega_i)^n -(j\omega_i)^{n-1} \ldots -(j\omega_i)-1]^T.$ Like the LS algorithm, the frequency range in RLS is also chosen as $(0.1\omega_{cb}, \omega_{cb})$ with the step of $$\left(\frac{1}{100} \sim \frac{1}{10}\right)\omega_{cb}.$$

In this range, RLS yields satisfactory fitting results in frequency domain.

Figure 12:
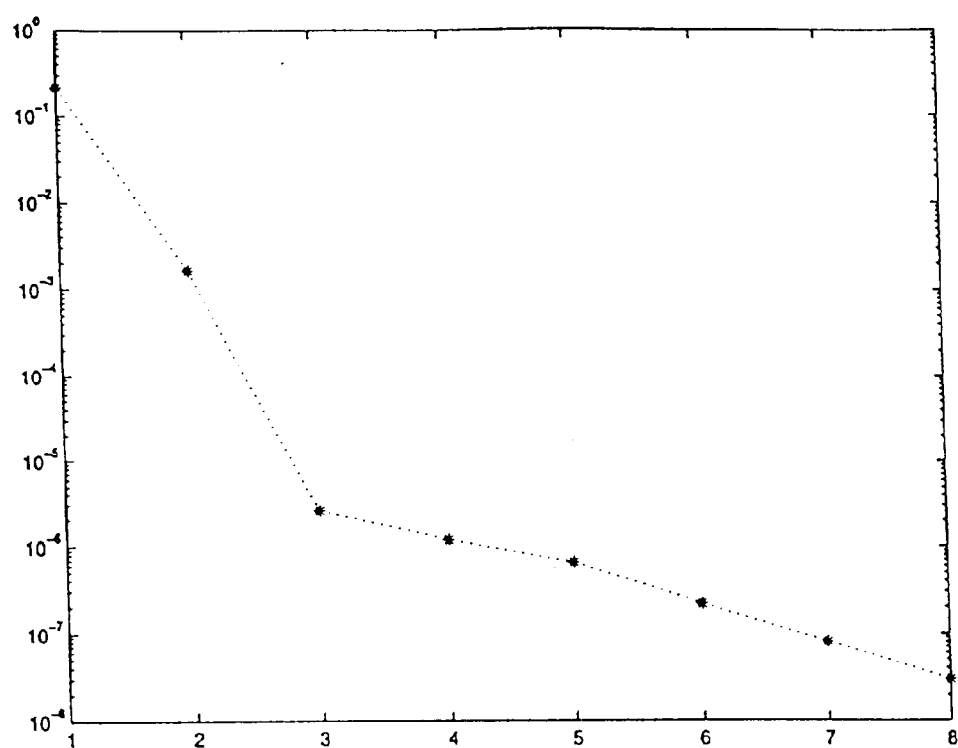
FIG. 12 is a graphical view of the relationship between controller order and approximation error.

From the typical relationship of the relative fitting error E defined in (43) and the rational approximation order n shown in FIG. 12, we can see that E decreases, as n increases, and then we try to find the minimum n which achieves the approximation bound $\epsilon = 3\%$ under a user specified $\tau_d$. In general, if faster response is required, higher-order controller has to be used.

The above algorithm deals with the problem of approximating a given, probably non-rational transfer function by a rational function. Error bounds for such approximation have been investigated (Yan and Lam 1999). Wahlberg and Ljung (1992) proposed the approach based on weighted least-squares estimation, and provided hard frequency-domain transfer function error bounds. However, it is not easy to calculate such a bound, and the convergence of estimation has not been addressed. In our work, we use a maximum likelihood index E to evaluate the approximation accuracy, and assume that the accuracy threshold can be achieved when the controller order is high enough.

When a $\tau_d$ is chosen, we first find the PID controller with the standard least squares method and evaluate the corresponding approximation error E in (43) as described in the proceeding section. If E can not achieve the specified approximation accuracy $\epsilon$ (usually 3%), we recommend high-order controller in equation (49), and start from a controller order of 2 until the smallest integer n such that $E \leq \epsilon$.

Tuning Procedure

Step 1. Find the smallest $\tau^*_d$ from (37) and (38), and let $\tau_d^0 = \tau^*_d$.

Step 2. Find the PID controller from (83) and evaluate the corresponding approximation error E in (43). If E achieves the specified approximation accuracy $\epsilon$ (usually 3%), end the design.

Step 3. Otherwise, we have two ways to solve this problem: if PID controller is desired, update $\tau_d$ by (87), and go to Step 2; else, go to Step 4.

Step 4. Adopt the high-order controller in (49), start from a controller order of 2 until the smallest integer n is reached with $E \leq \epsilon$.

EXAMPLE

Figure 13:
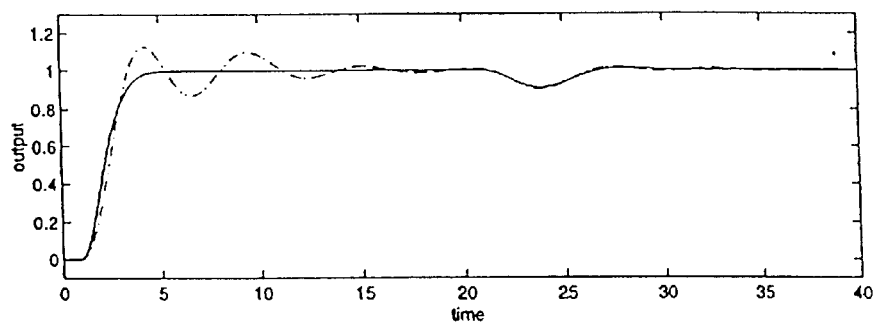
FIG. 13 is a graphical view of the set point responses for a range of controllers.
Figure 13:
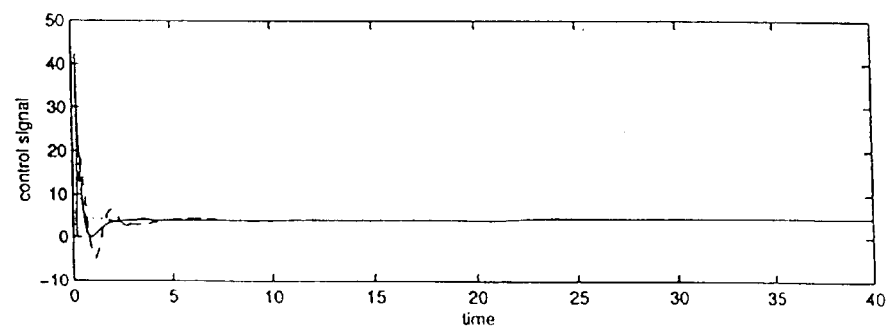

Reconsider $$G = \frac{e^{-0.5s}}{(s^2 + s + 1)(s + 2)^2}$$

in Table 7, for which $\tau_d^0 0.3922$ and a PID has been obtained there with E=48.14%. For high order controller, our procedure ends with $$\hat{G}_c = \frac{21.5908s^3 + 51.1474s^2 + 50.7811s + 29.3979}{s^3 + 1.6972s^2 + 15.2131s}, \quad (52)$$

with the fitting error E less than $\epsilon$=3%, The closed-loop step responses are shown in FIG. 13, and their performance indices are also tabulated in Table 7. We can see that the new controller $\hat{G}_c$ restores the IMC performance, while the previous PID controller in (47) is not capable if that under such a tight performance specification.

If $\tau_d$ is chosen to be smaller than the value suggested by Astrom's rule (37) and (38), this breaks the limitation of single-loop feedback systems, and then no single-loop controller solution with stability could be found for the corresponding IMC system. For instance, in the above example, choose $\tau_d$ 50% less than $\tau_d^0$, i.e., $\tau_d$=0.1961, we could not find a controller in form of (49) with E less than 3%, which implies that SL controllers are unlikely to achieve the performance tighter than that specified by (37) and (38).

It is observed from the simulation study that usually, the approximation error magnitude of high-order controller obtained by the RLS is in an order of $10^{-4}$ or less, the controller order is less than 5, and the controller yields the closed-loop response very close to that of IMC loop provided that $\tau_d$ is set by (37) and (38). The high-order controller does provide significant performance enhancement over PID for complex processes. The proposed method is a simple, effective, and efficient way to design such high performance controllers.

Figure 14A:
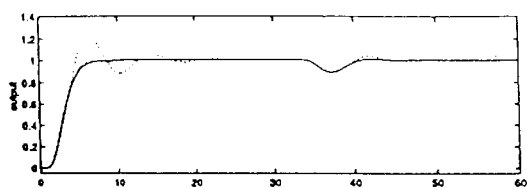
FIGS. 14(a)–14(d) are graphical views of the set point responses for a plurality of controllers.
Figure 14A:
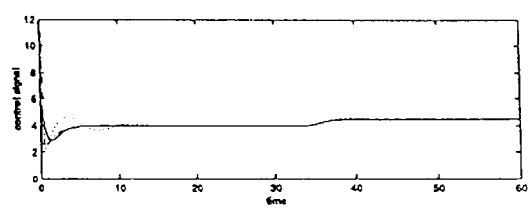
Figure 14B:
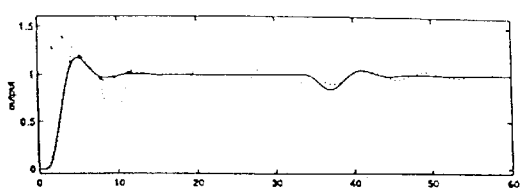
Figure 14B:
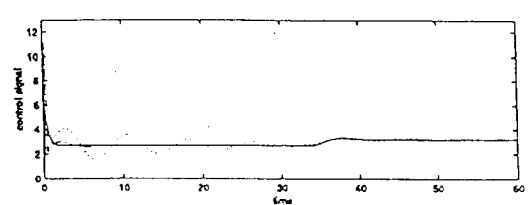

Reconsider $$G = \frac{Ke^{-0.5s}}{(s^2 + s + 1)(s + 2)^2},$$

with the nominal K=K$_0$=1. When $\tau_d$=0.6422, the proposed method yields a PID controller in (48) and the nominal performance is shown in FIG. 14(a). It can be seen that the system is indeed nominally stable. To see robustness, introduce a 50% perturbation in gain K, giving K$_1$=1.5×1=1.5. FIG. 14(b) show the resulting performances, and indicate that the single-loop PID controller G$_{PID}$ derived from the proposed method exhibits similar robust performance as IMC loop does.

Figure 14C:
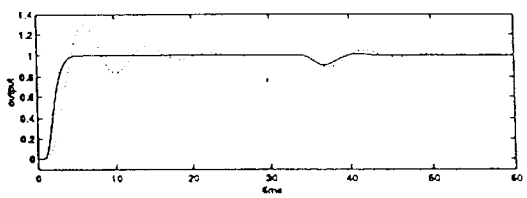
Figure 14C:
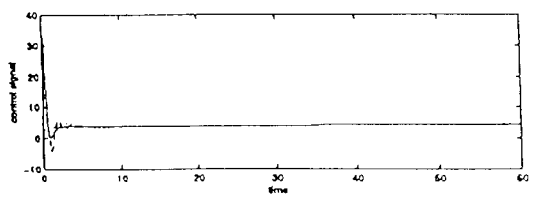
Figure 14D:
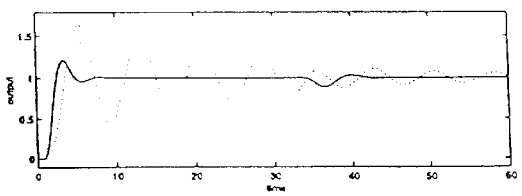
Figure 14D:
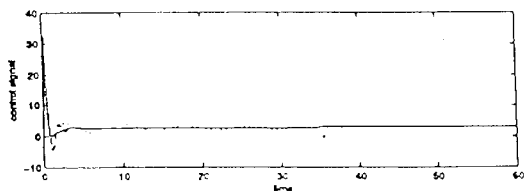

When $\tau_d$=0.3922, the proposed method yields a 3th-order controller in (52) and the nominal performance is shown in FIG. 14(c). We also introduce a 50% perturbation in gain, giving K$_2$=1.5×1=1.5. FIG. 14(d) shows the resulting performance, which is still stable, but not as robust as that shown in FIG. 14(b) for $\tau_d$=0.6422.

5 Multivariable Process Identification

Here, we assume that the process to be identified is linear time-invariant, and that the test signals to be applied for identification purpose are persistently exciting, which roughly implies that all modes of the process can be excited during the identification experiment (Soderstrom and Stoica 1989). Consider a feedback system shown in FIG. 2, where G$_c$ is the controller, and the m×m linear process is described by $$Y(s) = G(s)U(s), \quad (53)$$

with the output vector $$Y(s) = [Y_1(s) \, Y_2(s) \, \ldots \, Y_m(s)]^T,$$

the input vector $$U(s) = [U_1(s) \, U_2(s) \, \ldots \, U_m(s)]^T,$$

and the process transfer function matrix $G = \{G_{ij}(s)\}$, i,j=1,2, ..., m. For later use, partition the m×m identity matrix I as $$I = [e_1 e_2 \ldots e_m]. \quad (54)$$

The idea of the proposed method is to calculate the process frequency response C(jω) using the FFT (Subsection 5.2), construct for each entry the open-loop step response from G$_{ij}$(jω) using the IFFT and then estimate a transfer function from such a response (Subsection 5.3). But before these descriptions, we need to discuss different tests (Subsection 5.1) to which our identification method is applicable.

5.1 Test

Some test has to be conducted on a given process to enable identification. Various aspects of test should be considered. The first thing is the type of test signals. The most popular are step and relay. The second thing is the operation mode during the experimental test. It could be in open-loop mode without a controller or in closed-loop mode with a controller in action. The third thing is how to configurate the test for a multivariable process, and there could be three possible schemes:

(i) Independent test: A test is applied to only one loop at a time and released once a steady state, i.e., constant steady state or stationary oscillations (Chen 1993), is reached, and is repeated until all the m tests each on one loop are performed.

(ii) Sequential test: A test is first applied to the first loop while all other loops are kept unattached. Then a test is made in the second loop while the previous change in the first loop is still in place. The procedure is repeated until the m-th loop.

(iii) Decentralized test: All m test signals are applied to m loops simultaneously.

Independent test is quite time consuming since a next test can be activated only when the process has been brought back to its original steady state after each individual test. Decentralized test may generate messy responses (Loh and Vasnani 1994), which is difficult to analyze and predict. The sequential test is thus adopted in this chapter. Under such a scheme, there are four typical combinations of test:

Case 1: Open-loop (sequential) step test;

Case 2: Closed-loop (sequential) step test;

Case 3: Open-loop (sequential) relay test;

Case 4: Closed-loop (sequential) relay test. (55)

It should be stressed that the identification method to be presented below is not restricted to these four cases only, but also applicable to other cases provided that each test leads to a steady state.

To unify the presentation for all the cases, we introduce a vector $\upsilon(t)$:

$$v(t) = \begin{cases} u(t), & \text{open-loop test,} \\ r(t), & \text{closed-loop test,} \end{cases}$$

where u(t) is the input to plant and r(t) the set-point to the closed-loop of FIG. 2. Let 1(t) and γ(t) be the step function with unity size and the relay function with unity magnitude, respectively. The types of test signal are reflected by the elements of $\upsilon(t)$:

$$v_i(t) = \begin{cases} \alpha_i 1(t), & \text{step,} \\ \beta_i \gamma(t) 1(t), & \text{relay,} \end{cases} \quad (56)$$

where $\alpha_i$ and $\beta_i$ are the size and amplitude of the step and relay, respectively. Then the m tests $\upsilon^i$ in a sequential experiment over the time span of $[t_0, t_m]$ with test periods, $[t_{i-1}, t_i]$, i=1,2, . . . , m, can be expressed as $$v(t) = \begin{cases} v^1(t) = v_1(t)e_1, & t_0 = 0 \leq t < t_1, \\ v^i(t) = v_i(t)e_i + v^{i-1}(t), & t_{i-1} \leq t < t_i, \ i = 2, 3, \ldots, m, \end{cases} \quad (57)$$

where $e_i$ is the i-th column of the m×m identity matrix defined in (54), and $t_0$=0 is the start time for the experiment while $t_i$ is the end time for the i-th test when the system has entered the steady state.

The sequential experiment on an m×m process is actually executed as. follows:

Initialization: Bring the process to constant steady states y(0) and u(0) at $t_0$=0. Specify the step sizes $\alpha_i$ or the relay amplitudes $\beta_i$, i=1,2, . . . , m.

Test 1: Apply a test of the given type and magnitude to the first input $\upsilon_1$, while keeping all other inputs $\upsilon_j$ unchanged, that is, $\upsilon=\upsilon^1$. Wait for the system to settle down at $t=t_1$, that is, the output y has reached a constant steady state under the step test or stationary oscillations under the relay test.

Test i: Let $\upsilon=\upsilon^i$ as shown in (57) and apply it to the system at $t=t_{i-1}$, i=2,3, . . . , m, until the system settles down again at $t=t_i$.

Regardless of different test cases (55), we always collect the process output and input responses from all these m tests, and denote them by $\{u(t),y(t),t \in[t_0, t_m]\}$.

5.2 Process Frequency Response

The processing steps of Subsections 5.2 and 5.3 are to find the open-loop step response for every entry of the process transfer matrix. They are not required for Case 1 where such step responses are already available. It can be seen from (53) that if one has m independent output and input frequency response vectors $\tilde{Y}^i(j\omega)$ and $\tilde{U}^i(j\omega)$, the process frequency response matrix G(jω) can be then obtained from the equation:

$$[\tilde{Y}^1(j\omega)\ \tilde{Y}^2(j\omega) \ldots \tilde{Y}^m(j\omega)] = G(j\omega) [\tilde{U}^1(j\omega)\ \tilde{U}^2(j\omega) \ldots \tilde{U}^m(j\omega)].$$

Our task now is to construct m independent time response vectors $\tilde{y}^i(t)$ and $\tilde{u}^i(t)$ from the recorded process output and input responses y(t) and u(t) such that for each i, $\tilde{y}^i(t)$ and $\tilde{u}^i(t)$ have zero initial conditions at start and steady states in the end, so that their frequency responses $\tilde{Y}^i(j\omega)$ and $\tilde{U}^i(j\omega)$ meet $\tilde{Y}^i(j\omega)=G(j\omega)\tilde{U}^i(j\omega)$. For Case 2 of a step test, the i-th test starts usually with the non-zero initial conditions $y(t_{i-1})$ and $u(t_{i-1})$, and ends with new constant steady states $y(t_i)$ and $u(t_i)$. If the output and input are subtracted by their initial conditions respectively, the resulting signals will have zero initial conditions at $t=t_{i-1}$ and constant steady states at $t=t_i$. Thus we form from y and u the following modified signals:

$$\tilde{y}^i(t)=y(t)-y(t_{i-1}),\ t_{i-1}\leq t<t_i,\ i=1,2,\ldots,m, \quad (58a)$$

$$\tilde{u}^i(t)=u(t)-u(t_{i-1}),\ t_{i-1}\leq t<t_i,\ i=1,2,\ldots,m. \quad (58b)$$

For the experiment which leads to stationary oscillations (e.g. Case 3 and Case 4), making $\tilde{y}(t_{i-1})=0$ only is not enough since its derivations could still be non-zero. Instead, let us imagine that for each i, the i-th test lasts beyond $t=t_i$ until $t=t_m$ without activating the subsequent tests, then the last cycle of stationary oscillations $y_s^i(t)$ and $u_s^i(t)$ sustained before $t=t_i$ will be repeated till $t=t_m$. One can thus define for each i $$\tilde{y}^i(t) = \begin{cases} y(t) - y(0), & 0 \leq t < t_i, \\ y_s^i(t) - y(0), & t_i \leq t \leq t_m, \end{cases} \quad (59a)$$

and $$\tilde{u}^i(t) = \begin{cases} u(t) - u(0), & 0 \leq t < t_i, \\ u_s^i(t) - u(0), & t_i \leq t \leq t_m. \end{cases} \quad (59b)$$

Note that in step case $\tilde{y}^i$ and $\tilde{u}^i$ have different time spaces of $[t_{i-1}, t_i]$ while in relay case they have the same space of $[0, t_m]$. $\tilde{y}^i(t)$ and $\tilde{u}^i(t)$ have transients and do not decay to zero. They are thus neither absolutely integrable nor periodic, and cannot be treated directly using Fourier transform to get the process frequency response C(jω) (Wang et al. 1997). Decompose the responses into the transient parts and steady state parts as $$\tilde{y}^i(t)=\Delta\tilde{y}^i(t)+\tilde{y}_s^i(t),\ i=1,2,\ldots,m, \quad (60a)$$

$$\tilde{u}^i(t)=\Delta\tilde{u}^i(t)+\tilde{u}_s^i(t),\ i=1,2,\ldots,m, \quad (60b)$$

Under each test i, $\tilde{y}^i(t)$ and $\tilde{u}^i(t)$ have almost entered the steady states at $t=t_i$, and both $\Delta\tilde{y}^i(t)$ and $\Delta\tilde{u}^i(t)$ are approximately zero afterwards. The Fourier transform of $\Delta \tilde{y}^i(t)$ then gives its frequency response $$\Delta \tilde{Y}^i(j\omega) = \int_0^\infty \Delta \tilde{y}^i(t) e^{-j\omega t} dt. \tag{61}$$

In practice, (61) is approximated by $$\Delta \tilde{Y}^i(j\omega) \approx \int_{t_S^i}^{t_E^i} \Delta \tilde{y}^i(t) e^{-j\omega t} dt, \tag{62}$$

where the start time $t_S^i$ and the end time $t_E^i$ are defined as $$t_S^i = \begin{cases} t_{i-1}, & \text{Case 2,} \\ 0, & \text{Case 3 or 4,} \end{cases}$$

and $$t_E^i = \begin{cases} t_i, & \text{Case 2,} \\ t_m, & \text{Case 3 or 4.} \end{cases}$$

(62) can be computed at discrete frequencies using the standard FFT technique, which is a fast algorithm for calculating the discrete Fourier transform (DFT).

If the test (say, a step test) gives a constant steady state of the output, $\tilde{y}^i(t_i)$, we have $$\tilde{Y}_s^i(j\omega) = \frac{\tilde{y}_s^i(t_i)}{j\omega}, \quad i = 1, 2, \ldots, m. \tag{64}$$

On the other hand, if the test (e.g. relay) causes stationary oscillations, it then follows from Kuhfitting (1978) that $$\tilde{Y}_s^i(j\omega) = \frac{1}{1 - e^{-j\omega T_i}} \int_{t_i - T_i}^{t_i} \tilde{y}_s^i(t) e^{-j\omega(t + T_i - t_i)} dt, \tag{65}$$

where $T_i$ is the period of the stationary oscillations of $\tilde{y}_s^i$. Similarly, the following expression can be obtained:

$$\tilde{U}_s^i(j\omega) = \begin{cases} \dfrac{\tilde{u}_s^i(t_i)}{j\omega}, & \text{step test,} \\ \dfrac{1}{1 - e^{-j\omega T_i}} \int_{t_i - T_i}^{t_i} \tilde{u}_s^i(t) e^{-j\omega(t + T_i - t_i)} dt, & \text{relay test.} \end{cases} \tag{66}$$

For each test i, it follows from (53) that there holds the frequency response relation:

$$\tilde{Y}^i(j\omega) = G(j\omega) \tilde{U}^i(j\omega), \; i=1, 2, \ldots m, \tag{67}$$

where $$\tilde{Y}^i(j\omega) = \Delta\tilde{Y}^i(j\omega) + \tilde{Y}_s^i(j\omega), \tag{68a}$$

$$\tilde{U}^i(j\omega) = \Delta\tilde{U}^i(j\omega) + \tilde{U}_s^i(j\omega) \tag{68b}$$

are obtained from (61)–(66). Collecting (67) for all i gives $$\tilde{Y}(j\omega) = G(j\omega)\tilde{U}(j\omega), \tag{69}$$

where $$\tilde{Y}(j\omega) = [\tilde{Y}^1(j\omega) \tilde{Y}^2(j\omega) \ldots \tilde{Y}^m(j\omega)],$$

$$\tilde{U}(j\omega) = [\tilde{U}^1(j\omega) \tilde{U}^2(j\omega) \ldots \tilde{Y}^m(j\omega)].$$

All three cases (2, 3, 4) give an invertible $\tilde{U}$, and then the process frequency response can be calculated by $$G(j\omega) = [\Delta\tilde{Y}^1(j\omega) + \tilde{Y}_s^1(j\omega) \ldots \Delta\tilde{Y}^m(j\omega) + \tilde{Y}_s^m(j\omega)] \cdot \tag{70}$$
$$[\Delta\tilde{U}^1(j\omega) + \tilde{U}_s^1(j\omega) \ldots \Delta\tilde{U}^m(j\omega) + \tilde{U}_s^m(j\omega)]^{-1},$$

which is valid at all $\omega \in [0, \infty)$ for Case 2 and Case 4, and at $\omega \in (0, \infty)$ for Case 3. For $\omega=0$ in Case 3, we can determine the static gain of the process from output and input steady states by $$G(0) = [\tilde{y}_s^{\,1}(t_1) \ldots \tilde{y}_s^{\,m}(t_m)][\tilde{u}_s^{\,1}(t_1) \ldots \tilde{u}_s^{\,m}(t_m)]^{-1} \tag{71}$$

5.3 Construction of Process Step Response and Process Transfer Function

Once the frequency response matrix G(jω) of the process is obtained, process step response can be constructed for each element, and for which a transfer function can be further estimated. Since this construction involves only single-input and single-output problem in an elementwise way, method discussed in closed-loop identification can be applied to construct the step response. To further produce a FOPDT/SOPDTZ or higher-order transfer function, the open-loop step identification method presented can be applied.

5.4 Identification Algorithm

The proposed identification algorithm is summarized as follows:

Initialization: Bring the process to the constant steady states. Specify test type (relay or step), their sizes and the test mode (open-loop or closed-loop).

Step 1: Perform the sequential experiment and record all the process input and process output responses.

Step 2: For Case 1, go to Step 4 directly. Otherwise, Calculate the frequency response G(jω)).

Step 3: Construct the process step response.

Step 4: Estimate the FOPDT or SOPDTZ models with the open-loop process identification method.

EXAMPLE

Consider the well-known Wood/Berry (WB) binary distillation column plant (Wood and Berry 1973).

$$G(s) = \begin{bmatrix} \dfrac{12.8 e^{-s}}{16.7 s + 1} & \dfrac{-18.9 e^{-3s}}{21 s + 1} \\ \dfrac{6.6 e^{-7s}}{10.9 s + 1} & \dfrac{-19.4 e^{-3s}}{14.4 s + 1} \end{bmatrix}.$$

Suppose that the process is under the control of a decentralized PI controller (Luyben 1986):

$$K(s) = \begin{bmatrix} 0.38 + \dfrac{0.045}{s} & 0 \\ 0 & -0.075 - \dfrac{0.0032}{s} \end{bmatrix},$$

and the process is at a constant steady state. With the controller in action, a closed-loop sequential relay feedback experiment is carried out on top of it. A relay with the amplitude of 1 and the bias of 0.1 is first applied to the first loop while the second loop is kept unattached. When stationary oscillations are reached at t=200, a relay test is made in the second loop with the amplitude of 1 and the bias of 0.1 till t=400, while the previous change in the first loop is still in place. Then the proposed method gives the estimated model:

$$\hat{G}(s) = \begin{bmatrix} \dfrac{12.8000e^{-1.0009s}}{16.7050s+1} & \dfrac{-18.9000e^{-3.0009s}}{21.0050s+1} \\ \dfrac{6.6000e^{-7.0009s}}{10.9050s+1} & \dfrac{-19.4000e^{-3.0009s}}{14.4050s+1} \end{bmatrix},$$

where the errors are $$\epsilon = \begin{bmatrix} 0.006227\% \\ 0.01352\% \end{bmatrix}$$

and $$E = \begin{bmatrix} 0.1458\% & 0.0562\% \\ 0.0563\% & 0.0639\% \end{bmatrix},$$

respectively.

Suppose now that some fast dynamics is taken into consideration to get $$G(s) = \begin{bmatrix} \dfrac{12.8e^{-s}}{16.7s+1} & \dfrac{-18.9e^{-3s}}{(21s+1)(0.5s+1)^3} \\ \dfrac{6.6e^{-7s}}{10.9s+1} & \dfrac{-19.4e^{-3s}}{(14.4s+1)(2s+1)^3} \end{bmatrix}.$$

The identified FOPDT model is $$\hat{G}(s) = \begin{bmatrix} \dfrac{12.8000e^{-1.0012s}}{16.100s+1} & \dfrac{-18.9000e^{-4.5010s}}{21.0084s+1} \\ \dfrac{6.6000e^{-7.0011s}}{10.9053s+1} & \dfrac{-19.400e^{-8.5038s}}{17.2503s+1} \end{bmatrix},$$

with $$\epsilon = \begin{bmatrix} 0.2883\% \\ 0.03272\% \end{bmatrix}$$

with
and $$E = \begin{bmatrix} 0.1461\% & 3.4834\% \\ 0.0564\% & 10.0421\% \end{bmatrix},$$

respectively. As expected, a larger error in $\hat{G}_{22}(S)$ than that in $\hat{G}_{12}(s)$ exists where the impact of the fast dynamics is more severe. To improve the accuracy, second-order models for $G_{12}(s)$ and $G_{22}(s)$ are identified to yield $$\hat{G}(s) = \begin{bmatrix} \dfrac{12.8000e^{-1.0012s}}{16.7100s+1} & \dfrac{-18.9000e^{-3.7772s}}{15.2929s^2+21.7327s+1} \\ \dfrac{6.6000e^{-7.0011s}}{10.9053s+1} & \dfrac{-19.400e^{-5.6027s}}{50.2513s^2+17.7990s+1} \end{bmatrix},$$

with $$\epsilon = \begin{bmatrix} 0.09282\% \\ 0.02502\% \end{bmatrix}$$

and $$E = \begin{bmatrix} 0.1461\% & 2.7190\% \\ 0.0564\% & 3.5746\% \end{bmatrix},$$

respectively. It is also possible to produce third-order models for $G_{12}(s)$ and $G_{22}(s)$ to get $$\hat{G}(s) = $$
$$\begin{bmatrix} \dfrac{12.8000e^{-1.0012s}}{16.7100s+1} & \dfrac{-2.2690s^2+101.6138s+18.9000}{68.9655s^3+129.4690s^2+27.0897s+1}e^{-3.8684s} \\ \dfrac{6.6000e^{-7.0011s}}{10.9053s+1} & \dfrac{21.7813s^2+12.8672s+19.4}{78.1250s^3+71.6719s^2+19.0391s+1}e^{-5.0823s} \end{bmatrix},$$

with even smaller errors $$\epsilon = \begin{bmatrix} 0.07213\% \\ 0.01855\% \end{bmatrix}$$

and $$E = \begin{bmatrix} 0.1461\% & 1.6266\% \\ 0.0564\% & 0.2912\% \end{bmatrix},$$

respectively. It is however noticed that SOPDT models have achieved good accuracy.

Figure 15:
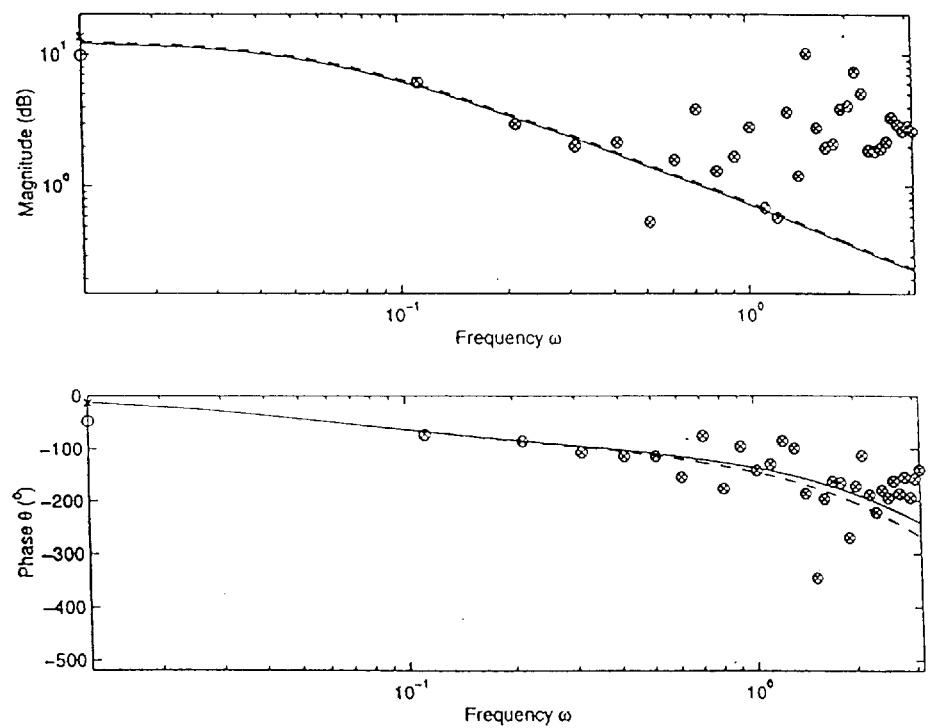
FIG. 15 is a graphical view of Bode plots for a Wood/Berry (WB) plant under NSR=30%.
Figure 16:
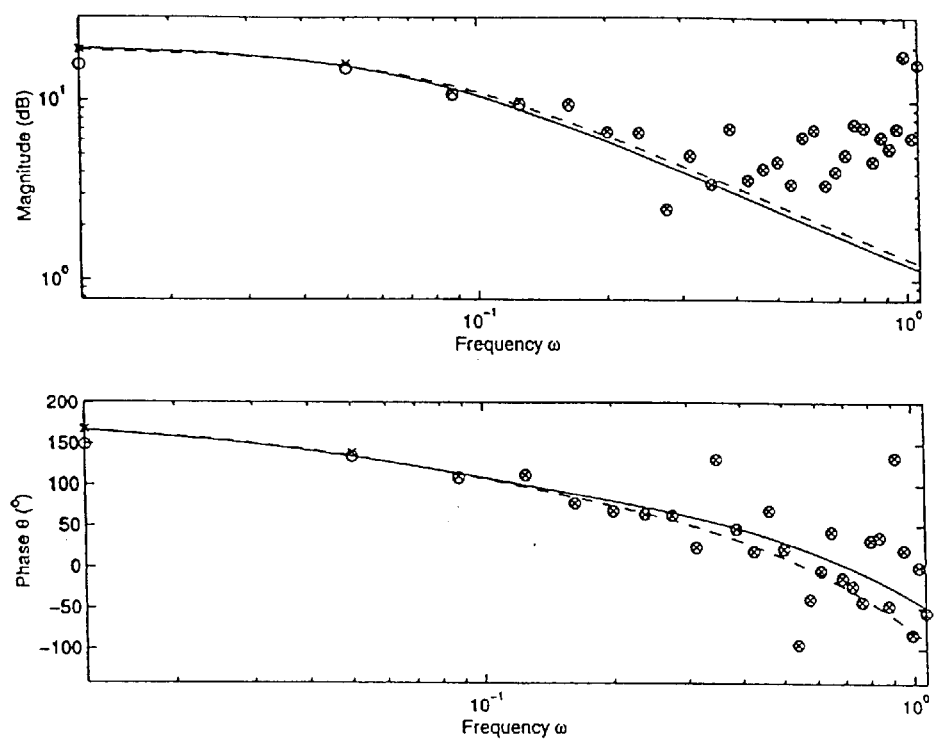
FIG. 16 is a graphical view of Bode plots for a Wood/Berry (WB) plant under NSR=30%.

Since the proposed method makes use of many points rather than one or two points on the process response and adopts a LS or an IV method, it is expected to be robust to measurement noise. To demonstrate this, the WB process is again tested under different noise levels. For comparison, the Melo's method (Melo and Friedly 1992) for the estimation of the process frequency response is also tested under the same conditions. The results are listed in Table 8. The robustness of the proposed method is evident. FIG. 15 and FIG. 16 show the Bode plots for $G_{11}$ and $G_{22}$ of this WB plant under NSR=30%, respectively, where the dashed line is for the actual plant, solid line for the model from our method, 'x' for the proposed FFT algorithm without further IFFT and transfer function modeling while 'o' for Melo's method.

6 IMC-Based Controller Design for MIMO System

For MIMO IMC system shown in FIG. 8, $\hat{G}$ is assumed to be identical with G and be square:

$$\hat{G}(s) = G(s) = \begin{bmatrix} g_{11}(s) & \cdots & g_{1m}(s) \\ \vdots & \ddots & \vdots \\ g_{ml}(s) & \cdots & g_{mm}(s) \end{bmatrix}, \quad (72)$$

where $$g_{ij}(s) = g_{ij0}(s)e^{-L_{ij}s},$$

and $g_{ij0}(s)$ are strictly proper, stable scalar rational functions and $L_{ij}$ are non-negative constants.

Following Wang et al. (1999c), the decoupled closed-loop transfer function matrix of the IMC system is given by $$GC = \text{diag}\{h_{ii}\} = \text{diag}\{\bar{g}_{ii}c_{ii}\} = \text{diag}\left\{\dfrac{|G|}{G^{ii}}c_{ii}, i=1,2,\ldots,m\right\}. \quad (73)$$

The performance limitations for IMC systems imposed by the non-minimum phase zeros and time delays, which are inherent in a particular loop, is taken into account in Wang et al. (1999c). Thus the resultant closed-loop systems, $h_{ii}$, is given in terms of their unavoidable non-minimum elements, $$h_{ii} = \prod_{\beta_{hi} \in \{Z_{|G|}^+|\zeta_{hi}>0\}} \left(\frac{\beta_{hi}-s}{\beta_{hi}+s}\right)^{\zeta_{hi}} f_i(s) e^{-\gamma_{hi}s}, \forall\, i \in m, \quad (74)$$

where $\zeta_{hi} = \zeta_z(|G|) - \zeta_i(z)$, $\gamma_{hi} = \max(\gamma(|G|) - \gamma_i, 0)$, $\zeta_i$ and $\gamma_i$ are defined as $$\zeta_i \triangleq \min_{j \in J_i} \zeta(G^{ij}),$$

$$\gamma_i \triangleq \min_{j \in J_i} \gamma(G^{ij}),$$

respectively (see (Wang et al. 1999c) for more detail). $f_i(s)$ is the ith loop IMC filter, which is chosen as $$\frac{1}{\tau_{cli}s+1}$$

through out the presentation here.

Like SISO system, the IMC system is equivalent to classic feedback system, if the feedback controller $G_c$ is related to the IM(C controller C via $$G_c = \frac{C}{1-GC} = \begin{bmatrix} \dfrac{c_{11}}{1-\dfrac{|G|}{G^{11}}c_{11}} & \dfrac{c_{12}}{1-\dfrac{|G|}{G^{22}}c_{22}} & \cdots & \dfrac{c_{1m}}{1-\dfrac{|G|}{G^{mm}}c_{mm}} \\ \vdots & \vdots & \cdots & \vdots \\ \dfrac{c_{m1}}{1-\dfrac{|G|}{G^{11}}c_{11}} & \dfrac{c_{m2}}{1-\dfrac{|G|}{G^{22}}c_{22}} & \cdots & \dfrac{c_{mm}}{1-\dfrac{|G|}{G^{mm}}c_{mm}} \end{bmatrix}. \quad (75)$$

Thus, if each diagonal element $g_{c_{ii}}$ is designed as $$g_{c_{ii}} = \frac{c_{ii}}{1-\tilde{g}_{ii}c_{ii}}, \quad (76)$$

i.e., $$g_{c_{ii}} = \frac{h_{ii}}{1-h_{ii}}\tilde{g}_{ii}^{-1}, \quad (77)$$

and the off-diagonal elements $g_{c_{ji}}$ are chosen as $$g_{c_{ji}} = \frac{c_{ji}}{1-\dfrac{|G|}{G^{ii}}c_{ii}} = \frac{G^{ij}}{G^{ii}}g_{c_{ii}}, \quad j \neq i, \quad (78)$$

the open-loop transfer matrix of the classic feedback system, $Q = GG_c$, must be diagonal $$GG_c = \text{diag}\left\{\frac{|G|}{G^{ii}}g_{c_{ii}}\right\} = \text{diag}\{\tilde{g}_{ii}g_{c_{ii}}\} = \text{diag}\left\{\frac{h_{ii}}{1-h_{ii}}, i=1,2,\ldots,m\right\}. \quad (79)$$

In $h_{ii}$, $\tau_{cli}$ is the only tuning parameter to be selected by the user, which can lead to a good ith-loop controller approximation to the corresponding IMC one. With $h_{ii}$ specified in (73), the ideal diagonal elements of the controller can be obtained from (77). The corresponding decoupling off-diagonal elements $g_{c_{ij}}(s)$ of the controller are determined individually by solving (78).

However the ideal controller, is generally highly complicated and/or unrealizable. One notes that for a given i, (79) is independent of the controller off-diagonal elements, but contains only the controller diagonal element $g_{c_{ii}}$ and $\tilde{g}_{ii}$ can be regarded as the equivalent process that $g_{c_{ii}}$ faces. $g_{c_{ii}}$ can then approximated by $\hat{g}_{c_{ii}}$ with respect to the equivalent processes $\tilde{g}_{c_{ii}}$ first with IMC-SL controller design method (Section 4). And then apply a suitable model reduction to obtain the best approximation $\hat{g}_{c_{ij}}$ to $g_{c_{ij}}$ to ensure the decoulping performance. Like SISO cases, if the user specifies the type of $\tilde{G}_c$ (say, PID), then the model reduction algorithm will generate its parameters. If the approximation accuracy and decoupling performance are both satisfactory, the design is completed; otherwise, we will adjust the IMC controller performance down until each loop approximation and the overall decoupling performance are satisfactory. On the other hand, if the user has no preference on controller structure, our algorithm starts with a PID type, and gradually increases the controller complexity such that the simplest approximation $\hat{G}_c$ is attained with the guaranteed accuracy to $G_c$. This allows a unified treatment of all cases and facilitates auto-tuning application.

6.1 PID Controller

For a start, a multivariable PID-type controller which can be described as $$\hat{G}_c(s) = \{\hat{g}_{c_{ij}}(s)\}, \hat{g}_{c_{ij}}(s) = k_{Cij} + k_{Iij}\frac{1}{s} + k_{Dij}s,$$

or $$\hat{G}_c(s) = K_c + K_i\frac{1}{s} + K_d s = \begin{bmatrix} I & \dfrac{1}{s}I & sI \end{bmatrix} \begin{bmatrix} K_c \\ K_i \\ K_d \end{bmatrix}$$

is employed. According to closed-loop specifications (74), it follows that the desired open-loop transfer matrix is $$Q(s) = H(s)[I - H(s)]^{-1} = \text{diag}\left\{\frac{h_{ii}}{1-h_{ii}}\right\} = \text{diag}\{q_{ii}\}.$$

The actual open-loop) transfer matrix is $GG_c = \hat{Q} = \{\hat{q}_{il}\}$. Matching $GG_c$ to Q yields $$G(s)G_c(s) = G(s)\begin{bmatrix} I & \dfrac{1}{s}I & sI \end{bmatrix} \begin{bmatrix} K_c \\ K_i \\ K_d \end{bmatrix} = Q. \quad (80)$$

Let $s = j\omega_k$, $k=1,2,\ldots,n$, it follows $$G(j\omega_k)\begin{bmatrix} I & \dfrac{1}{j\omega_k}j\omega_k I \end{bmatrix} \begin{bmatrix} K_c \\ K_i \\ K_d \end{bmatrix} = Q(j\omega_k). \quad (81)$$

Equation (81) is a system of linear complex equations as $\Psi^T \theta = \Omega$, where $$\Psi^T = \begin{bmatrix} G(j\omega_1) & \dfrac{G(j\omega_1)}{j\omega_1} & j\omega_1 G(j\omega_1) \\ \vdots & \vdots & \vdots \\ G(j\omega_n) & \dfrac{G(j\omega_n)}{j\omega_n} & j\omega_n G(j\omega_n) \end{bmatrix},$$

-continued $$\theta = \begin{bmatrix} K_c \\ K_i \\ K_d \end{bmatrix}, \quad \Omega = \begin{bmatrix} Q(j\omega_1) \\ \vdots \\ Q(j\omega_n) \end{bmatrix}.$$

Define $$\Phi^T = \begin{bmatrix} \text{Re}(\Psi^T) \\ \text{Im}(\Psi^T) \end{bmatrix}, \quad \Gamma = \begin{bmatrix} \text{Re}(\Omega) \\ \text{Im}(\Omega) \end{bmatrix},$$

a system of linear real equations is obtained:

$$\Phi^T\theta = \Gamma. \tag{82}$$

Then the parameters ($K_c$, $K_i$, $K_d$) can be determined by solving equation (82) with the least squares method $$\theta^* = (\Phi\Phi^T)^{-1}\Phi\Gamma \tag{83}$$

In MIMO design, even could be satisfied with the loop performance, PID would still be found to be inadequate to compensate the interactions whose dynamics may also be very complicated and fails to achieve the decoupling. To ensure both decoupling and loop) performance be satisfactory, we require that for $s \in D_i$ the following is satisfied $$E_{oi} = \max_\omega \left| \frac{\hat{q}_{ii}(j\omega) - q_{ii}(j\omega)}{q_{ii}(j\omega)} \right| \leq \epsilon_{oi}, \forall i \in m, \tag{84}$$

$$E_{di} = \max_\omega \frac{\sum_{j \neq i} |\hat{q}_{ji}(j\omega)|}{|\hat{q}_{ii}(j\omega)|} \leq \epsilon_{di}, \forall i \in m, \tag{85}$$

where $\epsilon_d$ and $\epsilon_o$ corresponds to the performance specifications on the loop interactions and loop performance, respectively and $$D_i = \{s \in C \mid s = j\omega_i - \omega_n < \omega < \omega_n\}, \tag{86}$$

where $\omega_n > 0$ is chosen large enough such that the magnitude of $\hat{q}_{ii}$ drop well below unity. Here, the fitting frequencies ($\omega_1 \sim \omega_n$) are chosen as ($\omega_{bmax}/100, \omega_{bmax}$), where $\omega_{bmax}$ is the maximum closed-loop bandwidth, i.e., $$\omega_{bmax} = \max_i(\omega_{bi}) = \max_i\left(\frac{1}{\tau_{cli}}\right).$$

Usually $\epsilon_{oi}$ may be set as 3%, while $\epsilon_{di}$ may be set as 10%. If both (84) and (85) hold true, the design is completed. Otherwise, one can always detune PID by relaxing the IMC specification, i.e., increasing $\tau_{cli}$, i.e., $$\tau_{cli}^{k+1} = \tau_{cli}^k + \eta_i^k \max(\gamma_{hi}, \min \text{Re}\beta_{hi}), \tag{87}$$

where k represents the k-th iteration, and $\eta_i$ is an adjustable factor of ith-loop reflecting both the approximation accuracy and the decoupling performance of the present iteration and is set at $$\eta_i = \max\{\eta_{oi}, \eta_{di}\},$$

where $$\eta_{oi} = \begin{cases} 0 & \text{if } E_{oi} \leq 3\%, \\ \frac{1}{4} & \text{if } 3\% < E_{oi} \leq 20\%, \\ \frac{1}{2} & \text{if } 20\% < E_{oi} \leq 100\%, \\ 1 & \text{if } 100\% < E_{oi}, \end{cases} \text{ and } \eta_{di} = \begin{cases} 0 & \text{if } E_{di} \leq 10\%, \\ \frac{1}{2} & \text{if } 10\% < E_{di} \end{cases}$$

The iteration continues until both (84) and (85) are fulfilled

EXAMPLE

Consider the well-known Wood/Berry binary distillation column plant (Wood and Berry 1973)

$$G(s) = \begin{bmatrix} \frac{12.8e^{-s}}{16.7s+1} & \frac{-18.9e^{-3s}}{21s+1} \\ \frac{6.6e^{-7s}}{10.9s+1} & \frac{-19.4e^{-3s}}{14.4s+1} \end{bmatrix}$$

Based on the previous work (Section 4), we have $$h_{11} = \frac{e^{-3.3s}}{\tau_{cl1}s+1}$$

with the filter chosen as $$\frac{1}{\tau_{cl1}s+1}, \text{ and } h_{22} = \frac{e^{-5.3s}}{\tau_{cl2}s+1}$$

with the filter chosen as $$\frac{1}{\tau_{cl2}s+1}.$$

According to the parameter chosen rule in single-loop controller design, the initial parameter values are $\tau_{cl1}^0 = 4.06$ and $\tau_{cl2}^0 = 6.84$. For those parameter, the overall controller can be obtained from (83), $$G_c = \begin{bmatrix} 0.1434 + \frac{0.0213}{s} - 0.4220s & -0.0153 - \frac{0.0125}{s} + 0.0978s \\ 0.0297 + \frac{0.073}{s} - 0.3209s & -0.0530 - \frac{0.0085}{s} + 0.1489s \end{bmatrix}.$$

Figure 17:
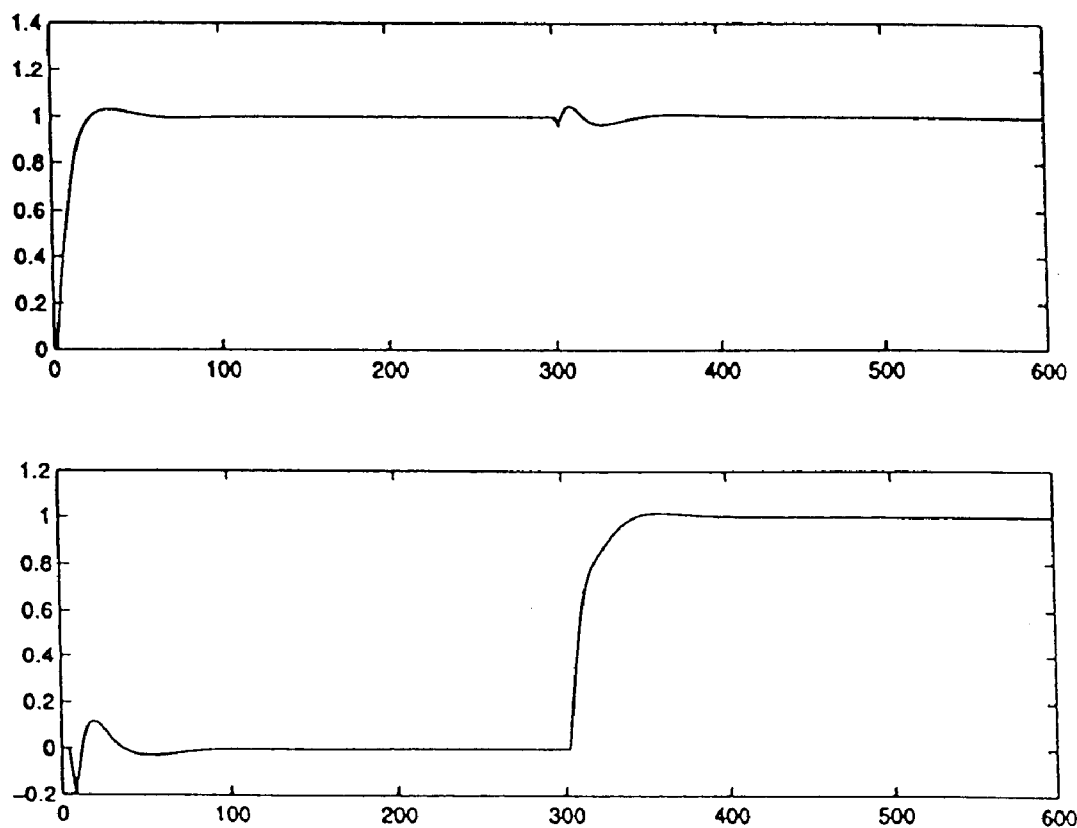
FIG. 17 is a graphical view of step responses for the WB plant.
Figure 18:
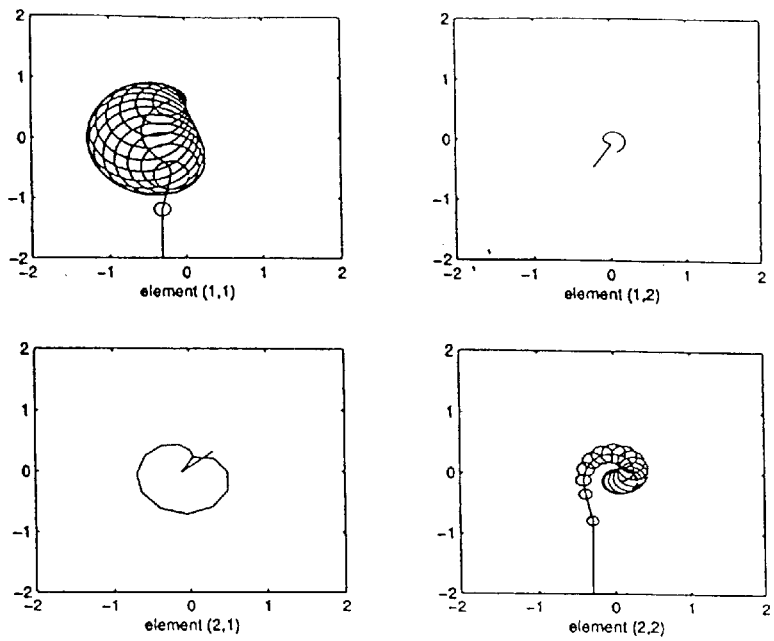
FIG. 18 is a graphical view of a Nyquist array with Gershgorin bands for the WB plant.

The step response is shown in FIG. 17, and the Nyquist array with Gershgorin bands of the actual open-loop transfer matrix $GG_c$ are shown in FIG. 18.

Figure 19:
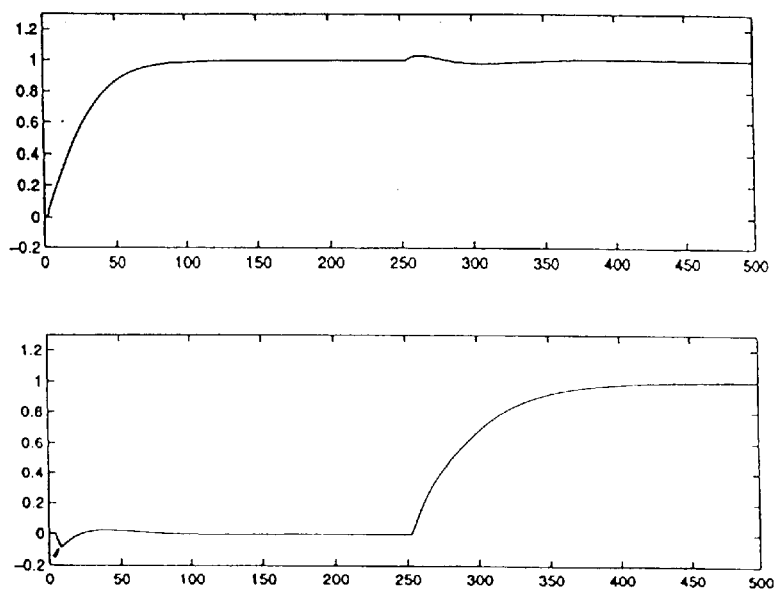
FIG. 19 is a graphical view of a step response of a process model.
Figure 20:
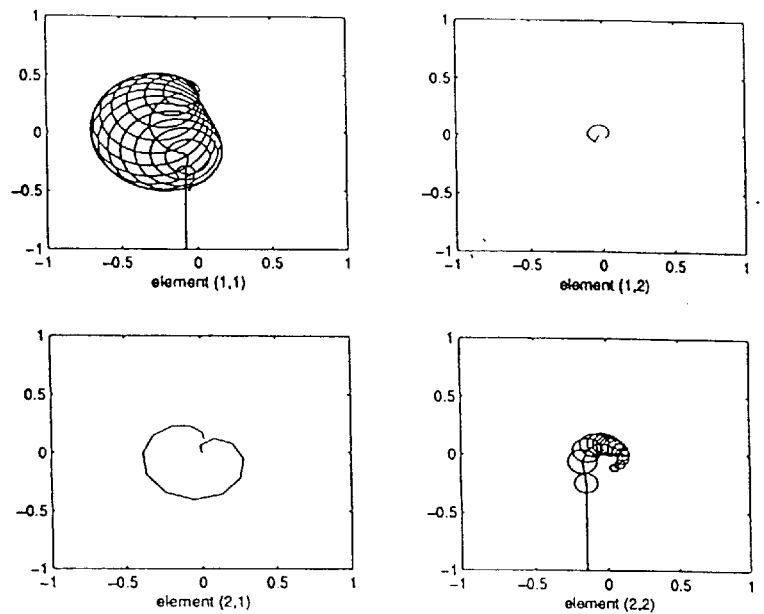
FIG. 20 is a graphical view of a Nyquist array with Gershgorin bands (PID controller)

At the initial $\tau_{cl1}$, $\hat{g}_{c_{11}}$ and $\hat{g}_{c_{22}}$ are obtained with $E_{o1}$= 29.33% and $E_{o2}$=26.79%. Both of them are not satisfied the specific accuracy threshold. Moreover, the decoupling index $E_{d1}$=52.26% and $E_{d2}$=19.83% can not satisfy the criterion. According to the proposed tuning procedure, $\tau_{cli}$ are increased until the approximation error and the decouping index are small enough to satisfy (84) and (85), respectively. Our design procedure results in $\tau_{cl1}$=23.04, $\tau_{cl2}$=37.32 and the overall controller $$G_c = \begin{bmatrix} 0.0470 + \frac{0.0060}{s} - 0.2477s & -0.0004 - \frac{0.0036}{s} - 0.0495s \\ 0.0147 + \frac{0.0020}{s} - 0.1843s & -0.0143 - \frac{0.0024}{s} + 0.0688s \end{bmatrix}.$$

with $E_{o1}=1.48\%$, $E_{o2}=2.96\%$, $E_{d1}=1.45\%$ and $E_{d2}=5.67\%$. The step response is shown in FIG. 19. The Nyquist array with Gershgorin bands of the actual open-loop transfer matrix $GG_c$ are shown in FIG. 20.

6.2 High-Order Controller

In this section, the controller elements $g_{c_{ij}}$ is chosen to be a $n_{ij}$th-order rational transfer function plus a time delay of $\gamma_{ij}$ in form of (88), $$\hat{G}_c = \{\hat{g}_{c_{ij}}\}, \hat{g}_{c_{ij}} = \frac{b_{nij}s^n + b_{n-1ij}s^{n-1} + \ldots + b_{1ij}s + b_{0ij}}{s^n + a_{n-1ij}s^{n-1} + \ldots + a_{1ij}s} e^{-\gamma_{ij}s}, \quad (88)$$

but this is necessary for high performance. One also notes that a possible time delay is included, which is necessary for decoupling and it also result from model reduction, otherwise controller order will be even higher. Though design calculations are more involved and controller is more complex, they only involve simple computations and can be made automatic, controller is directly realizable. Now the problem at hand is to find a low-order rational function plus dead time model:

$$\hat{\psi} = \frac{b_n s^n + b_{n-1}s^{n-1} + \ldots + b_1 s + b_0}{s^n + a_{n-1}s^{n-1} + \ldots + a_1 s} e^{-\gamma s}, \quad (89)$$

such that $$J \triangleq \sum_{i=1}^{M} |W(j\omega_i)(\hat{\psi}(j\omega_i) - \psi(j\omega_i))|^2 \quad (90)$$

is minimized. Note that (89) contains the unknown time delay $\gamma$ to be estimated and it makes the problem nonlinear. If the time delay $\gamma$ is known, then the problem becomes to approximate a modified process $\psi_0(s) = \psi(s)e^{\gamma s}$ with a rational transfer function $$\frac{b_n s^n + b_{n-1}s^{n-1} + \ldots + b_1 s + b_0}{s^n + a_{n-1}s^{n-1} + \ldots + a_1 s}.$$

A number of methods for rational approximation without delay are discussed in the survey by Pintelon et al. (1994). Both recursive and non-recursive approaches are covered. The general form of the cost function can be written as $$J^{(k)} = \sum_{i=1}^{M} \left| \frac{W}{s^n + a_{n-1}^{(k-1)}s^{n-1} + \ldots + a_1^{(k-1)}s} \{\psi_0(s)[s^n + a_{n-1}^{(k)}s^{n-1} + \ldots + a_1^{(k)}s] - [b_n^{(k)}s^n + b_{n-1}^{(k)}s^{n-1} + \ldots + b_1^{(k)}s + b_0^{(k)}]\}\right|_{s=j\omega_i}^{2}, \quad (91)$$

where k denotes the index for the kth recursion in the iterative weighted linear least square method, and $$\overline{W} = \frac{W}{s^n + a_{n-1}^{(k-1)}s^{n-1} + \ldots + a_1^{(k-1)}s}$$

operates as a weighting function derived from the parameters generated in the last recursion. Different weighting functions are employed in the various methods cited in the survey and above weighting is found to be most suitable. In this paper, the $\overline{W}$ is chosen as $$\frac{1}{s^n + a_{n-1}^{(k-1)}s^{n-1} + \ldots + a_1^{(k-1)}s}$$

and standard LS is applied in each iteration. On convergence, the resultant parameters will form one solution to (90). To derive the relevant recursive equations, we re-arrange (91) to yield the matrix equation $$\eta_k \phi_k^T \theta_k,$$

where $$\eta_k = \frac{-\psi_0(j\omega_i)(j\omega_i)^n}{(j\omega_i)^n + a_{n-1}^{(k-1)}(j\omega_i)^{n-1} + \ldots + a_1^{(k-1)}(j\omega_i)},$$

$$\theta_k = [a_{n-1}^{(k)} \cdots a_1^{(k)} b_n^{(k)} b_{n-1}^{(k)} \cdots b_1^{(k)} b_0^{(k)}]^T,$$

$$\phi_k = \frac{[\psi_0(j\omega_i)(j\omega_i)^{n-1} \cdots \psi_0(j\omega_i)(j\omega_i) - ((j\omega_i)^n - (j\omega_i)^{n-1} \cdots -(j\omega_i) - 1)]^T}{(j\omega_i)^n + a_{n-1}^{(k-1)}(j\omega_i)^{n-1} + \ldots + a_1^{(k-1)}(j\omega_i)}.$$

The standard recursive least square method can then be applied. Like the LS algorithm, the frequencies range for ith-loop in RLS, $(\omega_{li}\sim\omega_{ni})$, is also chosen as $(\omega_{bi}/100, \omega_{bi})$ with the step of $$\left(\frac{1}{100} \sim \frac{1}{10}\right)\omega_{bi}.$$

In this range, RLS yields satisfactory fitting results in frequency domain. The orders of the rational parts of the controller elements are determined as the lowest such that for $s \in D_i$, a set of performance specifications on loop performance (84) and loop interaction (85) are satisfied, where $$D_i = \{s \in C | s = j\omega_i, \omega_{ni} < \omega < \omega_{ni}\}. \quad (92)$$

The solution to our original model reduction is obtained by minimizing (90) over the possible range of $\gamma$. This is a one-dimensional search problem and can be easily solved if an estimation of the range of $\gamma$ is given. In our algorithm, we choose the search range of $\gamma$ to be 0.5~2.0 times of $\gamma_0$, the theoretical value of the time delay of $\psi(s)$ and 15~20 points in that range are evaluated to find the optimal estimate $\hat{\gamma}$.

Algorithm 6.1. Seek a reduced-order model $\hat{\psi}(s)$ in (89) given $\psi(s)$ (i) Choose N between 15~20, set $\Delta\gamma = 1.5\gamma_0/N$, and obtain $\gamma_k = 0.5\gamma_0 + k\Delta\gamma$, $k = 0, 1, \ldots, N$.

(ii) For each $\gamma_k$, find rational approximation solution $\hat{\psi}_0(s)$ to the modified process $\psi_0(s) = \psi(s)e^{\gamma_k s}$ with the standard iterative least square method and evaluate the corresponding loss function J in (90) for $\hat{\psi}(s) = \hat{\psi}_0(s)e^{-\gamma_k s}$ (iii) Take as the solution the $\hat{\psi}^*(s)$ which yields the minimum J.

Now the whole controller design procedure can be summarized into the following steps.

IMC-based MIMO design procedure Seek a feedback controller $G_c(s)$ given $G(s)$ Step 1. Based on the previous work (Section 4), specify $h_{ii}$ by (74) with time delays and non-minimum phase zeros and determine the smallest $\tau^*_{di}$ for each loop, set $\tau_{di}^0 = \tau^*_{cli}$.

Step 2. Find the PID controller from (83) and evaluate $E_{oi}$ in (84) and $E_{di}$ in (85). If $E_{oi}$ and $EE_{di}$ achieve the specified accuracy $\epsilon_o$ (usually 3%) and $\epsilon_d$ (usually 10%) respectively, end the design.

Step 3. Otherwise, we have two ways to solve this problem: if PID controller is desired, update $\tau_{cli}$ by (87), and go to Step 2; else, go to Step 4.

Step 4. Adopt the high-order controller in (88), for each $g_{c_{ij}}$ start from a controller order of 2, apply Algorithm 6.1 to $g_{c_{ij}}$ to obtain $\hat{g}_{c_{ij}}$, increase n until the smallest integer n is reached with (84) and (85) hold.

EXAMPLE

Figure 21:
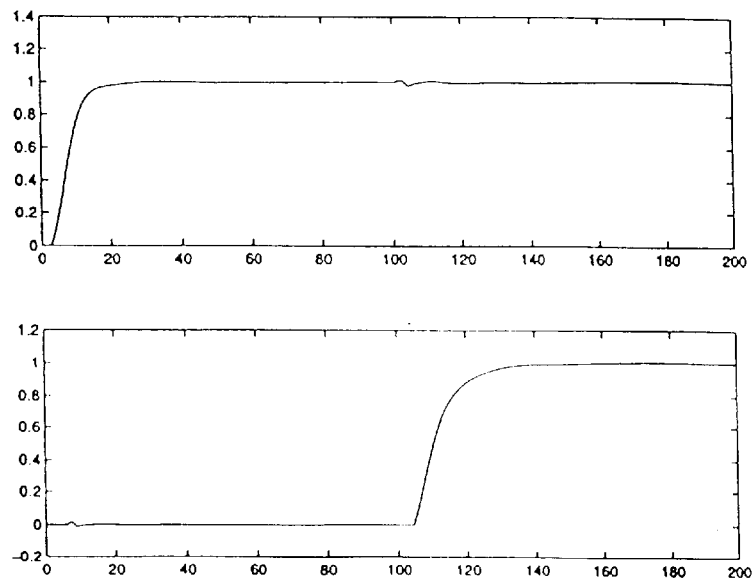
FIG. 21 is a graphical view of a step response of a process model.
Figure 22:
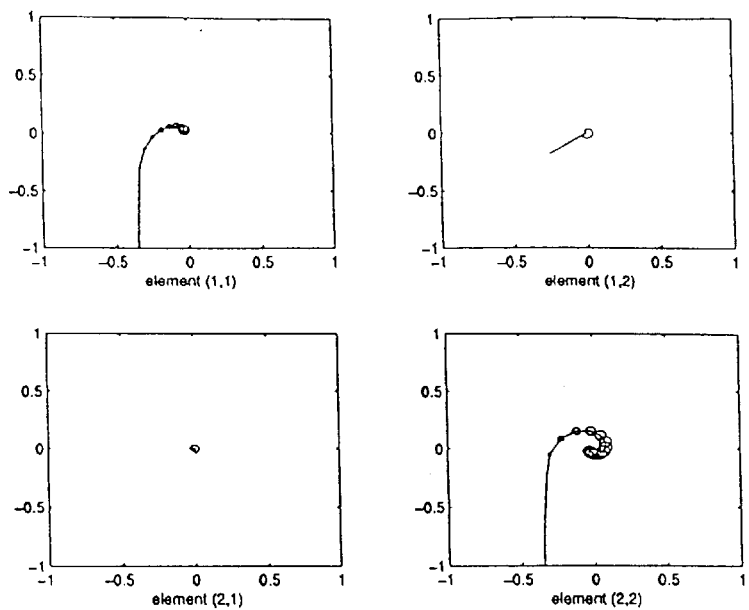
FIG. 22 is a graphical view of a Nyquist array with Gershgorin bands of an actual open-loop transfer matrix.

Reconsider the Wood/Berry Plant $$G(s) = \begin{bmatrix} \frac{12.8e^{-s}}{16.7s+1} & \frac{-18.9e^{-3s}}{21s+1} \\ \frac{6.6e^{-7s}}{10.9s+1} & \frac{-19.4e^{-3s}}{14.4s+1} \end{bmatrix},$$

for which $\tau_{c l1}^0 = 4.06$, $\tau_{d2}^0 = 6.84$ and a multivariable PID controller has been obtained there with $E_{o1}=29.33\%$, $E_{o2}=26.79\%$, $E_{d1}=52.26\%$ and $E_{d2}=19.83\%$. For high order controller, our procedure ends with $$G_c = \begin{bmatrix} \frac{0.0721s^2 + 0.0473s + 0.0025}{s^2 + 0.1166s} e^{-0.7s} & \frac{0.0269s^2 - 0.0172s - 0.0023}{s^2 + 0.1889s} \\ & -0.0498s^3 - 0.0202s^2 - \\ \frac{-0.0230s^2 + 0.0197s + 0.001}{s^2 + 0.1470s} e^{-2.2s} & \frac{0.0034s - 0.0002}{s^3 + 0.2181s^2 + 0.0225s} e^{-1.6s} \end{bmatrix},$$

with $E_{o11}=2.85\%$, $E_{o12}=2.59\%$, $E_{o21}=0.39\%$, and $E_{o22}=0.74\%$. The step response is shown in FIG. 21, and the Nyquist array with Gershgorin bands of the actual open-loop transfer matrix $GG_c$ is shown in FIG. 22. Compared with the PID performance, we can see that the high order controller give more satisfactory loop and decoupling performance.

7 High Performance Conversions between Continuous and Discrete Systems

Consider a continuous transfer function (CTF):

$$H_c(s) = \frac{b_n s^n + b_{n-1} s^{n-1} + \ldots + b_1 s + b_0}{s^n + a_{n-1} s^{n-1} + \ldots + a_1 s + a_0}, \tag{93}$$

where $a_i$ and $b_i$ are real coefficients. Suppose that an equivalent discrete transfer function (DTF) $H_d(z)$ is given by $$H_d(z) = \frac{\beta_m z^m + \beta_{m-1} z^{m-1} + \ldots + \beta_1 z + \beta_0}{z^m + \alpha_{m-1} z^{m-1} + \ldots + \alpha_1 z + \alpha_0}. \tag{94}$$

The present work is to propose a new conversion algorithm, which can yield the best DTF approximation to the original CTF regardless of CTF's order and characteristics. The proposed idea is to match the frequency response of $H_d(z)$ to $H_c(s)$ with the general transformation from s- to z-domain, i.e., $$z = e^{Ts}. \tag{95}$$

The objective can be realized by minimizing the standard loss function $$\min_{H_d} J \triangleq \min_{H_d} \sum_{i=1}^{M} |H_d(e^{jT\omega_i}) - H_c(j\omega_i)|^2, \tag{96}$$

where $(\omega_1, \omega_M)$ defines the frequencies range of interest. Equation (96) falls into the frame work of transfer function identification in frequency domain, in which $H_d$ is the known frequency response as $H_c$ is a parametric transfer function to be identified. For this identification, a number of methods are available (Pintelon et al. 1994), and the recursive least squares (RLS) algorithm is suitable for our application and is briefly described as follows. Substituting (93) and (94) to (96) at $\omega_i$ gives $$J^{(k)} \triangleq \sum_{i=1}^{M} \left| \frac{W(e^{jT\omega_i})}{(e^{jT\omega_i})^m + \alpha_{m-1}^{(k-1)}(e^{jT\omega_i})^{m-1} + \ldots + \alpha_0^{(k-1)}} \left\{ \left[ \beta_m^{(k)}(e^{jT\omega_i})^m + \beta_{m-1}^{(k)}(e^{jT\omega_i})^{m-1} + \ldots + \beta_0^{(k)} \right] - H_c(j\omega_i)\left[(e^{jT\omega_i})^m + \alpha_{m-1}^{(k)}(e^{jT\omega_i})^{m-1} + \ldots + \alpha_0^{(k)} \right] \right\} \right|^2, \tag{97}$$

where k denotes the index for the kth recursion in the iterative weighted linear least squares method, and $$\overline{W}(e^{jT\omega_i}) = \frac{W(e^{jT\omega_i})}{(e^{jT\omega_i})^m + \alpha_{m-1}^{(k-1)}(e^{jT\omega_i})^{m-1} + \ldots + \alpha_0^{(k-1)}}$$

acts as a weighting function in the standard least squares problem and it depends on the parameters generated in the last recursion. Different weighting functions are employed in the various methods cited in the survey. In this paper, the $\overline{W}$ is chosen as $1/((e^{jT\omega_i})^m + \alpha_{m-1}^{(k-1)} e^{jT\omega_i})^{m-1} + \ldots + \alpha_0^{(k-1)})$ and standard LS is applied in each iteration. On convergence, the resultant parameters will form one solution to (96). We re-arrange (97) to yield recursive equations $$\phi_k^T \theta^{(k)} = \eta_k,$$

where $$\eta_k = \frac{-H_c(j\omega_i)(e^{jT\omega_i})^m}{(e^{jT\omega_i})^m + \alpha_{m-1}^{(k-1)}(e^{jT\omega_i})^{m-1} + \ldots + \alpha_0^{(k-1)}},$$

$$\theta^{(k)} = [\alpha_{m-1}^{(k)} \ldots \alpha_0^{(k)} \beta_m^{(k)} \beta_{m-1}^{(k)} \ldots \beta_1^{(k)} \beta_0^{(k)}]^T,$$

$$\phi_k = \frac{\left[ H_c(j\omega_i)(e^{jT\omega_i})^{m-1} \ldots H_c(j\omega_i) - (e^{jT\omega_i})^m - (e^{jT\omega_i})^{m-1} \ldots -(e^{jT\omega_i}) - 1 \right]^T}{(e^{jT\omega_i})^m + \alpha_{m-1}^{(k-1)}(e^{jT\omega_i})^{m-1} + \ldots + \alpha_0^{(k-1)}}.$$

Thus, we have the recursive equation for $\theta_k$ as $$\theta^{(k)} = \theta^{(k-1)} + K_k \epsilon_k,$$

where $$K_k = P_{k-1}\phi k(I+\phi_k^T P_{k-1}\phi k)^{-1},$$

$$P_k = (I - K_k \phi_k^T) P_{k-1},$$

and $$\epsilon_k = \eta_k - \phi_k^T \theta^{(k-1)}.$$

The frequency range in the optimal fitting plays an important role. In general, our studies suggest that the frequency range $(\omega_1 \ldots \omega_M)$ be chosen as $$\left(\frac{1}{100}\omega_b, \omega_b\right)$$

with the step of $$\left(\frac{1}{100} \sim \frac{1}{10}\right)\omega_b,$$

where $\omega_b$ is the bandwidth of the S-domain transfer function. In this range, RLS yields satisfactory fitting results in frequency domain.

The preservation of stability is a crucial issue in frequency domain based identification In our study, we found that RLS method with zero initial parameter value might result in unstable $H_d(z)$, especially for high-order models, even though $H_c(s)$. is stable. Since Equation (96) is a nonlinear problem, the RLS algorithm may get different local optimal solutions, if it starts with different initial points. Among those solutions, only the stable $H_d(z)$ models are required. If we set a stable model as the initial value in RLS algorithm, it is likely to get a stable approximate as its convergent solution. Thus, in this paper, for a parametric $H_c(s)$, we set the initial model as the bilinear equivalent via (2) to the $H_c(s)$, for Franklin et al. (1990) have proven that the bilinear rule preserves stability during continuous and discrete conversions. Our extensive simulations shows that this technical works very well.

The proposed method is also applicable to inverse conversion, i.e., from DTF to CTF, provided that the loss function (96) is replaced by $$\min_{H_c} J \triangleq \min_{H_c} \sum_{i=1}^{M} |H_c(jT\omega_i) - H_d(e^{jT\omega_i})|^2, \quad (98)$$

Moreover, the method can be applied to transfer a non-parametric s-domain model such as a bode plot data to z-domain data.

In what follows, the primary application of the proposed method, that is, to convert CTF to DTF with both T and m fixed, will be illustrated with a typical plant chosen from Franklin et al. (1990). Let T be chosen according to Franklin et al. (1990), in which the desired sampling multiple ($\triangleq \omega_s/\omega_b$) for a reasonably smooth time response is suggested to be $$6 \leq \frac{\omega_s}{\omega_b} \leq 40. \quad (99)$$

Once a discrete equivalent is found, the following criterion should be used to validate the solution:

$$E = \max_{\omega} \left| \frac{H_d(e^{jT\omega}) - H_c(j\omega)}{H_c(j\omega)} \right|. \quad (100)$$

For a comparative study, the results of the proposed conversion method are compared with the commonly used methods, Tustin, zero-pole mapping transformations or Triangle equivalent.

EXAMPLE

Consider the system with time delay $$H_c = \frac{s-1}{s^2 + 4s + 5} e^{-0.35s}, \quad (101)$$

with T=0.1s. Tustin transformation gives $$H_d(z) = z^{-3} \frac{0.0392z^2 - 0.0041z - 0.0433}{z^2 - 1.6290z + 0.6701}.$$

Via Triangle approximation, $$H_d(z) = z^{-3} \frac{0.0115z^3 + 0.0456z^2 - 0.0562z - 0.0091}{z^3 - 1.6290z^2 + 0.6703z}$$

is derived. Here the input delay in $H_c(s)$ amounts to 3.5 times the sampling period of 0.1 sec. Accordingly, the discretized model $H_d(z)$ inherits an input delay of three sampling periods, and the residual half-period delay is factored into the coefficients of $H_d(z)$ by the discretization algorithm. Thus, for m=2, the proposed method generates $$H_d(z) = z^{-3} \frac{0.0042z^2 + 0.0684z - 0.0807}{z^2 - 1.6333z + 0.6740}.$$

Figure 23:
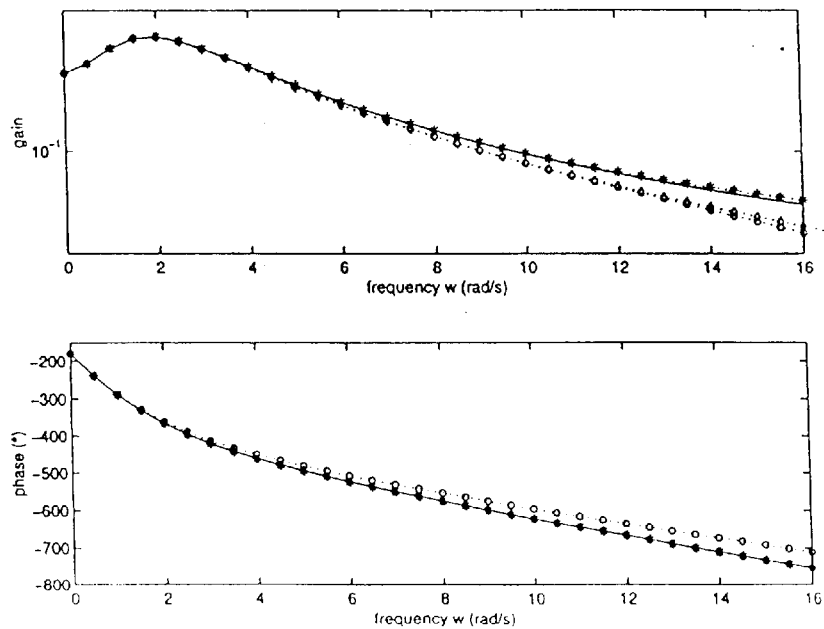
FIG. 23 is a graphical view of digital equivalents to a time delay system for the present invention and comparative systems.

FIG. 23 shows that the proposed design (E=0.50%) is much better than the results obtained from Tustin (E=29.88%) approximation, for the Tustin and matched pole/zero methods are accurate only for delays that are integer multiples of the sampling period. And the proposed design is also superior to Triangle approximation (E=5.12%), which is preferable to be used for models with delays among the conventional conversion schemes. Besides the primary use of the proposed method, there are some other cases that can be benefited.

Optimal sampling time If the user specifies T and m, then the proposed RLS algorithm will generate the parameters of $H_d(z)$ as shown in the last section. On the other hand, if the user has no preference on T, our algorithm starts with a small sample rate under m=n. Based on the sampling theorem: the sample rate must be at least twice the required closed-loop bandwidth, $\omega_b$, of the system, that is, $\omega_s/\omega_b > 2$ (Franklin et al. 1990). Thus, for optimal sampling time tuning, we start the design procedure from $\omega_s^0 = \pi\omega_b$, where $\omega_b$ can be bandwidth of transfer function or closed-loop bandwidth, some specific frequency point which needs a close mapping, or the largest frequency in fitting, i.e., $\omega_b = \max\{\omega_i\}$. If the approximation accuracy is satisfactory, the design is completed; otherwise, we will increase the sample rate with a step of $\pi\omega_b$, i.e., $$\omega_s^k 32 \omega_s^{k-1} + \pi\omega_b, \quad (102)$$

till equation (103)

$$E = \max_{\omega} \left| \frac{H_d(e^{jT\omega}) - H_c(j\omega)}{H_c(j\omega)} \right| \le \epsilon, \quad (103)$$

holds true, where k represents the k-th iteration, and $\epsilon$ is the fitting-error threshold. $\epsilon$ is specified according to the desired degree of performance, or accuracy of the CTF approximation to the DTF. Usually e may be set as 3%.

Optimal model order If the sample rate is limited by the hardware, one may gradually increases the complexity of $H_d(z)$ such that the simplest approximation $H_d(z)$ is attained with the guaranteed accuracy to $H_c(s)$ (103), i.e., the approximation performance may be improved at the expense of increasing complexity.

Resampling DTF For this application, the proposed method does not need the new sampling period T to be an integer multiple of the original sampling period. And it is a direct method to obtain new DTF by fitting the two equivalents in frequency domain, while in conventional schemes, the resampling assumes zero-order holder on the inputs and is equivalent to consecutive DTF to CTF and CTF to DTF conversions.

Conversion of DTF to CTF In the inverse operation, (103) should be written as $$E = \max_{\omega} \left| \frac{H_d(e^{jT\omega}) - H_c(j\omega)}{H_d(e^{jT\omega})} \right| \le \epsilon \quad (104)$$

to validate the solution. Here, our method show high approximation accuracy as well.

8 Disturbance Compensation for Time-Delay Processes

Figure 24:
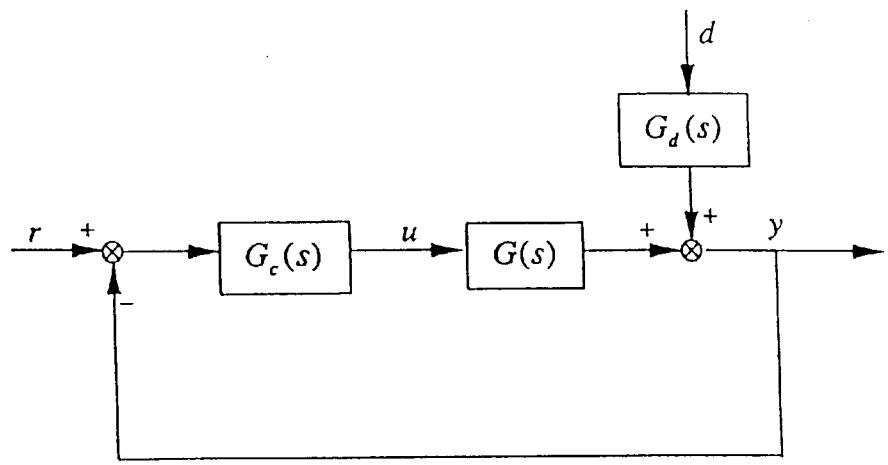
FIG. 24 is a schematic view of a feedback system incorporating disturbance.

Here, we assume that the process is minimum-phase, continuous, linear time-invariant (LTI) with time delay, unless otherwise stated. Let G(s) be the process and $G_c(s)$ the feedback controller which stabilizes G(s). The diagram of the normal feedback control system with disturbance is depicted in FIG. 24, where d is an unknown disturbance acting on the system through a dynamic $G_d(s)$. It should be pointed out that any type of disturbance and any number of disturbances can always be put equivalently as a collective disturbance d(t) In practice, there might be disturbances on the process input as well as output, and thus the equivalent one on the process output cannot be simply a step one only. It is more reasonable to describe it as a d(t) through a stable $G_d(s)$. It follows from FIG. 24 that $$Y^o = \frac{GG_c}{1 + GG_c} R + \frac{G_d}{1 + GG_c} D,$$

where the superscription o indicates the response in the normal feedback system, and R(s) and D(s) are the Laplace transforms of the reference r(t) and the disturbance d(t), respectively.

Figure 25:
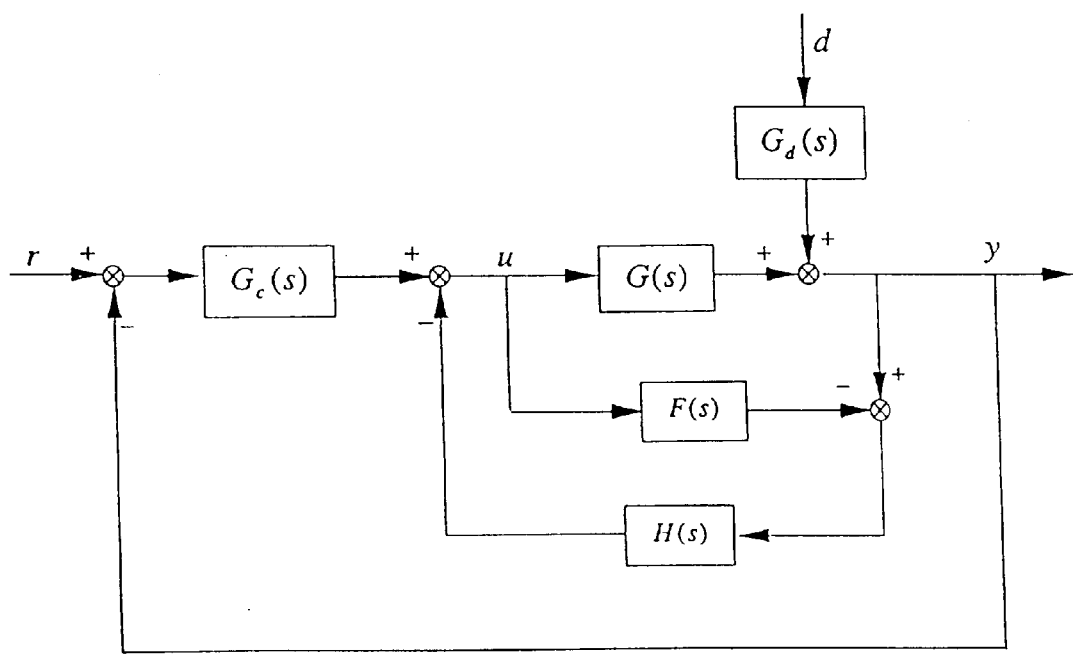
FIG. 25 is a schematic view of a control scheme according to the present invention.

A new control scheme as shown in FIG. 25 is proposed to compensate for the disturbance. The intention is to estimate the disturbance by the difference between the actual process output and the output of a transfer function, and feed the estimate into another block to fully cancel the disturbance. From FIG. 25, one has $$Y = \frac{GG_c}{1 - HF + GG_c + GH} R + \frac{1 - HF}{1 - HF + GG_c + GH} G_d D. \quad (105)$$

To fully compensate for the disturbance while retaining the input-output relation of the normal feedback system requires $$\frac{GG_c}{1 - HF + GG_c + GH} = \frac{GG_c}{1 + GG_c}, \quad (106)$$

$$\frac{1 - HF}{1 - HF + GG_c + GH} G_d D = 0,$$

which are satisfied by $$F(s) = G(s), \quad (107)$$

and $$H(s) = G^{-1}(s). \quad (108)$$

Figure 26:
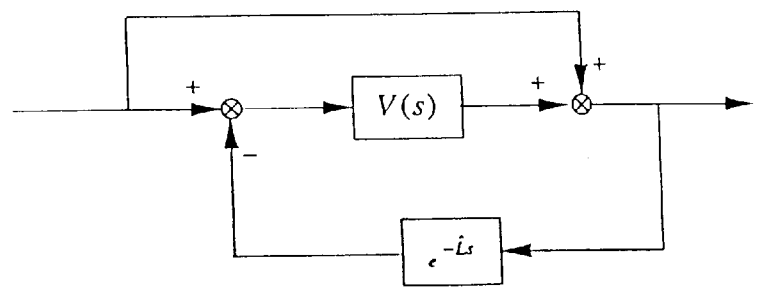
FIG. 26 is a schematic diagram of a control scheme of the related art.

Let $G(s) = G_0(s)e^{-Ls}$ and its model $\hat{G}(s) = \hat{G}_0(s)e^{-\hat{L}s}$, where $G_0$ and $\hat{G}_0$ are delay-free rational transfer functions. Then, (107) and (108) become $$F(s) = \hat{G}(s) = \hat{G}_0(s)e^{-\hat{L}s}, \quad (109)$$

$$H(s) = \frac{1}{F(s)} = \frac{1}{\hat{G}_0(s)} e^{\hat{L}s}, \quad (110)$$

respectively. For a strictly proper $\hat{G}_0(s)$, its inverse is not physically realizable, and nor is the pure predictor $e^{\hat{L}s}$. For the term $e^{\hat{L}s}$, the approximation presented in Huang et al. (1990) is here adopted, and shown in FIG. 26.

The overall transfer function is $$G_v(s) = \frac{1 + V(s)}{1 + V(s)e^{-\hat{L}s}}.$$

If V(s) is of low-pass with high gain, then $$G_v(s) \approx \frac{V(s)}{V(s)e^{-\hat{L}s}} = e^{\hat{L}s}$$

in the low-frequency range, while $G_v(s) \approx 1 + 0/1 + 0 = 1$ in the high-frequency range. The simplest choice for V(s) is a first-order element:

$$V(s) = \frac{K_v}{\tau_v s + 1}, \quad \tau_v > 0,$$

and then $G_v$ will be $$G_v(s) = \frac{1 + \frac{K_v}{\tau_v s + 1}}{1 + \frac{K_v}{\tau_v s + 1} e^{-\hat{L}s}}. \quad (111)$$

According to our simulation study, the value of $\tau_v$ is suggested to be set as $0.1\hat{L} \sim \hat{L}$. The remaining parameter $K_v$ is chosen as large as possible for high low-frequency gain of $G_v$ while preserving stability of $G_v$. The critical value $K_{v\max}$ of $K_v$ at which the, Nyquist curve of $$\frac{K_v}{\tau_v s + 1} e^{-\hat{L}s}$$

touches $-1+j0$ can be found from $$K_{v_{max}} = \sqrt{1+\omega^{*2}\tau_v^2}, \tan^{-1}(\omega^*\tau_v) + \omega^*\hat{L} = \pi. \quad (112)$$

For sufficient stability, $K_v$ should be much smaller than $K_{v_{max}}$ and its default value is suggested to be $K_{v_{max}}/3$.

$\hat{G}_0(s)$ is usually strictly proper and $$\frac{1}{\hat{G}_0(s)}$$

is then improper. A filter $Q(s)$ is introduced to make $$\frac{Q(s)}{\hat{G}_0(s)}$$

proper and thus realizable. $Q(s)$ should have at least the same relative degree as that of $\hat{G}_0(s)$ to make $Q(s)/\hat{G}_0(s)$ proper, and should be approximately 1 in the disturbance frequency range for a satisfactory disturbance rejection performance. The following form is a possible choice $$Q(s) = \frac{1}{(\tau_q s + 1)^n}, \quad \tau_q > 0. \quad (113)$$

n is selected to make $$\frac{Q(s)}{\hat{G}_0(s)}$$

just proper $\tau_q$ is a user specified parameter and should be smaller than the equivalent process time constant $T_p$. The initial value is set as $\frac{1}{100}T_p \sim \frac{1}{10}T_p$ and its tuning will be discussed below to make the system stable. Other forms of $Q(s)$ have been discussed by Umeno and Hori (1991).

In view of the above development, $H(s)$ is approximated by $$H(s) = \frac{Q(s)}{\hat{G}_0(s)} \frac{1+V(s)}{1+V(s)e^{-\hat{L}s}}. \quad (114)$$

Figure 27:
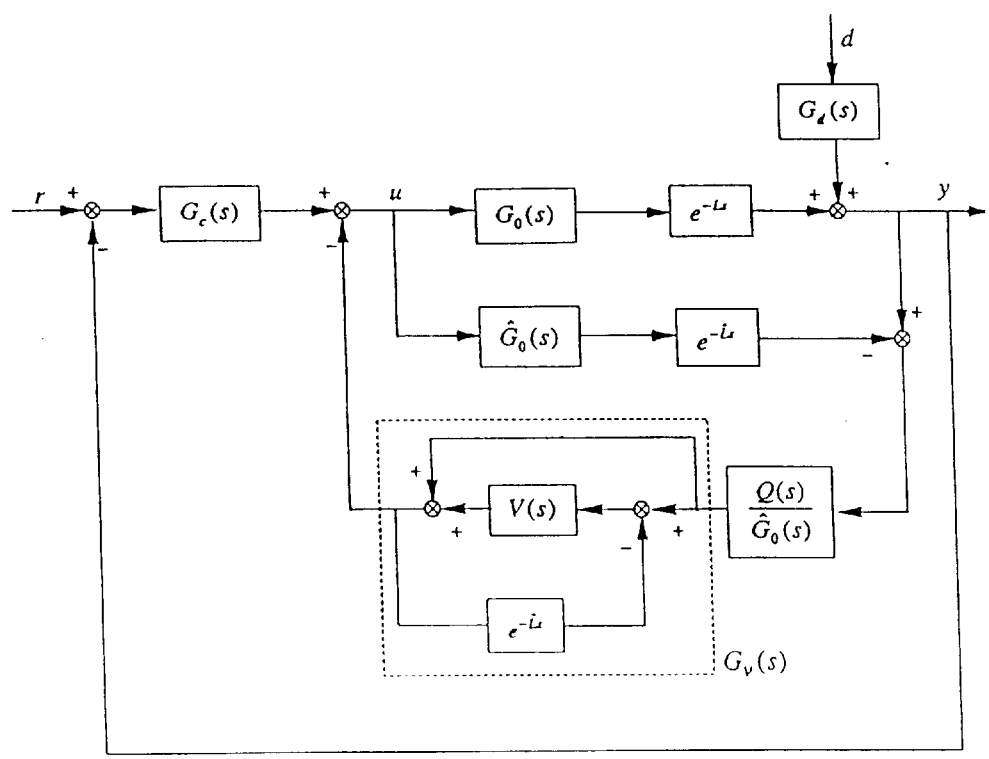
FIG. 27 is a schematic diagram of a control scheme according to the present invention with approximation.

The actual system to realize the proposed control scheme with such an approximation is shown in FIG. 27.

If $\hat{G}(s)$ is bi-proper (the degrees of the numerator and denominator are the same), the filter $Q(s)$ is not required. For a dead-time free case, $G_v$ is not required or $G_{v(s)}=1$, (114) becomes $$H(s) = \frac{Q(s)}{\hat{G}(s)},$$

which is the original disturbance observer proposed by Ohnishi (1987).

Figure 28:
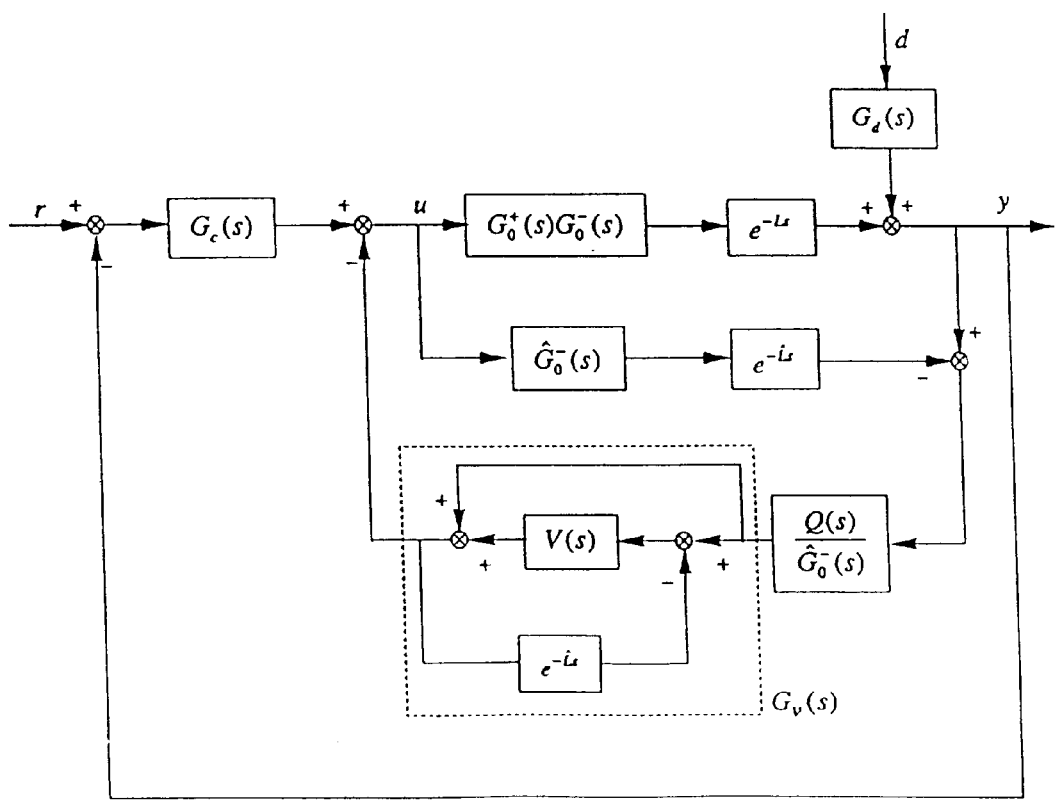
FIG. 28 is a schematic diagram of a control scheme for unstable/non-minimum-phase processes according to the present invention.

Unstable/Non-minimum-phase Processes In the above discussion, the process $G(s)$ has been assumed to be stable and minimum-phase (i.e., no zero exists in the left-half-plane). For an unstable and/or non-minimum-phase process $G(s)$, we factorize it into $$G(s) = G_0^+(s)G_0^-(s)e^{-Ls},$$

where $G_0^-(s)$ represents the stable minimum-phase part, and $G_0^+(s)$ includes all right-half-plane zeros and poles. The proposed scheme is modified into one shown in FIG. 28.

In the case of periodic disturbances rejection, instead of (109) and (110), we now set $$F(s) = \hat{G}_0(s)e^{-\hat{L}s}, \quad (115)$$

$$H(s) = \frac{1}{\hat{G}_0(s)} e^{-L_h s},$$

where $L_h = k_0 T - \hat{L}$, and $k_0$ is the smallest integer making $L_h \leq 0$. The system diagram is drawn in FIG. 29. It can be proved that under such a scheme, the periodic disturbance can be asymptotically rejected. For physical realization of $H(s)$ in (115), a filter $Q$, as discussed in the preceding section, has to be introduced to make $Q(s)/\hat{G}_0(s)$ proper.

EXAMPLE

Consider a first-order plus dead-time process $$G(s) = \frac{e^{-5s}}{10s+1}.$$

The PI controller design method proposed in Zhuang and Atherton (1993) is applied to give $$G_c(s) = 1.01 + \frac{1.01}{s}.$$

For the scheme in FIG. 27, suppose $\hat{G}(s) = G(s)$. In V(s), take $\tau_v = 0.4L = 2$, calculate from (112) the maximum value of $K_v$ as $K_{v_{max}} = 1.38$, then set $K_v = K_{v_{max}}/3 = 0.46$. We have $$V(s) = \frac{0.46}{2s+1}$$

Figure 30:
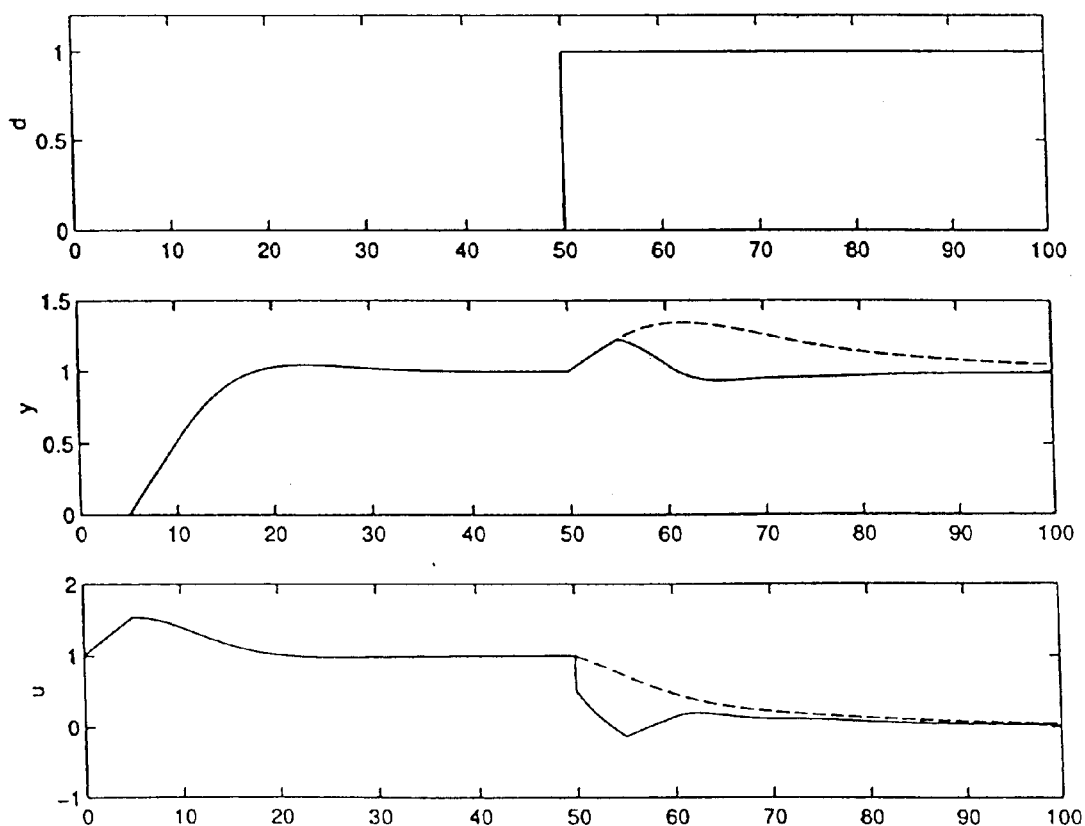
FIG. 30 is a graphical view of time responses for a process model.

The filter $Q(s)$ is in the form of $$Q(s) = \frac{1}{\tau_q s + 1},$$

and $\tau_q$ is chosen as $\frac{1}{10}T_p = 0.01$. A unit step change in the set-point is made at $t=0$, and a step disturbance of the size 1 is introduced through $$G_d(s) = \frac{1}{20s+1}$$

to the system at $t=50$, the resulting responses are displayed in FIG. 30, where the solid line is from the proposed method, and the dashed line is from the normal feedback control without any disturbance compensator.

Figure 29:
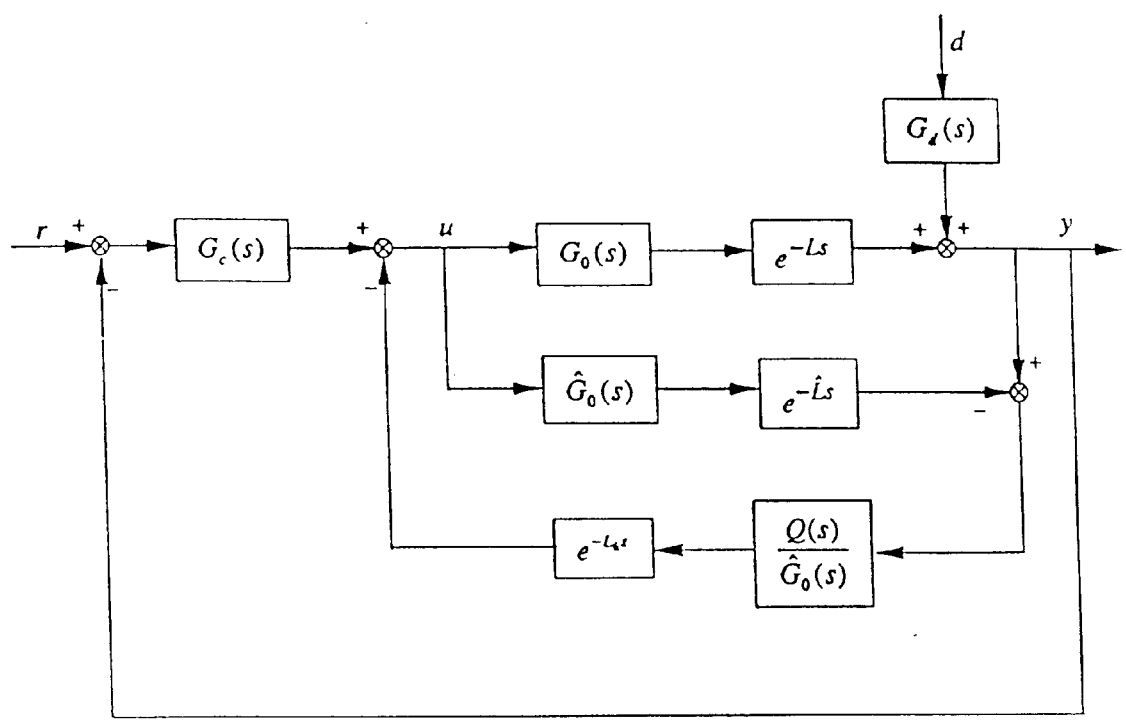
FIG. 29 is a schematic diagram of a control scheme considering a periodic disturbance rejection.
Figure 31:
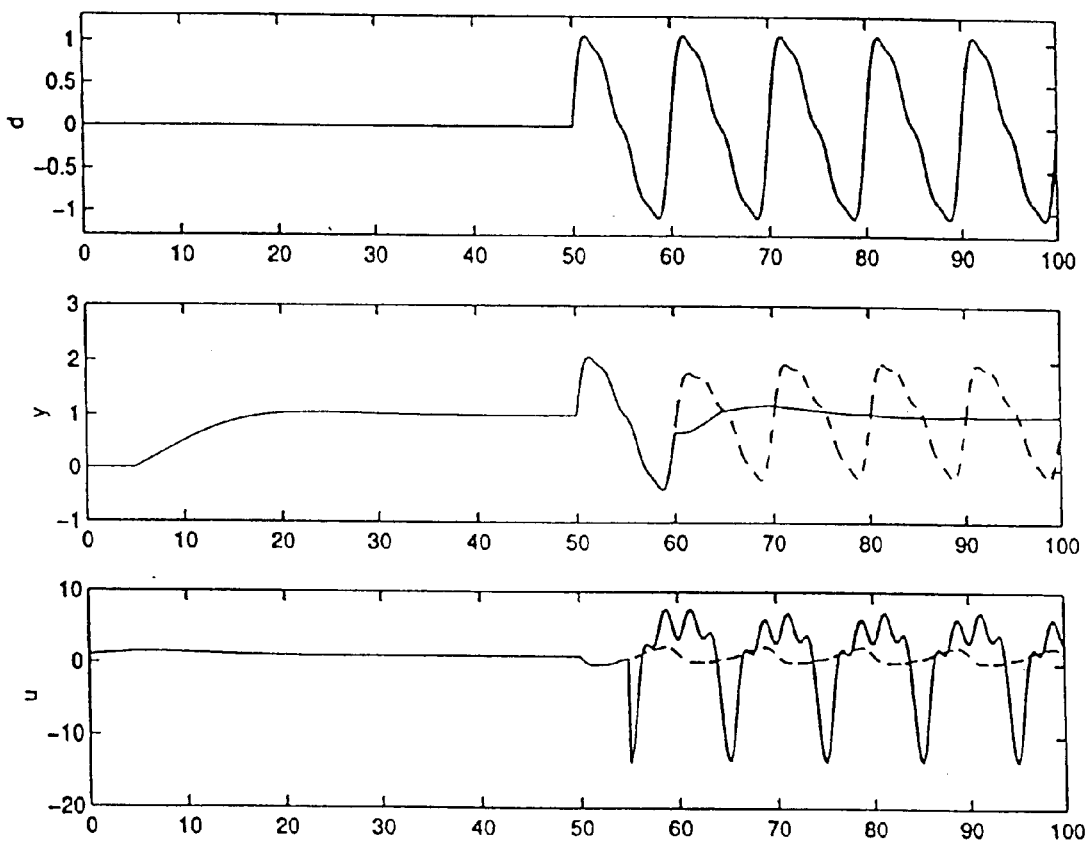
FIG. 31 is a graphical view of time responses for a process model

To evaluate our scheme of FIG. 29 for periodic disturbances, introduce instead the following periodic disturbance at t 50:

$d(t) = \sin(0.2\pi t) + 0.3\sin(0.4\pi t) + 0.1\sin(0.6\pi t) + 0.1\sin(0.8\pi t)$ with the period of $$T = \frac{2\pi}{0.1\pi} = 10$$

and let $G_d(S) = 1$. Calculate from (115) $L_h = T - L = 5$. In the case of no model mismatch, the resultant responses are shown in FIG. 31. The output from the proposed control approaches zero asymptotically. The proposed method produces great enhancement of disturbance rejection performance.

TABLE 1

Identification results in noise-free case

| G(s) | Identification method | Ĝ | ε | E |
|---|---|---|---|---|
| $\dfrac{1}{(s+1)^5}$ | Proposed method for n = 1 | $\dfrac{0.3550}{s+0.3487}e^{-2.3959s}$ | $1.3 \times 10^{-3}$ | 41.40% |
| | Proposed method for n = 2 | $\dfrac{0.2385}{s^2+0.8221s+0.2412}e^{-1.4725s}$ | $6.6499 \times 10^{-5}$ | 6.7% |
| | The Area method | $\dfrac{1}{2.38s+1}e^{-2.63s}$ | $1.93 \times 10^{-3}$ | 50.16% |
| $\dfrac{1.08}{(s+1)^2(2s+1)^3}e^{-10s}$ | Proposed method for n = 1 | $\dfrac{0.2449}{s+0.2268}e^{-13.8146s}$ | $9.5749 \times 10^{-4}$ | 4.45% |
| | Proposed method for n = 2 | $\dfrac{0.1055}{s^2+0.5543s+0.0981}e^{-12.2713s}$ | $5.0116 \times 10^{-5}$ | 1.43% |
| | The Area method | $\dfrac{1.08}{3.96s+1}e^{-14.04s}$ | $1.26 \times 10^{-3}$ | 4.69% |
| $\dfrac{-4s+1}{9s^2+2.4s+1}e^{-s}$ | Proposed method for n = 1 | — | — | — |
| | Proposed method for n = 2 | $\dfrac{-0.4444s+0.1111}{s^2+2.667s+0.1111}e^{-s}$ | $1.7318 \times 10^{-8}$ | $4.4931\% \times 10^{-4}$ |
| | The Area method | — | — | — |
| $\dfrac{2.15(-2.7s+1)(158.5s^2+6s+1)}{(17.5s+1)^4(20s+1)}e^{-14s}$ | Proposed method for n = 1 | $\dfrac{0.0396}{s+0.0184}e^{-49.9839s}$ | $8.6 \times 10^{-3}$ | 48.12% |
| | Proposed method for n = 2 | $\dfrac{0.0011}{s^2+0.0343s+0.0005}e^{-28.8861s}$ | $4.0631 \times 10^{-4}$ | 5.81% |
| | Proposed method for n = 3 | $\dfrac{205.94s^2+5.25s+1.12}{10^4s^3+996.85s^2+38.24s+0.52}e^{-31.9265s}$ | $2.0009 \times 10^{-4}$ | 1.27% |
| | The Area method | $\dfrac{2.15}{46.69s+1}e^{-53.90s}$ | $1.15 \times 10^{-2}$ | 60.87% |

TABLE 2

Identification results for $$G(s) = \dfrac{-4s+1}{9s^2+2.4s+1}e^{-s}$$

under different noise levels

| Noise Level | Ĝ(s) | ε | E |
|---|---|---|---|
| 0 | $\dfrac{-0.4444s+0.1111}{s^2+0.2667s+0.1111}e^{-s}$ | $1.7318 \times 10^{-8}$ | $4.4931 \times 10^{-4}\%$ |
| 3% | $\dfrac{-0.4453s+0.1110}{s^2+0.2679s+0.1108}e^{-0.9856}$ | $3.5343 \times 10^{-6}$ | 0.47% |
| 5% | $\dfrac{-0.4462s+0.1110}{s^2+0.2682s+0.1108}e^{-0.9765s}$ | $7.3575 \times 10^{-6}$ | 0.59% |
| 10% | $\dfrac{-0.4485s+0.1110}{s^2+0.2690s+0.1106}e^{-0.9531s}$ | $2.6610 \times 10^{-5}$ | 1.01% |
| 15% | $\dfrac{-0.4509s+0.1110}{s^2+0.2698s+0.1104}e^{-0.9295s}$ | $5.9969 \times 10^{-5}$ | 1.49% |
| 20% | $\dfrac{-0.4533s+0.1110}{s^2+0.2706s+0.1102}e^{-0.9059s}$ | $1.0753 \times 10^{-4}$ | 2.0% |
| 30% | $\dfrac{-0.4581s+0.1111}{s^2+0.2758s+0.1098}e^{-0.8581s}$ | $2.24756 \times 10^{-4}$ | 3.05% |
| 40% | $\dfrac{-0.4631s+0.1111}{s^2+0.2739s+0.1094}e^{-0.8088s}$ | $4.5533 \times 10^{-4}$ | 4.16% |

TABLE 2-continued

Identification results for $$G(s) = \frac{-4s+1}{9s^2 + 2.4s + 1} e^{-s}$$

under different noise levels

| Noise Level | $\hat{G}(s)$ | $\epsilon$ | E |
|---|---|---|---|
| 50% | $\dfrac{-0.4668s + 0.1112}{s^2 + 0.2758s + 0.1090} e^{-0.7541s}$ | $7.6173 \times 10^{-4}$ | 5.41% |

TABLE 3

Closed-loop identification results in noise-free case

| Process $G_p(s)$ | NSR | The Proposed Method $\hat{G}_p(s)$ | $\epsilon$ | E | Suganda's Method $\hat{G}_p(s)$ | $\epsilon$ | E |
|---|---|---|---|---|---|---|---|
| $\dfrac{e^{-s}}{12s^2 + 8s + 1}$ | 0 | $\dfrac{1.00 e^{-1.00s}}{12.06s^2 + 8.01s + 1}$ | $4.91 \times 10^{-4}$ | 0.35% | $\dfrac{1.00 e^{-0.99s}}{12.04s^2 + 7.98s + 1}$ | $2.85 \times 10^{-3}$ | 0.45% |
| | 5% | $\dfrac{1.00 e^{-1.06s}}{11.89s^2 + 7.92s + 1}$ | 12.87 | 4.75% | $\dfrac{1.00 e^{-2.94s}}{13.70s^2 + 8.37s + 1}$ | 42.27 | 134.79% |
| $\dfrac{e^{-s}}{(s+1)^2(2s+1)}$ | 0 | $\dfrac{1.00 e^{-3.49s}}{3.26s^2 + 3.52s + 1}$ | $4.80 \times 10^{-3}$ | 0.48% | $\dfrac{1.00 e^{-3.30s}}{3.72s^2 + 3.59s + 1}$ | $9.08 \times 10^{-2}$ | 2.30% |
| | 5% | $\dfrac{1.00 e^{-3.44s}}{3.45s^2 + 3.49s + 1}$ | 26.09 | 1.87% | $\dfrac{1.00 e^{-0.88s}}{13.84s^2 + 6.83s + 1}$ | 44.12 | 65.89% |
| $\dfrac{0.5s+1}{(s+1)(2s+1)} e^{-3s}$ | 0 | $\dfrac{1.00 e^{-3.11s}}{2.90s^2 + 3.40s + 1}$ | $4.85 \times 10^{-3}$ | 0.49% | $\dfrac{1.00 e^{-2.93s}}{2.86s^2 + 3.35s + 1}$ | $2.23 \times 10^{-1}$ | 5.87% |
| | 5% | $\dfrac{1.00 e^{-3.43s}}{2.86s^2 + 3.41s + 1}$ | 23.76 | 5.49% | $\dfrac{1.00 e^{-2.09s}}{1.75s^2 + 3.87s + 1}$ | 37.92 | 63.83 |

TABLE 4

Closed-loop identification results for $$\frac{1.08}{(s+1)^2(2s+1)^3} e^{-10s}$$

under different NSR

| NSR | $\hat{G}(s)$ | $\epsilon$ | E |
|---|---|---|---|
| 0 | $\dfrac{1.0801}{7.5403s^2 + 5.2612s + 1} e^{-12.8110s}$ | 0.69 | 2.14% |
| 3% | $\dfrac{1.0828}{7.2238s^2 + 5.1499s + 1} e^{-12.6847s}$ | 11.23 | 3.44% |
| 5% | $\dfrac{1.0823}{7.4893s^2 + 5.1953s + 1} e^{-12.5564s}$ | 21.44 | 4.29% |
| 10% | $\dfrac{1.0808}{7.6543s^2 + 5.1754s + 1} e^{-12.4387s}$ | 42.08 | 5.97% |
| 15% | $\dfrac{1.0794}{8.4881s^2 + 5.1712s + 1} e^{-12.1350s}$ | 94.30 | 9.67% |
| 20% | $\dfrac{1.0780}{9.0539s^2 + 5.2606s + 1} e^{-11.9564s}$ | 131.98 | 10.59% |
| 30% | $\dfrac{1.0908}{15.5858s^2 + 5.5866s + 1} e^{-10.3358s}$ | 325.63 | 24.35% |
| 40% | $\dfrac{1.0932}{16.4593s^2 + 4.9406s + 1} e^{-10.6667s}$ | 572.71 | 32.22% |

TABLE 5

Identification error with relay feedback

| Noise levels | Different relays | Processes | | | |
|---|---|---|---|---|---|
| | | $\frac{1}{5s+1}e^{-5s}$ | $\frac{1}{(s+1)^8}$ | $\frac{1}{(s+1)(5s+1)}e^{-2.5s}$ | $\frac{1-s}{(2s+1)^2(5s+1)}e^{-0.5s}$ |
| NSR = 0 | Cascade | 0.30% | 0.62% | 0.41% | 0.31% |
| w = 0 | Parasite | 0.31% | 0.62% | 0.42% | 0.32% |
| | Standard | 11.19% | 0.53% | 7.06% | 3.71% |
| NSR = 29% | Cascade | 1.87% | 2.76% | 5.38% | 4.39% |
| w = 0 | Parasite | 6.83% | 6.90% | 5.41% | 6.38% |
| | Standard | 10.01% | 3.70% | 10.73% | 9.37% |
| NSR = 41% | Cascade | 5.80% | 3.91% | 12.61% | 9.62% |
| w = 0 | Parasite | 14.52% | 6.12% | 14.20% | 16.96% |
| | Standard | 15.35% | 7.41% | 17.20% | 25.31% |
| NSR = 29% | Cascade | 2.01% | 4.52% | 4.93% | 4.14% |
| w = 0.5 | Parasite | 7.17% | 6.35% | 5.16% | 5.13% |
| | Standard | 17.28% | 10.08% | 36.91% | 15.31% |

TABLE 6

Chien's IMC-PID rules

| Process model | $k_c k_p$ | $T_I$ | $T_D$ |
|---|---|---|---|
| $\dfrac{k_p e^{-Ls}}{1+\tau s}$ | $\dfrac{\tau}{\tau_{cl}+L}$ | $\tau$ | — |
| $\dfrac{k_p(\tau_3 s+1)e^{-Ls}}{(\tau_1 s+1)(\tau_2 s+1)}$ | $\dfrac{\tau_1+\tau_2-\tau_3}{\tau_{cl}+L}$ | $\tau_1+\tau_2-\tau_3$ | $\dfrac{\tau_1\tau_2-(\tau_1+\tau_2-\tau_3)\tau_3}{\tau_1+\tau_2-\tau_3}$ |
| $\dfrac{k_p(-\tau_3 s+1)e^{-Ls}}{(\tau_1 s+1)(\tau_2 s+1)}$ | $\dfrac{\tau_1+\tau_2+\dfrac{\tau_3 L}{\tau_{cl}+\tau_3+L}}{\tau_{cl}+\tau_3+L}$ | $\tau_1+\tau_2+\dfrac{\tau_3 L}{\tau_{cl}+\tau_3+L}$ | $\dfrac{\tau_3 L}{\tau_{cl}+\tau_3+L}+\dfrac{\tau_1\tau_2}{\tau_1+\tau_2+\dfrac{\tau_3 L}{\tau_{cl}+\tau_3+L}}$ |
| $\dfrac{k_p e^{-Ls}}{s}$ | $\dfrac{2\tau_{cl}+L}{(\tau_{cl}+L)^2}$ | $2\tau_{cl}+L$ | — |

TABLE 7

Summary of simulation results of PID tuning

| Plant | $T_{cl}$ | Scheme | $M_p$(%) | $t_r$ | $t_s$ | $U_{max}$ | E(%) | IAE | IAE$_{load}$ |
|---|---|---|---|---|---|---|---|---|---|
| $G=\dfrac{e^{-0.5a}}{s+1}$ | 0.3333 | Chien's PID | 11.7728 | 0.72 | 4.15 | 1.8044 | 42.59 | 1.0571 | 0.2032 |
| | | Proposed PID | 0 | 0.73 | 2.31 | 29.4104 | 1.23 | 0.8351 | 0.2031 |
| | | IMC | 0 | 0.73 | 2.23 | 3.0184 | 0 | 0.8343 | 0.2031 |
| $G=\dfrac{(-0.5s+1)e^{-s}}{(s+1)(2s+1)}$ | 0.8328 | Chien's PID | 14.0690 | 1.54 | 11.66 | 28.9356 | 26.33 | 2.8728 | 0.6912 |
| | | Proposed PID | 0.9339 | 2.11 | 8.46 | 21.1194 | 2.66 | 2.8388 | 0.7581 |
| | | IMC | 0 | 2.17 | 6.18 | 4.8031 | 0 | 2.8378 | 0.7152 |
| $G=\dfrac{e^{-0.5s}}{(s^2+s+1)(s+2)^2}$ | 0.3922 | Chien's PID | 30.1457 | 2.25 | 27.50 | 4.9806 | 103.27 | 4.5772 | 0.5921 |
| | | Proposed PID | 12.8152 | 1.50 | 18.75 | 17.3647 | 48.14 | 2.9636 | 0.3434 |
| | | 4th-order controller | 1.0653 | 2.00 | 4.50 | 21.9459 | 4.9692e−2 | 2.1416 | 0.3049 |
| | | IMC | 1.0590 | 2.00 | 4.75 | 32.4176 | 0 | 2.1438 | 0.3048 |
| | 0.6422 | Chien's PID | 22.9060 | 2.50 | 23.50 | 4.6810 | 47.69 | 4.1793 | 0.5592 |
| | | Proposed PID | 0.5720 | 3.00 | 9.25 | 11.0360 | 2.20 | 3.1718 | 0.4163 |
| | | IMC | 0 | 3.00 | 7.25 | 5.5332 | 0 | 3.1438 | 0.4110 |

TABLE 8

Identification results for WB plant under different NSR

| NSR | $\hat{G}(s)$ Proposed | $\epsilon$ | E | E (Melo's) |
|---|---|---|---|---|
| 0 | $\begin{bmatrix} \dfrac{12.80e^{-1.00s}}{16.71s+1} & \dfrac{-18.90e^{-3.00s}}{21.01s+1} \\ \dfrac{6.60e^{-7.00s}}{10.91s+1} & \dfrac{-19.40e^{-3.00s}}{14.41s+1} \end{bmatrix}$ | $\begin{bmatrix} 0.06227\% \\ 0.01352\% \end{bmatrix}$ | $\begin{bmatrix} 0.15\% & 0.06\% \\ 0.06\% & 0.06\% \end{bmatrix}$ | $\begin{bmatrix} 0.72\% & 0.27\% \\ 0.29\% & 0.33\% \end{bmatrix}$ |
| 5% | $\begin{bmatrix} \dfrac{12.74e^{-0.98s}}{16.72s+1} & \dfrac{-19.07e^{-2.96s}}{21.16s+1} \\ \dfrac{6.50e^{-7.00s}}{10.89s+1} & \dfrac{-19.51e^{-2.92s}}{14.62s+1} \end{bmatrix}$ | $\begin{bmatrix} 2.80\% \\ 5.50\% \end{bmatrix}$ | $\begin{bmatrix} 3.52\% & 2.25\% \\ 1.52\% & 4.08\% \end{bmatrix}$ | $\begin{bmatrix} 88.08\% & 16.06\% \\ 5.07\% & 23.89\% \end{bmatrix}$ |
| 10% | $\begin{bmatrix} \dfrac{12.67e^{-0.95s}}{16.73s+1} & \dfrac{-19.25e^{-2.91s}}{21.31s+1} \\ \dfrac{6.39e^{-7.04s}}{10.87s+1} & \dfrac{-19.62e^{-2.81s}}{14.89s+1} \end{bmatrix}$ | $\begin{bmatrix} 5.72\% \\ 17.21\% \end{bmatrix}$ | $\begin{bmatrix} 7.10\% & 4.61\% \\ 3.14\% & 10.25\% \end{bmatrix}$ | $\begin{bmatrix} 173.65\% & 32.56\% \\ 9.49\% & 50.54\% \end{bmatrix}$ |
| 20% | $\begin{bmatrix} \dfrac{12.52e^{-0.93s}}{16.75s+1} & \dfrac{-19.60e^{-2.87s}}{21.48s+1} \\ \dfrac{6.16e^{-7.00s}}{10.86s+1} & \dfrac{-19.85e^{-2.70s}}{15.18s+1} \end{bmatrix}$ | $\begin{bmatrix} 18.44\% \\ 35.83\% \end{bmatrix}$ | $\begin{bmatrix} 11.12\% & 7.22\% \\ 6.73\% & 16.11\% \end{bmatrix}$ | $\begin{bmatrix} 334.08\% & 61.27\% \\ 17.71\% & 111.58\% \end{bmatrix}$ |
| 30% | $\begin{bmatrix} \dfrac{12.34e^{-0.86s}}{16.80s+1} & \dfrac{-19.95e^{-2.71s}}{22.01s+1} \\ \dfrac{5.88e^{-7.01s}}{10.81s+1} & \dfrac{-20.07e^{-2.33s}}{16.12s+1} \end{bmatrix}$ | $\begin{bmatrix} 38.67\% \\ 47.51\% \end{bmatrix}$ | $\begin{bmatrix} 22.36\% & 15.12\% \\ 10.90\% & 35.02\% \end{bmatrix}$ | $\begin{bmatrix} 411.14\% & 80.04\% \\ 26.70\% & 184.80\% \end{bmatrix}$ |

CONCLUSION

Although various algorithms are described in the foregoing, it should be appreciated that the invention claimed herein is limited by the claims rather than the disclosure. Thus, rather than claiming a mathematical algorithm, the claims recite a method and apparatus of system identification and control design for single-and multivariable processes. The mathematical algorithms, involving specific transforms, matrix multiplication and matrix inversion, for example, are used as tools operating in combination to attain the desired objects of the invention. Thus, while mathematical equations may provide an efficient manner of describing the inventive concepts, the invention does not pre-empt the mathematical algorithms disclosed herein, per se, but rather the applications thereof to produce a useful and unobvious identification and control apparatus.

Indeed, the method of the invention may be implemented by a programmed computer or processor, programmed to carry out the various computations herein above described by implementing a sequence of instructions controlling its operations and stored in a memory, such as a RAM, a ROM, a recording medium (whether of a magnetic, optical or another type). Moreover, upon identifying the necessary parameters of the systems, regulators, and the like designed in accordance with the invention, it should be recognized that such systems and regulators themselves may be implemented by programmed processors, as well as by electronic devices, utilizing discrete components having values selected to conform with the parameters provided in accordance with the invention.

The inventive apparatus, when operating to obtain the various parameters in accordance with the foregoing principles, has the following significant features, among others which help to distinguish the invention from conventional methods. A direct identification of continuous time-delay systems from the process step responses is provided where a set of new linear regression equations is established from the solution to the process differential equation and its various integrals and the relevant parameters are estimated without iterations. For tests other than open-loop step tests, a general technique for identification of continuous time-delay systems is provided with appropriate use of the FFT, IFFT and the above direct identification from the open-loop step test.

A new relay, called a cascade relay, is proposed to accurately estimate multiple-point frequency response of the process using the FFT, which is very robust to noise and step-like load disturbance. For single variable processes, a new controller design using IMC-principles is proposed with frequency-domain model reduction technique and can yield the optimal PID or high-order controller approximation to the IMC controller to produce the best achievable performance from single-loop feedback configuration.

For multivariable process identification, the sequential experiment scheme is adopted and a systematic method is developed to estimate the process transfer function matrix from various test scenarios, covering step/relay and open-loop/closed-loop ones. For multivariable control, a controller design is proposed using multivariable decoupling, IMC control principles and model reduction, and it can yield the optimal multivariable PID or high-order controller approximation to the IMC controller to produce best achievable performance from single-loop feedback configuration.

A technique based on the standard recursive least squares is proposed for high-accuracy convertions between continuous-time and discrete-time systems. A general control scheme for disturbance rejection is developed as an extension of the disturbance observer used in mechatronics to time-delay processes. It can reduce disturbance response significantly in general and reject periodic disturbance asymptotically in particular.

A processor-readable article of manufacture having embodied thereon software comprising a plurality of code segments that implements any of the aforementioned methods is considered within the spirit and scope of the present invention. The software architecture and hardware underlying the methods described in the following claims can be based upon the hypertext conventions and hardware of a packet-switched network such as the internet (the World Wide Web or www), and the software can be written in object-oriented languages such as Java, HTML and/or XML. As technology of this sort is generally known, no further description will be provided.

The aforementioned technical papers and descriptions of the related art that have been referenced in the above description of the Detailed Description of the Preferred Embodiments are described in greater detail hereinafter. A full bibliographic listing of each of the applicable references is recited hereinafter in alphabetical order, the entirety of each of which is herein incorporated by reference.

Astrom, K. J. (1999). Limitations on control system performance. Submitted to European Journal of Control; Astrom, K. J. and T. Hagglund (1984b). Automatic tuning of simple regulators with specification on phase and amplitude margins. Automatica 210(5), 645–651; Astrom, K. J. and T. Hagglund (1988). Automatic Tuning of PID Controllers. Instrument Society of America. NC, USA; Astrom, K. J., T. Hagglund, C. C. Hang and W. K. Ho (1993). Automatic tuning and adaptation for PID controllers—A survey. Control Eng. Practice 1(4), 699–714; Bi, Q., Q. G. Wang and C. C. Hang (1997). Relay based estimation of multiple points on process frequency response. Automatica 33(9), 1753–1757; Chen, C. T. (1993). Analog and Digital Control System Design: Transfer function, State space, and Algebraic Methods. Fort Worth: Saunders College Publishing; Chien, I. L. (1988). IMC PID controller design an extension. IFALC Proceedings Series 6, 147–152. Hang, C. C., T. H. Lee and W. K. Ho (1993). Adaptive Control. Instrument Society of America. NC, USA; Haykin, S. (1989). An Introduction to Analog & Digital Communications. John Wiley & Sons. New York; Ho, W. K., C. C. Hang and L. S. Cao (1995). Tuning of PID controllers based on gain and phase margin specifications. Automatica 31(3), 497–502; Huang, H. P., C. L. Chen, Y. C. Chao and P. L. Chen (1990). A modified Smith predictor with an approximate inverse of dead time. AIChE Journal 36 (7), 1025–1031; Koivo, H. N. and J. T. Tanttu (1991). Tuning of PID controller: survey of SISO and MIMO techniques. In: Preprints of IFAC International Symp. on Intelligent Tuning and Adaptive Control. Vol. 1. Singapore; Kuhfitting, P. K. F. (1978). Introduction to the Laplace Transform. Plenum Press. New York; Loh, A. P. and U. V. Vasnani (1994). Necessary conditions for limit cycles in multi-loop relay systems. IEE Proceedings on Control Theory and Applications 141, 163–168; Luyben, W. L. (1986). Simple method for tuning SISO controllers in multivariable system. Ind. Eng. Chem. Process Des. Dev. 25(3), 654–660; Mafezzoni, C. and P. Rocco (1997). Robust tuning of PID regulators based on step-response identification. European Journal of Control 3(2), 125–136; Morrison, N. (1994). Introduction to Fourier Analysis. John Wiley & Sons Inc. New York.

Nishikawa, Y., N. Sannomiya, T. Ohta and H. Tanaka (1984). A method for auto tuning of PID control parameters. Automatica 20(3), 321–332; Pintelon, R., P. Guillaume, Y. Rolain, J. Schoukens and H. V. Hamrne (1994). Parametric identification of transfer functions in the frequency domain a survey. IEEE Trans Aut. Control 39(11), 2245–2260; Rivera, D. E., M. Morari and S. Skogestad (1986). Internal model control for PID controller design. Industrial and Engineering Chemistry: Process Design and Development 25, 252–265; Shen, S. H., J. S. Wu and C. C. Yu (1996). Use of biased-relay feedback for system identification. AIChE Journal 42, 1174–1180; Soderstrom, T. and P. Stoica (1989). System identification. Prentice Hall. New York; Suganda, P., P. R. Krishnaswamy and G. P. Rangaiah (1998). On-line process identification from closed-loop tests under PI control. Trans. IChemE 76 (Part A), 451–457; Umeno, T. and Y. Hori (1991). Robust speed control of DC servomotors using modern two degrees-of-freedom controller design. IEEE Trans. Ind. Electron. 38(5), 363–368; Wahlberg, B. and L. Ljung (1992). Hard frequency-domain model error bounds from least-squares like identification techniques. IEEE Trans. Au.t. Control 37(7), 900912; Wang, Q. G. and Y. Mang (2000). Frequency response identification with cascade relay feedback. accepted by Int. J. Control; Wang, Q. G., H. W. Fung and Y. Mang (1999b). Robust estimation of process frequency response from relay feedback. ISA Transactions 38, 3–9; Wang, Q. G., T. H. Lee. and Q. Bi (1997). Use of FFT in relay feedback systems. Electronics Letters 33, 1099–1100; Wang, Q. G., Y. Zhang and M. S. Chiu (1999c). Decoupling internal model control for multivariable systems with multiple time delays. Submitted to Automatica; Wood, R. K. and M. W. Berry (1973). Terminal composition control of a binary distillation column. Chem. Eng. Sci. 28, 1707–1717; Yan, W. Y. and J. Lam (1999). An approximate approach to H2 optimal model reduction. IEEE Rans. Aut. Control 44(7), 1341–1358; and Zhuang, M. and D. P. Atherton (1993). Automatic tuning of optimum PID controllers. IEE Proceedings on Control Theory and Applications 140(3), 216–224.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for identification of a continuous time-delay system from a process step response, said method comprising the steps of:

applying an open-loop step test and recording at least one output time response;

obtaining at least one linear regression equation from the at least one output time response;

estimating the regression parameters by an LS method; and recovering the process model coefficients for the continuous time-delay system using an explicit relationship between the regression parameters and the regression parameters in the actual process.

2. The method according to claim 1, wherein said step of estimating the regression parameters by an LS method is completed without iterations.

3. The method according to claim 1, wherein said method includes at least one of an FOPDT model, a SOPDT model and a SOPDTZ model for approximating an industrial process.

4. The method according to claim 3, wherein the industrial process requires a system model for analysis, prediction, filtering, optimization, management or tuning of a controller for a process system.

5. The method according to claim 4, wherein the process system includes monotonic or oscillatory dynamics of minimum-phase or non-minimum phase processes.

6. The method according to claim 2, wherein said continuous time-delay system has been brought into a constant steady state with a controller and said open-loop step test is replaced by a closed loop test producing a steady state response.

7. A method for closed-loop identification of a continuous time-delay system, comprising the steps of:
   applying a closed-loop test that attains a steady state response or stationary oscillations at the end of test;
   recording a process input response and an output time response for the closed-loop test;
   using a FFT to calculate the process frequency response;
   using an inverse FFT to construct the process step response;
   applying an open-loop identification method to obtain the process model.

8. The method according to claim 7 wherein said open-loop identification method to obtain the process model includes the steps of:
   applying an open-loop step test and recording at least one output time response;
   obtaining at least one linear regression equation from the at least one output time response;
   estimating the regression parameters by an LS method; and
   recovering the process model coefficients for the continuous time-delay system using an explicit relationship between the regression parameters and the regression parameters in the actual process.

9. The method according to claim 8, wherein a FOPDT model, SOPDTZ model or higher order model is obtained through said open-loop identification method.

10. The method according to claim 7, wherein the closed-loop test is a step test or a relay test.

11. A cascade relay feedback system for exciting a process at a process critical frequency $\omega_c$, said cascade relay system including:
   a first loop;
   a second loop;
   a master relay in the second loop, wherein said cascade relay system permits persistent excitation at 0.5 $\omega_c$ and 1.5 $\omega_c$; and
   a slave relay in the first loop, wherein said cascade relay system can excite said process at said process critical frequency, $\omega_c$.

12. A method for identification of the cascade relay feedback system of claim 11, said method comprising the steps of:
   performing a cascade relay test for a process; and
   using a FFT algorithm to compute a process frequency response at multiple frequencies.

13. A controller design method for a single variable process using IMC principles, said method comprising the steps of:
   specifying an initial value for a tuning parameter according to a performance limitation of single loop control system due to non-minimum phase elements;
   specifying a type of controller;
   using an LS method for generating the controller parameters and evaluating a corresponding approximation error;
   completing said design method if the corresponding approximation error satisfies a specified approximation threshold.

14. The controller design method according to claim 13, wherein the corresponding approximation error does not satisfy the specified approximation threshold, said method further comprising the steps of:
   updating the initial value of the tuning parameter; and
   repeating the steps of claim 13 until said corresponding approximation error satisfies the specified approximation threshold.

15. The controller design method according to claim 13, wherein the corresponding approximation error does not satisfy the specified approximation threshold, said method further comprising the steps of:
   using an LS method to find a lowest high-order controller by increasing the order of the controller gradually until satisfying the specified approximation threshold; and
   completing said design method.

16. A method for identifying a multivariable process, said method comprising the steps of:
   bringing the process to a constant steady state;
   specifying a test type and a test mode;
   performing a sequential experiment and recording all the process input and output responses;
   calculating a process frequency response;
   constructing a process step response; and
   estimating a process model.

17. The method according to claim 16, wherein said test type is at least one of a relay test and a step test, and said test mode is at least one of a open-loop test and a closed-loop test.

18. The method according to claim 17, wherein said test mode is an open-loop test, and said steps of calculating the process frequency response, constructing the process step response and estimating the process model include an open-loop identification method to obtain the process model, said open-loop identification model including the steps of:
   applying an open-loop step test and recording at least one output time response;
   obtaining at least one linear regression equation from the at least one output time response;
   estimating the regression parameters by an LS method; and
   recovering the process model coefficients for the continuous time-delay system using an explicit relationship between the regression parameters and the regression parameters in the actual process.

19. A controller design method for a multivariable process using multivariable decoupling and IMC-principles, said method comprising the steps of:
   specifying an objective closed-loop transfer function matrix with each diagonal element taking into account time delay and non-minimum phase zeros;
   using an LS method to find a PID controller and evaluating a corresponding approximation error; and
   completing said design method if the corresponding approximation error satisfies a specified approximation threshold.

20. The controller design method according to claim 19, wherein the corresponding approximation error does not satisfy the specified approximation accuracy, said method further comprising the steps of:

updating a tuning parameter in said closed loop;

specifying the objective closed-loop transfer function matrix with each diagonal element taking into account time delay and non-minimum phase zeros;

using the LS method to find another PID controller and evaluating a corresponding approximation error; and completing said design method if the corresponding approximation error satisfies the specified approximation threshold.

21. The controller design method according to claim 19, wherein the corresponding approximation error does not satisfy the specified approximation threshold, said method further comprising the steps of using LS method for each element of the controller matrix to find the simplest high-order controller by increasing the order of each element gradually until satisfying the specified approximation threshold.

22. A method for high performance conversion between a continuous-time system and a discrete-time system, said method comprising the steps of:

specifying an initial weighting function and an initial model;

conducting a RLS approximation to give a rational transfer function;

updating the weighting function according to the last RLS approximation; and repeating said conducting step and said updating step until a corresponding approximation satisfies a specified approximation threshold.

23. A method for disturbance compensation for a time-delay process using a disturbance observer, said method comprising the steps of:

estimating a process model;

determining if a delay free part of the model is of minimum-phase, and factorizing the delay free part of the model into a minimum-phase part and non-minimum-phase part if said delay free part of the model is not in minimum phase;

specifying a filter to make an inversed minimum-phase part of the model proper; and approximating a pure predictor by choosing parameters according to a suggested guideline for rejecting general disturbance or specifying the time-delay in the disturbance observer according to a suggested guideline for rejecting periodic disturbance.

24. A processor-readable article of manufacture having embodied thereon software comprising a plurality of code segments that implements the method of claim 1, in order to enable an operator to identify, control and manage a continuous time-delay system from a process step response.

25. A single loop control system for a single variable process, said single loop control system having a system input, a system output, and a controller having the controller parameters generated by the method of claim 13.

* * * * *